(12) United States Patent
Morris et al.

(10) Patent No.: US 6,789,896 B2
(45) Date of Patent: Sep. 14, 2004

(54) SHAPED OPHTHALMIC LENSES

(75) Inventors: Michael Alan Morris, Santa Rosa, CA (US); Colin Maurice Perrott, Port Ludlow, WA (US); Simon J. Edwards, Heathpool (AU); Ray Steven Spratt, Petaluma, CA (US)

(73) Assignee: Sola International Holdings, Ltd., Lonsdale (AU)

(*) Notice: Subject to any disclaimer, the term of this patent is extended or adjusted under 35 U.S.C. 154(b) by 0 days.

(21) Appl. No.: 10/222,812

(22) Filed: Aug. 19, 2002

(65) Prior Publication Data

US 2003/0086055 A1 May 8, 2003

Related U.S. Application Data

(60) Division of application No. 09/453,218, filed on Dec. 3, 1999, now Pat. No. 6,454,408, which is a continuation-in-part of application No. PCT/AU99/00430, filed on Jun. 4, 1999.

(30) Foreign Application Priority Data

Jun. 4, 1998 (AU) .............................................. PP3887
Jun. 19, 1998 (AU) .............................................. PP4252

(51) Int. Cl.$^7$ .............................................. G02C 7/02
(52) U.S. Cl. ...................................... 351/159; 351/177
(58) Field of Search ........................ 359/159, 41, 158, 359/168–169, 177

(56) References Cited

U.S. PATENT DOCUMENTS

| | | | |
|---|---|---|---|
| 1,741,536 A | 12/1929 | Rayton | |
| 1,918,999 A | 7/1933 | Wells | |
| 1,942,400 A | 1/1934 | Glancy | |
| 3,526,449 A | 9/1970 | Bolle et al. | |
| 4,577,942 A | 3/1986 | Frieder et al. | |
| 4,741,611 A | 5/1988 | Burns | |
| 4,778,266 A | 10/1988 | Maitenaz | |
| 4,779,972 A | 10/1988 | Gottlieb | |
| 4,867,550 A | 9/1989 | Jannard | |
| 4,912,155 A | 3/1990 | Burton | |
| 4,954,591 A | 9/1990 | Belmares | |
| 5,094,520 A | 3/1992 | Reshef et al. | |
| 5,123,725 A | 6/1992 | Winthrop | |
| 5,187,505 A | 2/1993 | Spector | |
| 5,444,503 A | 8/1995 | Kelch et al. | |
| 5,517,260 A | 5/1996 | Glady et al. | |
| 5,604,547 A | 2/1997 | Davis et al. | |
| 5,644,374 A | 7/1997 | Mukaiyama et al. | |
| 5,648,832 A | 7/1997 | Houston et al. | |
| 5,689,323 A | 11/1997 | Houston et al. | |
| 5,691,798 A | 11/1997 | Smith | |
| 5,704,692 A | 1/1998 | Purdy et al. | |
| 5,825,455 A | 10/1998 | Fecteau et al. | |
| 6,129,435 A | 10/2000 | Reichow et al. | |
| 6,142,624 A | 11/2000 | Morris et al. | |
| 6,142,627 A * | 11/2000 | Winthrop ..................... 351/169 |

FOREIGN PATENT DOCUMENTS

| | | |
|---|---|---|
| AU | A-15095/83 | 12/1983 |
| EP | 225 034 A1 | 6/1987 |
| EP | 547 762 A1 | 6/1993 |
| EP | 640 523 A1 | 3/1995 |
| FR | 2 542 462 | 9/1984 |

(List continued on next page.)

Primary Examiner—Jordan M. Schwartz
(74) Attorney, Agent, or Firm—Burns, Doane, Swecker & Mathis, L.L.P.

(57) ABSTRACT

An optical lens element including
a first surface; and
a second surface of complementary curvature;
at least one surface exhibiting significant deviation in curvature from a standard optical surface;
the first and second surfaces in combination defining an optical zone exhibiting substantially constant mean through power along at least one meridian.

38 Claims, 33 Drawing Sheets

FOREIGN PATENT DOCUMENTS

| | | |
|---|---|---|
| FR | 2 688 322 | 9/1993 |
| GB | 680 400 | 10/1952 |
| GB | 2 281 635 A | 3/1995 |
| JP | 5-273502 | 10/1993 |
| WO | 96/13236 | 5/1996 |
| WO | 97/22894 | 6/1997 |
| WO | 97/35224 | 9/1997 |
| WO | 97/38343 | 10/1997 |
| WO | 97/41483 | 11/1997 |

* cited by examiner

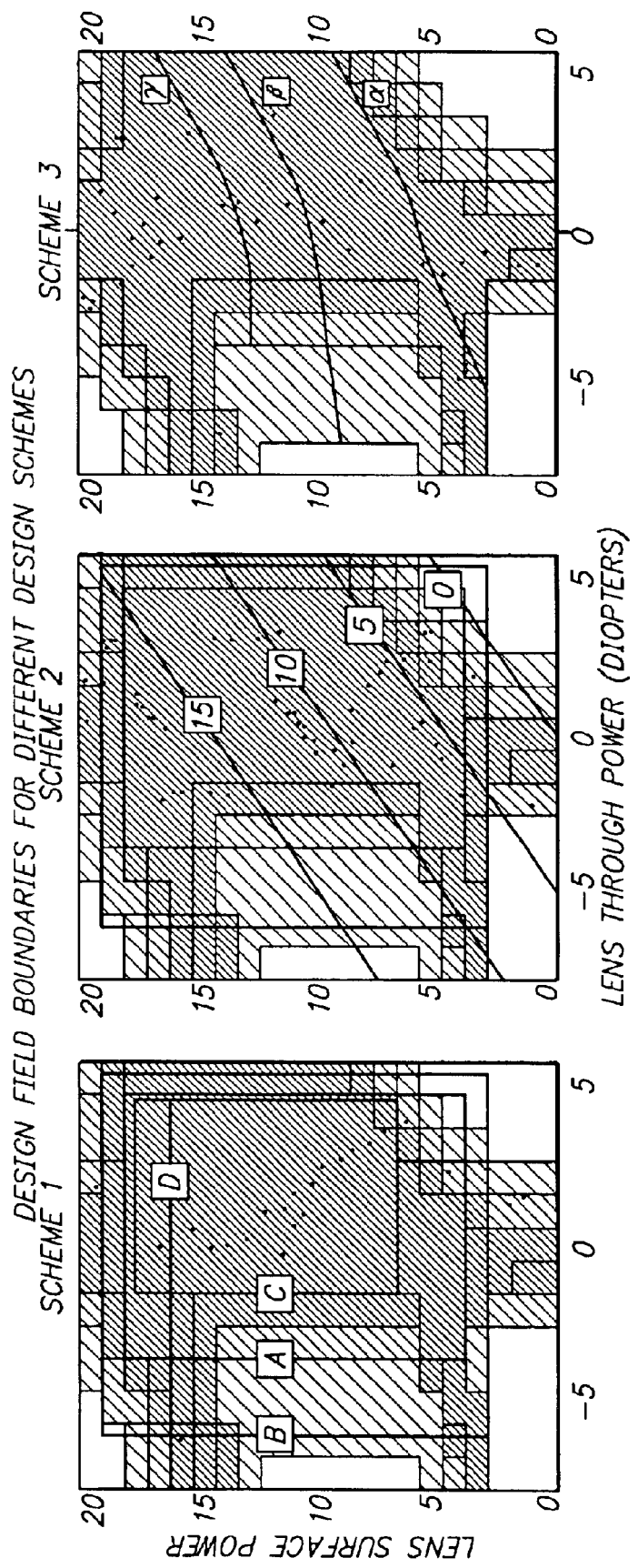

Power Sag

Power Rx Sag

Power Rx Tan

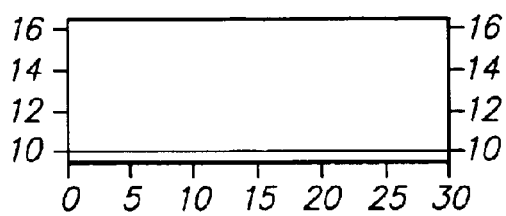
FIG. 26A
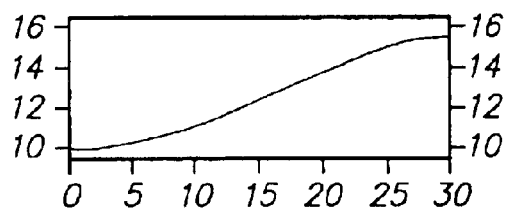
FIG. 26B
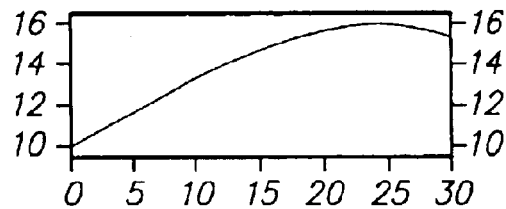
FIG. 26C
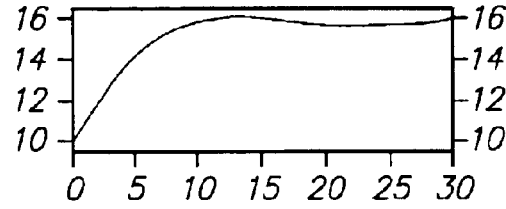
FIG. 26D
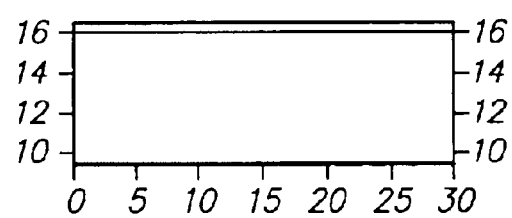
FIG. 26E
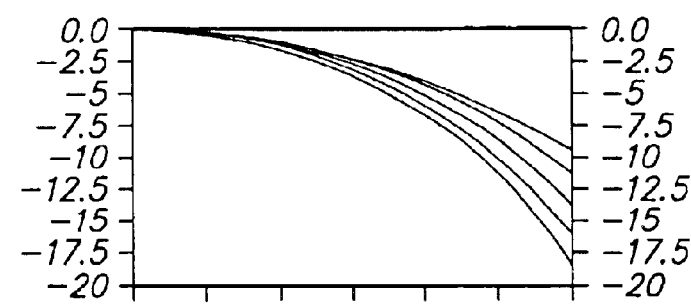
FIG. 26F

 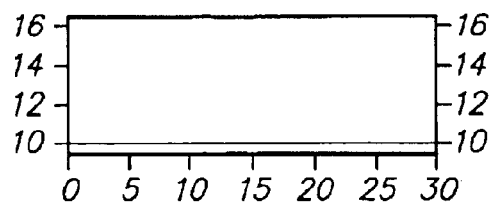
FIG. 27A
 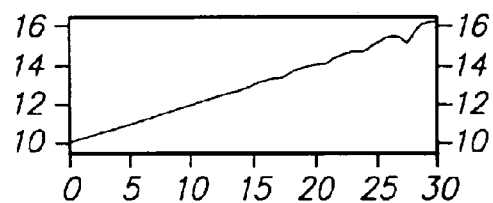
FIG. 27B
 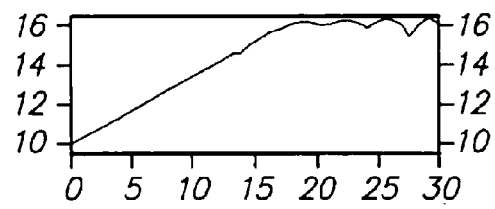
FIG. 27C
 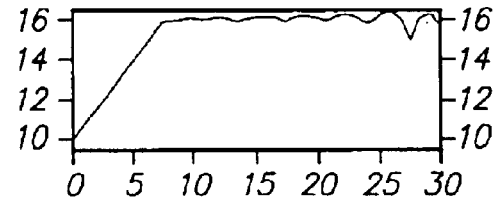
FIG. 27D
 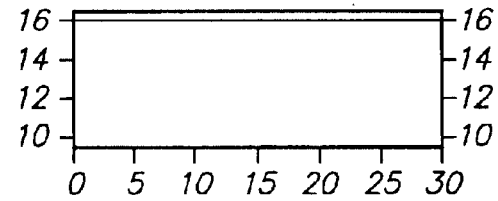
FIG. 27E
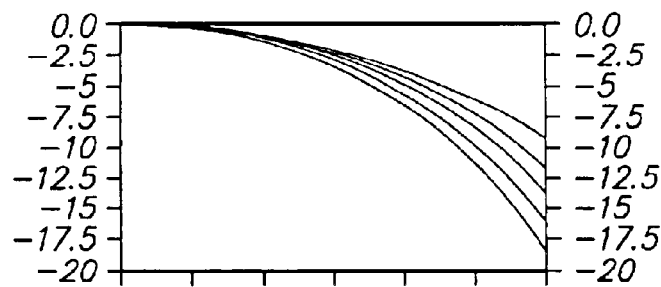
FIG. 27F

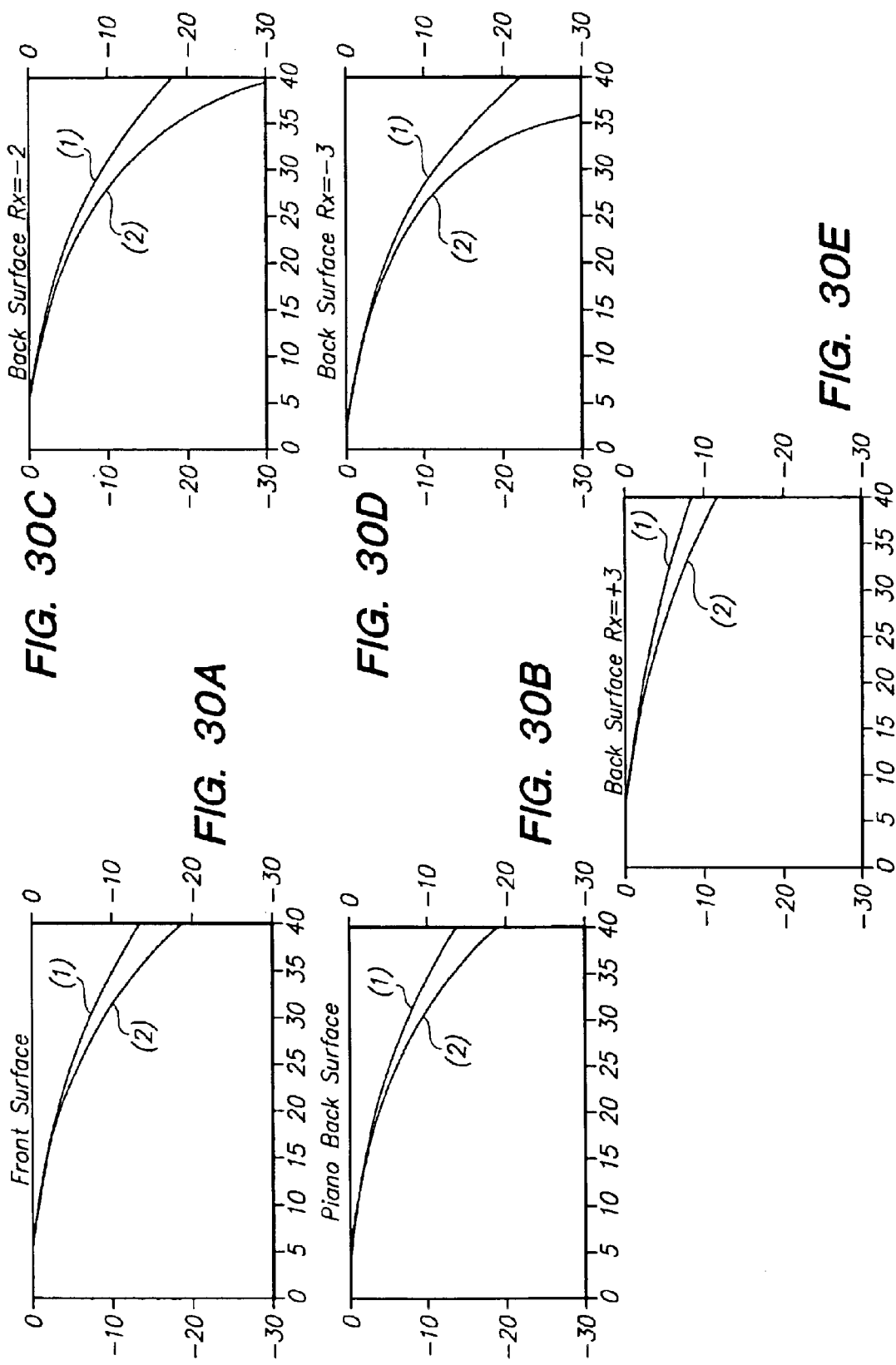

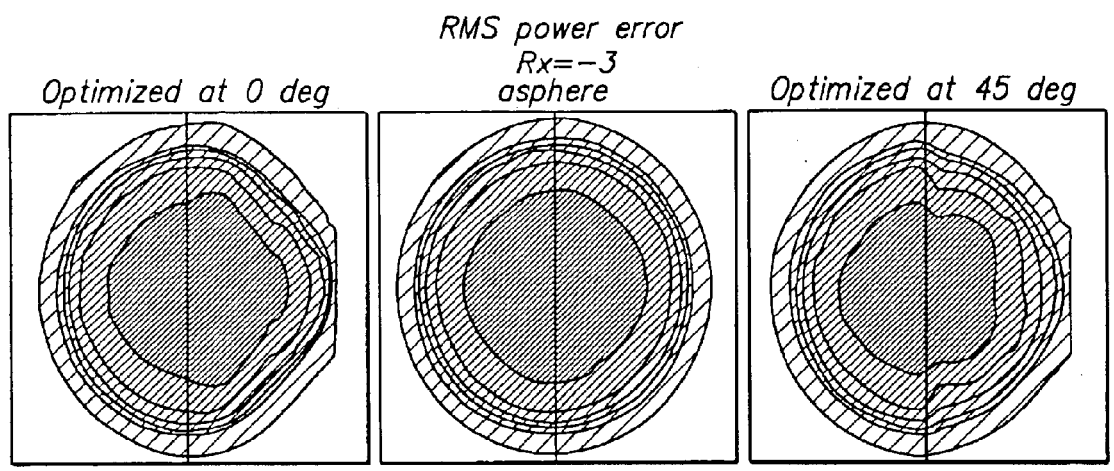
| Optimized at 0 deg | RMS power error Rx=−3 asphere | Optimized at 45 deg |
|---|---|---|
| FIG. 31A | FIG. 31B | FIG. 31C |
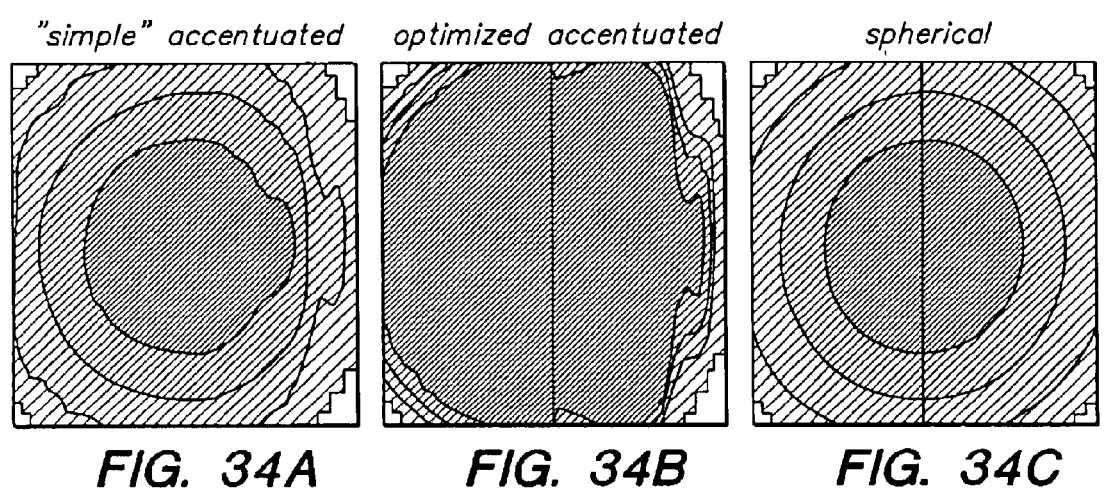
| "simple" accentuated | optimized accentuated | spherical |
|---|---|---|
| FIG. 34A | FIG. 34B | FIG. 34C |
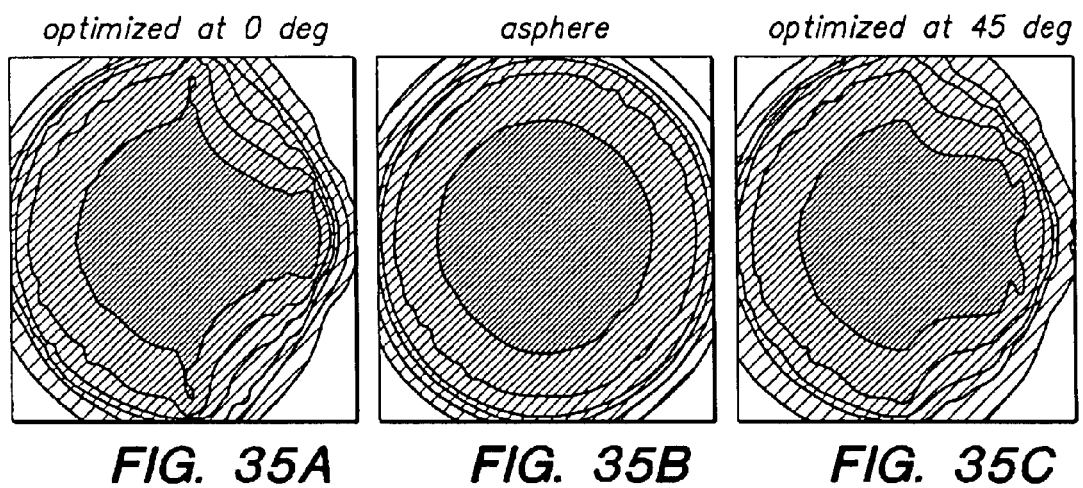
| optimized at 0 deg | asphere | optimized at 45 deg |
|---|---|---|
| FIG. 35A | FIG. 35B | FIG. 35C |

SIDE VIEW

TOP VIEW

SHAPED OPHTHALMIC LENSES

This application is a divisional of U.S. application Ser. No. 09/453,218, filed on Dec. 3, 1999, now U.S. Pat. No. 6,454,408, which was a continuation-in-part of International Application No. PCT/AU99/00430, filed on Jun. 4, 1999.

FIELD OF THE INVENTION

The present invention relates to optical lenses and eyewear including prescription lenses and sunglass lenses, spectacles, lens blanks, sunglasses and safety lenses.

BACKGROUND OF THE INVENTION

It is known in the prior art to manufacture non-corrective eyeglasses such as sunglasses or protective eyeglasses having wrap-around segments designed to shield the eye from incident light, wind, and foreign objects in the temporal vision field of the wearer. Visible light and light in the UV region may enter the eye from angles as high as 100° from the line of sight.

It has not been possible, however, in prior art sunglasses or protective eyeglasses, to provide such spectacles with significant through power, whilst maintaining a cosmetically acceptable appearance. The radius of curvature required to provide an ophthalmic lens including a prescription surface is such that the spectacles would produce a bug-eyed appearance, which would be cosmetically unacceptable.

Today, the vast majority of conventional prescription lenses are relatively flat, single vision, Ostwalt section, miniscus lenses which are glazed like window panes into flat outline spectacle frames.

Applicants have developed certain novel optical lens elements including lens elements with a prescription zone, suitable for use in wrap-around or protective eyewear. The element may also include a peripheral vision zone, with no prismatic jump between the zones. These lens elements are produced by design methods for the prescription zone which include temporally rotating a prescription section about a vertical axis through its optical center and/or decentering the optical axis of the prescription section relative to its geometric axes. These lens elements and design method are described in International Publication No. WO 97/35224 (25 Sep. 1997) to applicants, the entire disclosure of which is hereby incorporated by reference. This application describes the use of close fitting prescriptions shields, visors or dual lens prescription sunglasses by introducing a step change in curvature of the Rx lenses, particularly in the forward visual field of the wearer. However, the technique involves design discontinuities in the optical construction of the lenses, although the visual function is not impaired from the wearer's viewpoint.

Applicants had developed certain novel lens elements and eyewear characterised by steeply curved surfaces which are approximately spherical and concentric with the centroid of rotation of the eye. These objects are described in detail in U.S. patent application Ser. No. 09/223,006 to Applicants, ("Wide field spherical lenses and single design spectacle therefor") filed 30 Dec. 1998, now U.S. Pat. No. 6,124,624, the entire disclosure of which is hereby incorporated by reference. These lenses deviate substantially from conventional, relatively flat lens shapes. However, the overall shape of such lenses may be limited by the spherical reference surfaces employed.

Accordingly, it would be a significant advance in the art if an item of prescription eyewear, for example of the wrap-around type, could be provided which would allow for a wide range of selected styling for both horizontal wrap (around the brows) and vertical shape to maximise the fashion appeal. Furthermore, it would be a further significant advance in the art if the lenses could provide good correction to the full visual field from central to peripheral vision, if desired. Even more preferably, it would be a significant advance if this could be achieved without design features that may create fitting difficulties for a practitioner, or features such as a piano extension which are visible to an observer and diminish the appeal of the product unless it is treated as a tinted or reflective sunglass.

Further, the range of lens shapes in both the horizontal and orthogonal directions is relatively limited in the prior art. The necessity to provide acceptable optical quality has heretofore limited the range of lens element shapes available, particularly with lens elements having significant through power.

It is accordingly an object of the present invention to overcome, or at least alleviate, one or more of the difficulties and deficiencies related to the prior art.

SUMMARY

Accordingly in a first aspect of the present invention there is provided an optical lens element including
- a first surface; and
- a second surface of complementary curvature;
- at least one surface exhibiting significant deviation in curvature from a standard optical surface;
- the first and second surfaces in combination defining an optical zone exhibiting substantially constant mean through power along at least one meridian.

It will be understood that the optical lens element according to the present invention permits the production of optical lenses with a surface or surfaces of quite radical shape relative to standard ophthalmic lenses, but still providing a lens body for which the mean through power is relatively constant within normal ophthalmic standards. This is despite the fact that the deviating surfaces may exhibit significant optical distortions, e.g. high levels of surface astigmatism over substantial portions of the lens aperture.

Preferably the first and second surfaces are co-varying surfaces such that the optical zone exhibits substantially constant mean through power. More preferably the deviating surface(s) exhibits a substantially smooth change of curvature, at least along a horizontal meridian, across at least a portion of the visual fixation field of the wearer. Thus, the deviating surface(s) may exhibit substantially no visible discontinuity, and more preferably no optical discontinuity. In preferred embodiments the front and/or back surface of the lens element has a surface power which increases in the temporal direction by at least 3.0 D.

In a preferred form, the change in curvature results in a change in sagittal depth of at least approximately 2 mm, preferably at least approximately 4 mm, more preferably at least approximately 9 mm.

In a preferred form, the optical zone of the lens element functions as a prescription zone. More preferably, the lens element has a mean through power between −6.0 D and +6.0 D, preferably between −4.0 D and +4.0 D.

BRIEF DESCRIPTION OF THE DRAWINGS

FIGS. 4a–4c are details of Morris-Spratt diagrams.

FIGS. 26a–f, 27a–f and 28a–f are examples of the shape and tangential power profile of certain bowl-shaped lens elements.

FIGS. 30a–e illustrate the general shape of front and back surfaces of lens elements configured as spirals.

FIGS. 31a–c are plots of the RMS power error for spiral lens designs according to the present invention.

FIGS. 34a–c and 35a–c are RMS power error plots for various lens elements.

DETAILED DESCRIPTION OF PREFERRED EMBODIMENTS

Definitions

Figure 1:
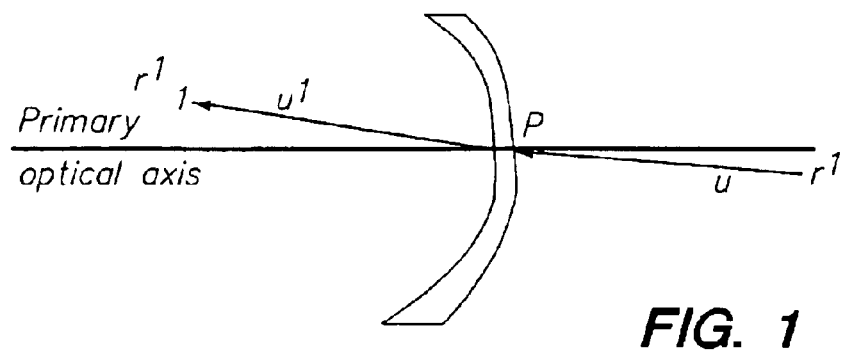
FIG. 1 is a side cross-sectional view of a lens element showing a primary optical axis.

Standard optical surfaces are surfaces of spherical or toric shape, defined at a sphere or fitting point on the surface which passes through the optical axis.

By the term "good optical quality", we mean optical quality equal to, or greater than, a standard aspheric lens, for example.

By the term "substantially constant mean through power" we mean that the mean through power is constant within ±0.75 D, preferably within ±0.5 D, more preferably within ±0.25 D, in the visual fixation field of the wearer.

Mean through power is the average of $F_1'$ the through power in one principal meridian along a given line of sight and $F_2'$ the through power in the other principal meridian along that line of sight.

$$\text{Mean through power} = \frac{(F_1' + F_2')}{2}$$

RMS Power Error is the root mean squared error of actual lens through powers $F_1'$ and $F_2'$ in the principal meridians, compared with the desired refractive corrections $F_1$ and $F_2$:

$$\text{RMS Power Error} = \sqrt{\frac{(F_1' - F_1)^2 + (F_2' - F_2)^2}{2}}$$

By the term "significant deviations" in curvature from a standard optical surface, we mean that the shape of the surface deviates sufficiently to introduce optical distortions, e.g. astigmatism, to the lens surface. For example, the curvature may deviate from a standard optical shape by at least 1.0 D along the horizontal meridian, preferably 3.0 D along any meridian, more preferably at least 5.0 D, more preferably at least 6.0 D.

By the term "lens element" as used herein, we mean an optical or ophthalmic lens, semi-finished lens, or lens wafer which may be utilised in the formation of an ophthalmic product. The optical lens element may be provided in the form of a semi-finished lens, or lens blank, where the second or back surface of the optical lens element may be finished at a later time.

By the term "visual fixation field", as used herein, we mean a region on the lens surface defined by a set of points which are the intersection of the lens surface and the wearer's line of sight as he or she fixates on objects in the median plane.

By the term "sagittal depth", as used herein, we mean the distance between the fronto-parallel plane of the lens element and the temporal most edge point. The sagittal depth provides generally a measure of the three-dimensionality of the lens element and lens edge.

In a particular preferred form the optical lens element includes front and rear co-varying surfaces, at least one of which having a varying surface power such that the mean through power of the lens element is constant to within ±0.75 D in the visual fixation field of the wearer with the optical axis of the lens element aligned with the visual axis of the wearer, said lens element conforming to the shape of the face of the wearer and having a sagittal depth Z of at least 10 mm, preferably between 10 and 20 mm.

By the term "co-varying surfaces" as used herein we mean two surfaces which have corresponding points in close proximity which allow substantially constant through-power even though the magnitude of the curvatures may vary substantially. This is achieved by having the curvature changes across the surfaces being nearly equal for each point of a corresponding pair. In this way, the curvatures at corresponding points may be seen to track each other from point to point, even though the physical surfaces may diverge. Co-varying surfaces may be defined by a set of mathematical constraints:

Constraints

For substantially all corresponding points on the front and back surfaces of the lens lying along lines passing through the center of rotation of the eye in the as-worn position:

$$P_{max\ front} + P_{max\ back} \approx F_1 + kA$$

$$P_{min\ front} + P_{min\ back} \approx F_2 + kA$$

for substantially all points on the lens, where $P_{max}$ is the maximum surface curvature in one principal meridian at a given point, $P_{min}$ is the minimum surface curvature along the other principal meridian at that point, $F_1$ is the desired prescription through-power in one principal meridian and $F_2$ is the through-power in the other principal meridian such that the difference between $F_1$ and $F_2$ provides the prescribed cyl correction; A=add in the progressive case (A≦3 D) and 0≦k≦1 (in the case of a piano lens both equations equal zero; in the case where there is no cylinder correction, $F_1=F_2$; and where the lens is not progressive of varifocal, KA equals zero)

and there exist regions of the lens such that for corresponding points $$|P_{max\ front} - P_{min\ front}| > 0.25D$$

$$|P_{max\ back} - P_{min\ back}| > 0.25D$$

and there exist at least two points $P_1$ and $P_2$ on a surface of the lens (typically horizontally spaced points within the useful aperture of the lens) such that $$|\overline{P_1} - \overline{P_2}| > 3D$$

where $\overline{P_1}$ is the mean surface curvature at $P_1$ and $\overline{P_2}$ is the mean surface curvature at $P_2$.

The optical lens elements of the present invention may be designed to have an optical axis which passes through a sphere point or fitting point of at least one of the surfaces. The surface curvature of the surface(s) varies outwardly from the sphere point.

The lens elements of the present invention may be worn by a wearer with an assumed line of sight: a visual axis substantially corresponding to the wearer's straight ahead gaze directed at an object at infinity. The lens elements may be designed to be glazed and worn so that the optical axis of the lens element is parallel to, and preferably colinear with the line of sight of the wearer.

With respect to the "optical axis" it should be understood that for a lens with two spherical surfaces, it simply is the line connecting the centers of curvature of the two surfaces. In a practical sense the optical axis is also the line about which the angle of refracted rays of light u' are least deflected from the angle of incidence u. In lenses with covarying surfaces, the definition of an optical axis is not so simple and such a lens might have more than one axis nominally satisfying this definition. For this application we define a primary optical axis as the line passing through the fitting point P. Preferably, for such an axis, the average slope $$m = \frac{\sum_{1}^{n} u'_n}{n}$$

of the rays $r'_1 \ldots r'_n$ in a bundle of refracted rays is minimum. (See FIG. 1) We here take a 'bundle' of rays to be all of the rays surrounding the axis within a small circular portion of the xy plane and distributed uniformly such that the sum of all x and y values of the ray points within the plane are equal to zero.

One may usually locate the optical axis of a manufactured lens by identifying the two points on the front and back surface which have coincident normals, for example by using an alignment telescope. These two points define the optical axis and in radially symmetric lenses with covarying surfaces this will be the correct procedure. In ovaliform lenses with spiral curvatures there may not be two such points so the optical axis must be located by finding the line about which bundles of incident and refracted rays has greatest symmetry. This might be done for example using an optical bench with a source of a narrow bundle of rays located at the center of curvature of a spherical mirror and the lens located between the source and mirror. In this method the lens could be tilted and decentered until the returning rays are symmetrically centered upon the source. The optical axis is then defined by the points on the lens surface intersected by the line defined by the chief ray of the source.

In a particularly preferred aspect, the extent of deviation of the deviating surface from a standard optical surface is related to the radial distance from the optical axis of the lens element.

In one embodiment of the present invention, the extent of deviation varies linearly, sinusoidally or a combination thereof, with radial distance. More preferably, the optical lens element may be generally radially symmetric, and in particular may take the form of a bowl, preferably an oblate or prolate bowl. In a still further preferred form, the deviating surface(s) exhibits no more than 1 meridian being circular in section.

In a more preferred form, the lens element is a bowl shape, which is radially symmetric about its optical axis and defined by a pair of rotationally symmetric, co-varying surfaces. An oblate bowl has a flat central portion and becomes increasingly steep away from the optical axis. A prolate bowl is most steeply curved at or near the optical axis and flattens out away from the optical axis toward the edge. The bowl may be defined by a radially symmetric spiral curvature (i.e. a curvature varying monotonically from the fitting point). Optionally the rim or annulus of the bowl may be blended smoothly into a region of reduced or zero power. The bowl shaped lenses have advantages arising from their rotational symmetry. The lenses may be fabricated from two wafer elements as disclosed by applicants in U.S. Pat. No. 5,187,505. If an astigmatism correction is provided by the lens, various prescribed cyl axis may be obtained by appropriate rotation, edging and glazing of a common lens blank, thus reducing lens stock requirements.

As stated above, the lens element may be of ovaliform shape. This shape may be selected in recognition of the fact that the human face has a strong curvature temporal of the eyes but not in the vertical direction. The ovaliform shape has different overall curvature change in the vertical and horizontal directions. This may be accomplished while maintaining colinearity between the optical axis of the lens and the wearer's line of sight thereby obviating the need for axis tilt or offset.

In the bowl and ovaliform shapes, the lens element surfaces may be described as deviating from a reference sphere defined at a sphere point of the surface. The deviation may be such that the curvature of the lens element surface becomes gradually less than the curvature of the reference sphere. Alternatively, the deviation may be such that the curvature of the surface becomes gradually more than that of the reference sphere, especially a curvature which would spiral inwardly to a central point if extended. A prolate bowl may for example deviate from approximately 3 to 10 mm from the reference sphere at a location 30 mm from the sphere point.

Preferably the lens element has a temporal region outside the visual fixation field wherein the mean through power of the lens is gradually reduced.

More preferably along a horizontal meridian of the lens element, the surface powers of co-varying surfaces increase at a location temporal of the optical axis, then decrease in order to bend the lens element around the face of the wearer.

Alternatively, the surface powers of the co-varying surfaces vary along a vertical meridian and local maxima of surface power occur at locations above and below the optical axis of the lens.

In a preferred aspect, wherein the optical lens element is of ovaliform shape, and is generally spherical in a central region up to approximately 20 mm, preferably up to approximately 30 mm, sagittal depth, the curvature of the surface along the vertical meridian is maintained within approximately ±0.5 D of the curvature of the surface along the horizontal meridian. Preferably the curvature along the vertical meridian is maintained within approximately ±0.3 D of the curvature of the surface along the horizontal meridian.

Applicants have discovered that for such ovaliform shaped lenses the mean surface power may be permitted to deviate from the reference surface, as required, without generating significant surface astigmatism.

Geometric Description

The preferred bowl-like lens elements are radially symmetric and may be described in cylindrical coordinates $(r,\theta,z)$ where the sagittal depth Z is a function of r alone;

$$Z(r,\theta)=Z(r)$$

The Sag is expressed in parametric form $$Z(r) = \sum_{2n=0}^{4} A_{2n} * r^{2n}$$

which is of the generic form used to describe a spherical surface. Asphericity as normally introduced in lens design is achieved by selecting the parameters $A_{2n}$ to deviate from the relationship that specifies a surface systematically as spherical, namely $$A_4=(A_2)^3, A_6=2*(A_2)^5, \text{ and } A_8=5*(A_2)^7$$

For a simple sphere, $A_2$ is defined by the dioptric base curve D of the sphere and the refractive index n, $$A_2=D/2(n-1)$$

In the case of a bowl-shaped element of the present invention, however, a target surface may be set by making this parameter itself a systematic function of radial distance;

$$A_2=P_0+K(r)$$

wherein the function $K(r)$ is desirably continuous, with well-behaved first or second derivatives according to the shapes of interest.

Surface Power

The tangential power of a surface described in this way is $$T(r)=(n-1)*d^2Z/dr^2*[1+(dZ/dr)^2]^{-3/2} \text{ and}$$

the sagittal power is $$S(r)=(n-1)*dZ/dr*[1+(dZ/dr)^2]^{-1/2}/r.$$

Close to the axis (small values of r), the power equations may be expanded in the following approximate equations;

$$T_{(r\to 0)}/(n-1)=2[P_0+K(r)]+4r*dK/dr \text{ and}$$

$$S_{(r\to 0)}/(n-1)=2[P_0+K(r)]+r*dK/dr$$

which are equal at r=0. Every such surface is therefore spherical at the axis r=0, unless the function form chosen for K(r) has a discontinuity at the axis, so that its derivative diverges.

The two components of power change steadily away from the axis according to the following approximately equations;

$$dT/dr_{(r\to 0)}/(n-1)=4dK/dr=6r*d^2K/dr^2-24r[P_0+K(r)] \text{ and}$$

$$dS/dr_{(r\to 0)}/(n-1)=dK/dr=r*d^2K/dr^2-8r[P_0+K(r)]$$

For a conventional surface where K is constant or zero, the tangential power changes three times as fast as the sagittal power. For a surface where the first derivative of K dominates the surface form, tangential power changes four times as fast as the sagittal power.

The particular convenience of this representation is that it allows a complex surface to be seen as the departure from a model spherical or toric form and sets up the mathematical analysis in a form which is familiar in lens design. However it is by no means unique and similar results may be achieved by working with a generalised set of polynomial coefficients $A_{2n}$ above (including odd and even terms).

It may be seen that the tangential and sagittal powers vary to first order in the same form as the function $K(r)$. If a linear ramp [for example $K(r)\propto r$] is used, the surface powers rise approximately linearly. If a sinusoidal form [$K(r)\propto\sin(\pi r/2r_0)$] is used, the surface powers rise approximately sinusoidally to a maximum at a radial position $r=r_0$. In practice, $K(r)$ needs to be vary with a r over a finite area of a lens surface, for example within a disc or radius $r_0$, but there may also be areas where it is constant, for example in the annulus beyond $r_0$. In order to set the value beyond $r_0$, one needs to compute the exact power changes out to $r_0$ and then fit the appropriate value of $K(r)$ to the outer region of the lens, smoothing the transition if required.

In this way, a pair of rotationally symmetric surfaces may be described and analysed to bound a powered lens, both surfaces being reminiscent of the form of a bowl. An oblate bowl has a flat central portion and becomes increasingly steep away from the axis, optionally blending smoothly into a spherical edge or annulus. A prolate bowl is most steeply curved at the axis and flattens out away from it towards the edge. To zero order, the same function K(r) is applied to both surfaces bounding the lens body and the result is akin to physically bending a powered lens from one notionally spherical shape to another of quite different shape. To achieve best optics off-axis, however, one or other surface has to be optimised by systematic adjustment of the surface parameters to achieve the best distribution of mean through power and astigmatism, frequently judged by constructing blur and RMS power error plots after ray trace analysis of the lens.

Cyl Correction

Lens elements designed as bowls may be provided with one surface, typically the back surface, that carriers the astigmatic correction required to complete an Rx. The considerations explained in the U.S. patent application Ser. No. 09/223,006, now U.S. Pat. No. 6,142,624, referred to herein, apply equally in lenses of a bowl configuration and analogous solutions may be employed to describe the astigmatic correction applied to the mean through power of the powered lens, such as describing the surface height function of the back surface as $$Z(r,\theta)=R(r,\theta)-\sqrt{R(r,\theta)^2-r^2}$$

and where $$R(r,\theta) = \frac{R(r,0)*R(r,\pi/2)}{R(r,\theta)\sin^2\theta + R(r,\pi/2)\cos^2\theta}$$

is the radial curvature along the meridian at $\theta$, and the values $\theta=0$ and $\pi/2$ represent the principal meridians.

Selection of Surface Powers

In respect of the preferred rotationally symmetrical bowl-like lens elements, analysis of selection of surface powers may be illustrated with resort to Morris-Spratt diagrams, whose properties are discussed in detail in the aforementioned U.S. patent application Ser. No. 09/223,006, now U.S. Pat. No. 6,142,624.

Preferably the bowl-like lens elements are generally spherical in a central region with a diameter of at least approximately 30 mm.

Figure 2:
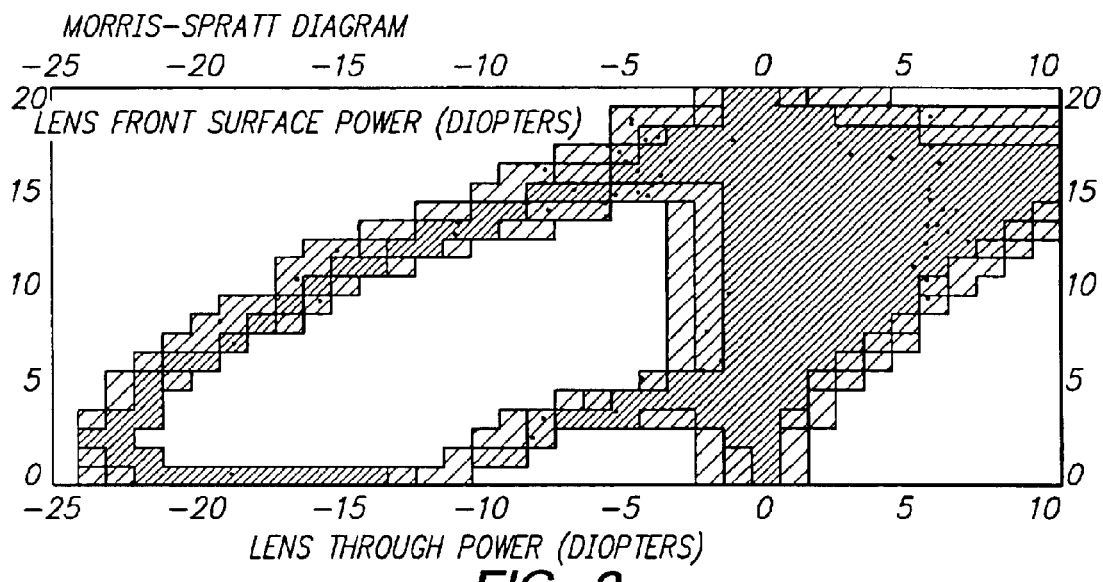
FIG. 2 is a Morris-Spratt diagram of a type illustrated in U.S. Pat. No. 6,142,624.

According to the Morris-Spratt diagram, FIG. 2 hereto, there is considerable freedom of choice for from surface power available over a range of prescription powers in the general region where the Ostwalt and Wollaston Sections of Tscherning's ellipse merge. Generally acceptable optical performance, as judged by RMS blur analysis, can be expected for designs which fall between the two curves A and B in FIG. 3. The design scheme for lenses described in the aforementioned United States application fall generally within the oval C in FIG. 3. There is another systematic field extending vertically at zero mean through power that is exploited widely in non-prescription eyewear. The optical quality of different design options may be assessed by referring to FIG. 4. In a design such as those described in the aforementioned U.S. patent application Ser. No. 09/223,006, now U.S. Pat. No. 6,142,624, one may elect to set all front curves constant across the Rx range, per line D in Scheme 1. However, there are extended areas in which design parameters may be set. For example in a prescription range from approximately −1.5 to +4 D, we can select curvatures between approximately 7 and 18 D with absolute confidence in the optics of the final optimised lens design. For lenses having a bowl format, the curvature may vary systematically within these limits and can follow the same function change for all Rx's in the field. Outlined at A is a more desirable field in which to operate, defining bowls spanning Rx's from −4 to 4 D, while outlined area C extends the minus range to −6 D with the prospect of some compromise in the high minus prescription range for oblate bowls. Prolate bowls with central curvature of 14 D or above are preferred for the high minus Rx range.

Back Surface Curvature

A very important consideration with the optical lens elements of the present invention for wrap around applications is the matter of clearance between the eyelashes and the back surface of the lens, especially in the direction of forward gaze. Lens elements having plus Rx show greatest tendency for so-called "lash-clash", because the back surfaces tend to be flatter as the Rx becomes more positive. For example a +5 D Rx made from a lens with 8 D base curve has a back surface curve of 3 D, whereas a −5 D Rx made from a 2.50 D base curve lens has a back surface curve of 7.50 D.

Scheme 2 in FIG. 4 shows a sequence of lines along which a design specification would move if selected to match a criterion of constant back surface curve, the numbers 0, 5, 10 and 15 denoting relevant curvatures. In this case, there would be different front curves for every Rx. In Scheme 3 of FIG. 4, we show as the curve α, the actual design trajectory of conventional prescription lenses sold by Applicants and their competitors. The rise of front curvature with increasingly positive Rx is not quite as fast as would deliver a constant back surface curve, but does approach this condition. We have found that a similar rise in front curve is necessary for bowl lenses in the plus Rx range to provide adequate clearance around the eyes and eye leashes. Two appropriate design target schemes for the mean front curvature of bowl type lenses are shown as the lines β and γ in Scheme 3 of FIG. 4.

Accordingly in a preferred aspect of the present invention there is provided an optical lens element series wherein each lens element includes a first surface; and a second surface of complementary curvature;

at least one surface exhibiting significant deviation in curvature from a standard optical surface;

the first and second surfaces in combination defining an optical zone exhibiting substantially constant mean through power along at least one meridian each lens element having a front surface varying with mean through power required; and a common back surface.

Preferably each lens element in this embodiment exhibits plus power.

Preferably each optical lens element is of radially symmetric, bowl-like shape; the varying front surface and common back surfaces being selected by reference to the Morris-Spratt diagrams as herein described.

Alternatively, in this preferred aspect, there is provided an optical lens element series wherein each lens element includes a first surface; and a second surface of complementary curvature;

at least one surface exhibiting significant deviation in curvature from a standard optical surface;

the first and second surfaces in combination defining an optical zone exhibiting substantially constant mean through power along at least one meridian;

each lens element having a common front surface; and a back surface varying with mean through power required.

Preferably each lens element in this embodiment exhibits minus power.

Preferably each optical lens element is of radially symmetric, bowl-like shape; the common front surface and varying back surfaces being selected by reference to the Morris-Spratt diagrams as herein described.

The front and/or back surfaces may be selected by reference to the Morris-Spratt diagrams, FIGS. 2 and 3 hereto, as discussed in more detail below.

The lens element series, by providing constant front and/or back surfaces, may permit a reduction in inventories. These inventories may be further reduced by forming the lens element as laminate from lens wafers, as discussed below.

The lens element series may be of the type described in International Patent Application PCT/EP97/00105, the entire disclosure of which is incorporated herein by reference.

Ovaliform Lens Elements and Spiral Bends

The designer's ability to achieve very extreme shapes with rotationally symmetric bowls is limited by the strict relationship ensuing between tangential and sagittal powers. This becomes more evident the higher the changes imposed on base curvature and the higher the lens mean through power required to suit a prescription (Rx). There is also the practical issue that the human face has strong curvature horizontally in the vicinity of the eyes, but not vertically. Attractive and useful non-corrective sunglass lenses and shields of wrap around style frequently employ different curvatures vertically and horizontally. In accordance with this aspect of the present invention, it is possible to achieve this object, again maintaining the correct orientation of the powered lenses and providing a high quality prescription and having clear performance gains over the prior art.

In this embodiment, the optical lens element may not exhibit visual symmetry. Rather the first and/or second surfaces may be seen to deviate from toric surfaces, rather than from spheres, $$Z(r,\phi)=Z(x,y)$$

The Sag is expressed in parametric form $$Z(x, y) = \sum_{2n=0}^{4} A_{2n} * x^{2n} + \sum_{2n=0}^{4} B_{2n} * y^{2n}$$

Where, for example $A_2 = P_0 + K(x)$, and $B_2 = P_0$ so that there can be produced a changing base curvature in the direction of the Ox axis and the curvature orthogonal to it is held substantially constant. In this case, for example, the Ox axis corresponds to the horizontal axis and Oy is vertical. In an entirely analogous way to the shape changes of a BOWL as described above, an optical lens element of this form remains somewhat flat in the vertical sense but reaches increasingly tightly in the horizontal direction to spiral in towards the temples to wrap around the field of vision and sit snugly against the face.

A useful alternative representation of the above design form is to consider the surface as a distortion of a sphere, whence $$Z(x,y) = R - \sqrt{(R-z(x))^2 - y^2}$$

where R is the radius of the spherical surface and z(x) is the surface height variation along the Ox axis.

In a still further alternative aspect of the present invention, the deviating surface may vary in both the orthogonal and horizontal direction. If closer fit against the cheeks is desired, a similar but less aggressive spiral bend may be imposed in the vertical direction also. It is important when designing such spiral bends to ensure that the vertical curvature does not crash into the eye brows while attempting to spiral in to the cheeks. Similarly, it is often desirable to avoid inward bending of the lens at the nasal limit, to create a lens form which is relatively flat from the nasal limit to the line of sight, beyond which the spiral takes effect.

This is achieved mathematically by making the lens asymmetric, as for example if $A_2 = P_0$, for $x \leq 0$ $= P_0 + K(x)$ for $0 < x \leq x_0$ $= P_0 + P_1$ for $x_0 < x$ so that the base curvature has a first lower value to the nasal side of the optical axis (line of direct gaze) and a second high value toward the temporal limit, with a smoothly increasing base curvature between the two.

In a still further alternative approach, the lens element may be designed so that its curvature is lowest at the nasal limit and changes continuously across the line of direct gaze, for example;

$A_2 = P_0 - K(x)$ for $x \leq 0$ $= P_0 + K(x)$ for $0 < x \leq x_0$ $= P_0 + P_1$ for $x_0 < x$ In a further aspect, the optical lens element may exhibit an optical extension beyond the central optical zone. Accordingly, in this aspect of the present invention, there is provided an optical lens element including a first surface; and
a second surface,
the first and second surfaces in combination defining
a central optical zone; and
an optical zone extension extending from the central optical zone towards the temporal region of the lens and wherein the absolute value of mean through power of the lens smoothly decreases gradually along at least a horizontal meridian across the extension such that unwanted optical astigmatism is significantly reduced.

Preferably the optical lens element includes
a first surface; and
a second surface of complementary curvature
the first and second surfaces in combination defining a central optical zone of substantially constant mean through power;
an optical zone extension extending from the central optical zone towards the temporal region of the lens.

Preferably the first and second surfaces exhibit a substantially equivalent change of curvature in the optical zone extension such that the mean through power remains substantially constant.

More preferably the mean through power decreases to substantially zero across the extension.

In a preferred aspect, the cental optical zone may be corrected for forward distance vision. The central optical zone may bear a vertical meridian, optionally decentred relative to the optical centre of the lens element.

The optical zone extension of the optical lens element may also be corrected for distance vision. The optical zone extension may take the form of a channel, preferably a relatively broad channel, in which the curvature decreases smoothly towards the temporal region of the lens according to a predetermined mathematical formula. This allows the lens to wrap around the forward visual field whilst giving direct control over the thickness and physical reach thereof toward the temporal limits.

In a preferred form, the optical zone extension tapers in width to avoid contact with the wearer's temples.

The wearer is thus provided uninterrupted ability to detect and locate distant objects throughout the channel. Optionally, the vertical width of the channel may decrease in accordance with the reducing need for vertical movement of the eyes towards the temporal extreme of vision. Preferably the lens surfaces are each substantially umbilic over the full length of the horizontal meridian of the lens element, especially within the temporal extension beyond the central optical zone.

The mathematical formula may be such as to cause increasing accentuation of the lens curvature toward the temporal region of the lens. Consequently the optical lens element may wrap around the forward visual field whilst allowing ample clearance between the eye lashes or temples of the wearer and the inner surface of the prescription lens.

The wearer may then be provided with uninterrupted prescription correction for distance vision throughout the optical zone extension.

In a further preferred aspect, the second or back surface of the optical lens element will maintain constant curvature from the centre of the lens to its temporal extreme and the changes in mean through power will be achieved by alteration of the front curve alone.

Figure 5:
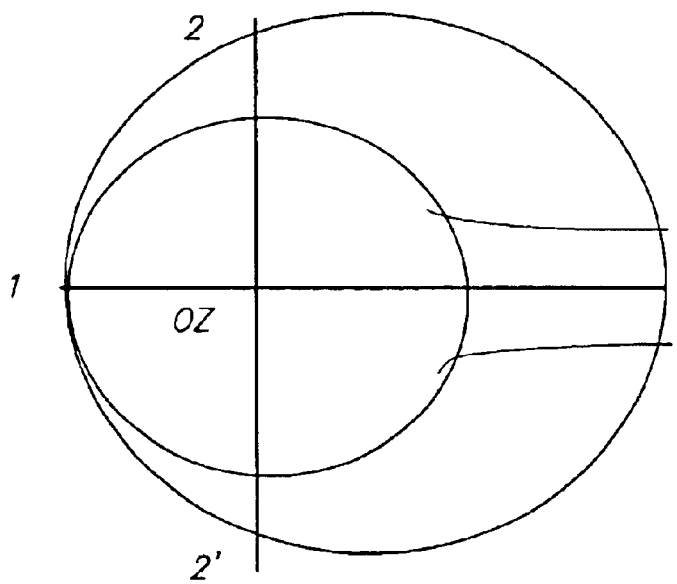
FIGS. 5 and 6 are plan views of a lens element in accordance with disclosed examples.

An optical lens element according to this aspect of the present invention is schematically illustrated in FIG. 5 below.

The optical lens element has two optical zones, both corrected for distance vision, separated spatially along the horizontal meridian of the lens, 1–1'. The zones comprise firstly an optical zone OZ for forward vision which is intersected by the vertical meridian, 2–2', which meridian may be decentred with respect to the lens blank. The second zone, the optical zone extension, is a broad channel in which the curvature changes smoothly according to a predetermined mathematical formula in order to cause smoothly decreasing mean through power toward the temporal region of the lens.

The wearer is provided uninterrupted prescription correction for distance vision throughout the channel. Optionally, the vertical width of the channel may decrease compared to that of the central zone CZ in accordance with the reducing need for vertical movement of the eyes towards the temporal extreme of vision.

In a preferred aspect, the optical lens element may exhibit mirror symmetry around the vertical meridian, e.g. line 2–2', in FIG. 5. In this embodiment, the finished lens cut-out exhibits a portion of the channel CZ reaching toward the nasal side of the lens.

This has several practical advantages:

1. Lens elements may be provided with generally spherical symmetry about the optical axis through the central optical zone, allowing the identification of a surface of rotation wholly within the body of the lens element so that the latter may be made in two separate wafers as discussed below. The lens wafers may be oriented by rotation with respect to each other to provide the desired orientation for a wearer's astigmatic correction. The final lens may be completed by laminating the two parts together.
2. Many fashionable non-prescription sunglasses use dual lenses or unitary lenses that conform to the human face both laterally and vertically by having generally cylindrical (also called toric) shape or generally conical shape. Lens elements with mirror symmetry about the central optical zone meridian may thus provide Rx lenses for left or right eyes from one inventory item for each desired Rx.

In a further preferred embodiment, the central optical zone may be further modified to be of the progressive type.

Accordingly, in this aspect of the present invention there is provided a progressive optical lens element including a first and
a second surface of complementary curvature;
at least one surface exhibiting a deviation in curvature from a standard optical surface,
the first and second surfaces defining
a central optical zone exhibiting substantially constant mean through power; and
an optical zone extension extending from the central optical zone towards the temporal region of the lens and wherein the mean through power of the lens decreases gradually along a horizontal meridian across the extension;
the central optical zone including
an upper viewing zone having a surface power to achieve a refracting power corresponding to distance vision;
a lower viewing zone having a greater surface power than the upper viewing zone to achieve a refracting power corresponding to near vision;
a corridor of relatively low surface astigmatism connecting the upper and lower zones, said corridor having a surface power varying from that of the upper viewing zone to that of the lower viewing zone.

The upper viewing or distance zone may be positioned primarily above the horizontal meridian of the progressive optical lens element.

The lower viewing or reading zone may be positioned below the horizontal meridian of the progressive optical lens element.

Figure 6:
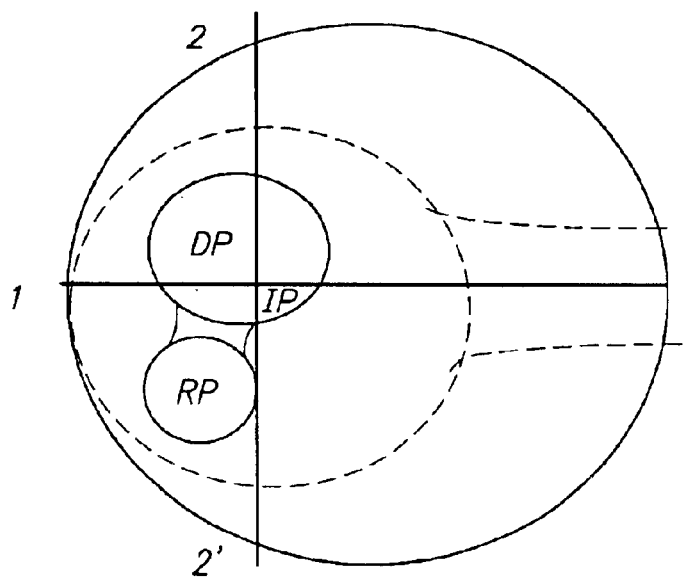

A progressive optical lens element according to this aspect is schematically illustrated in FIG. 6 below. The central optical zone CZ of the optical lens element illustrated in FIG. 5 is further modified, in this embodiment, to provide a progressive addition lens form.

This may be provided on the front and/or back surface providing an upper viewing or distance zone portion DP for distance viewing primarily above the meridian 1–1' and a lower viewing or reading zone RP, optionally horizontally insert relative thereto, connected to the distance portion DP by an intermediate portion IP or corridor of increasing lens power accessible to the wearer in down-gaze below the horizontal median 1–1'.

Alternatively, but less desirably, the reading portion RP may be a physically distinct segment such as a flat top bifocal or trifocal segment giving functionality for near work but lacking optical and cosmetic continuity with the distance portion within the central zone.

In a still further aspect of the present invention, the optical lens element may further include a nasal optical zone exhibiting a change of curvature across substantially the entire width of the zone.

The nasal optical zone may extend from the nasal side of the central optical zone to the edge of the optical lens element. Desirably, the nasal optical zone may be corrected for distance vision. The nasal optical zone may take the form of a channel, similar to the optical zone extension.

More preferably, the nasal optical zone may form a broad channel in which the curvature decreases smoothly according to a predetermined mathematical formula.

Consequently the optical lens element may exhibit increasing forward accentuation of the surface curvature of the lens thus causing it to avoid physical engagement or contact with the nasal corner of the eyes or the nasal bridge. The remainder of the optical lens element may maintain close proximity with the facial structure of the wearer. The optical lens element further maintains ample clearance from the inner surface of the prescription lens.

The wearer is provided uninterrupted prescription correction for distance vision throughout both channels. Obviously lenses of this form cannot be made with mirror symmetry about their vertical meridians. However, the physical shapes they offer are especially suited to fashionable prescription visors, wrap around shields, or dual lens renditions of similar fashion and style objectives.

Figure 3:
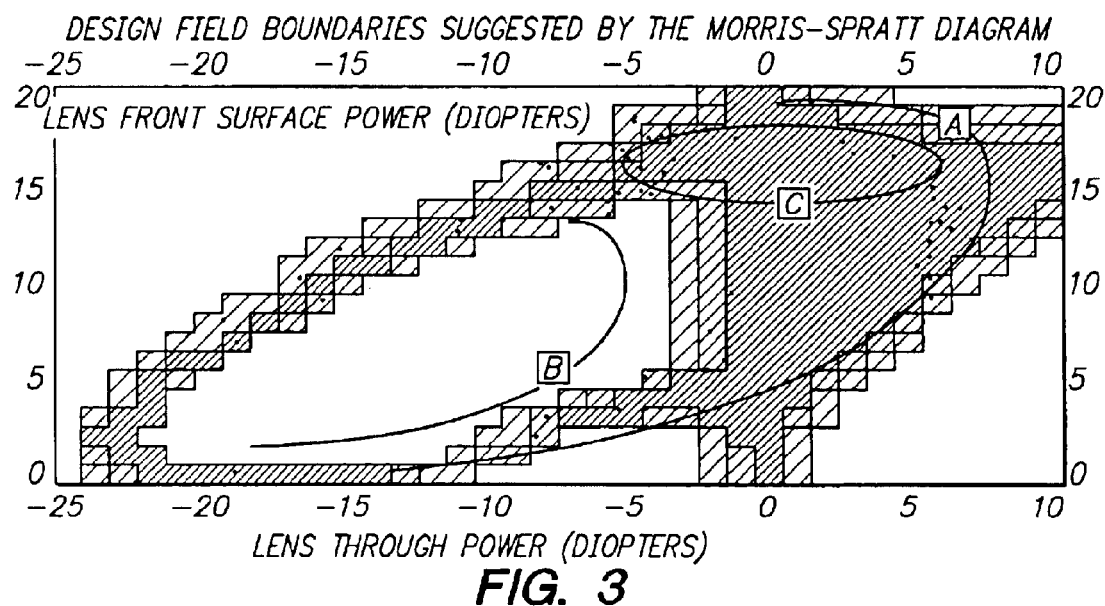
FIG. 3 is a Morris-Spratt diagram illustrating various lens design approaches.
Figure 7A:
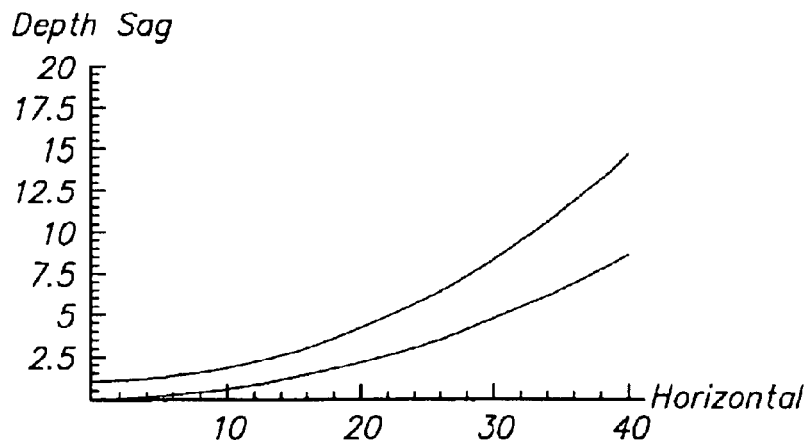
FIGS. 7a–d, 8a–d, 9a–d, 10a–d, 11a–d, 12a–b, 13a–c, 14a–b, 15a–b, 16a–c, 17a–c, 18a–c, 19, 20, 21a–c, 22a–c, 23a–c and 24a–c are plots of various lens parameters as a function of horizontal dimension in accordance with various disclosed examples.
Figure 7B:
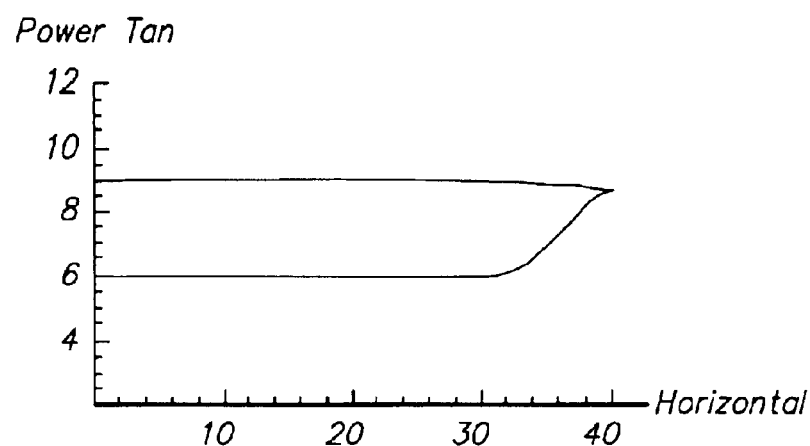
Figure 7C:
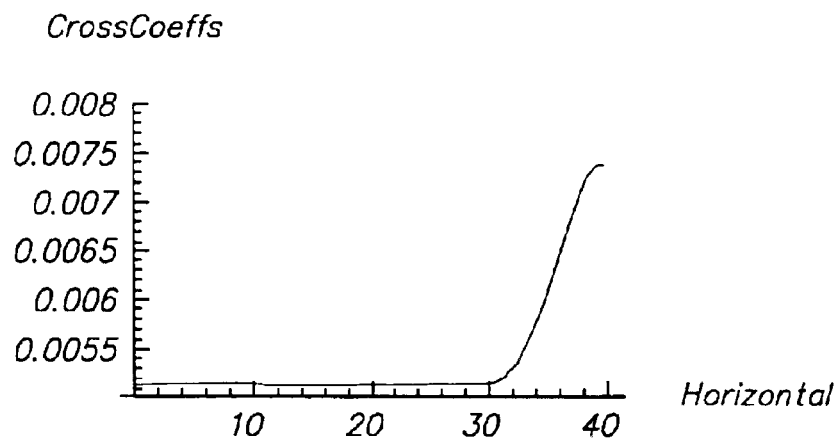
Figure 7D:
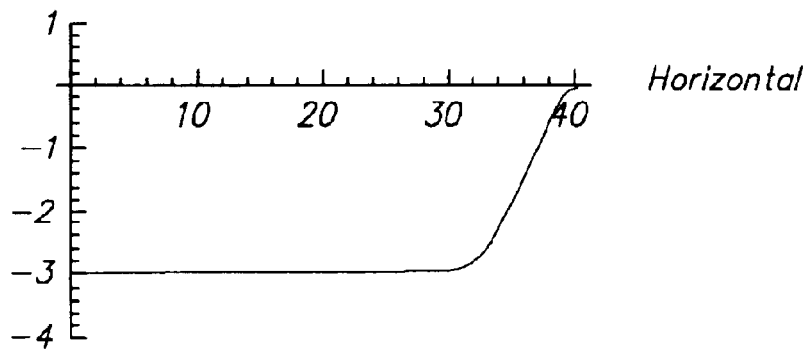
Figure 8A:
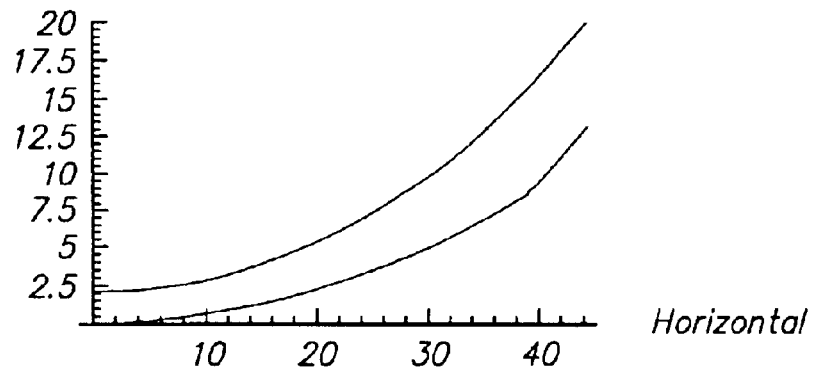
Figure 8B:
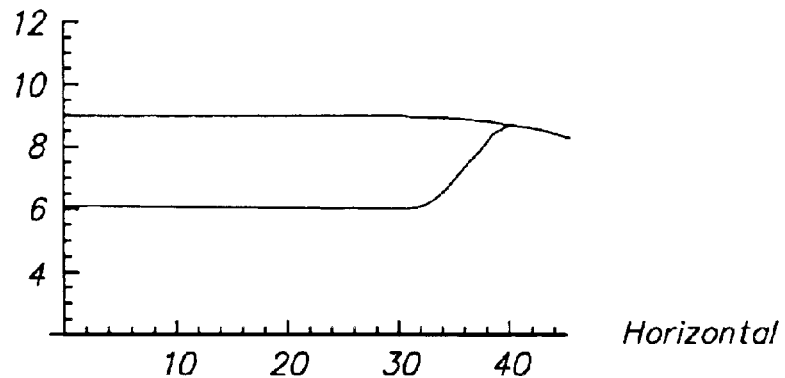
Figure 8C:
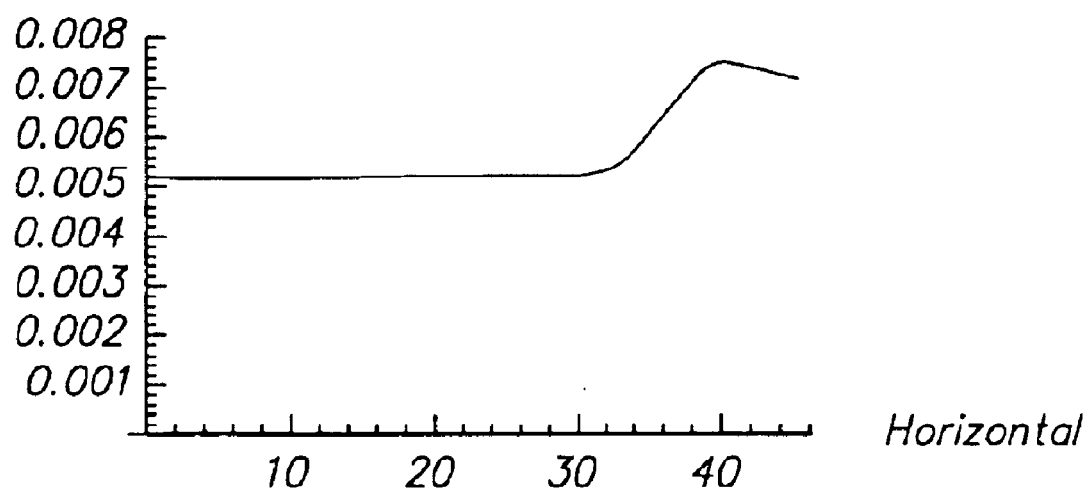
Figure 8D:
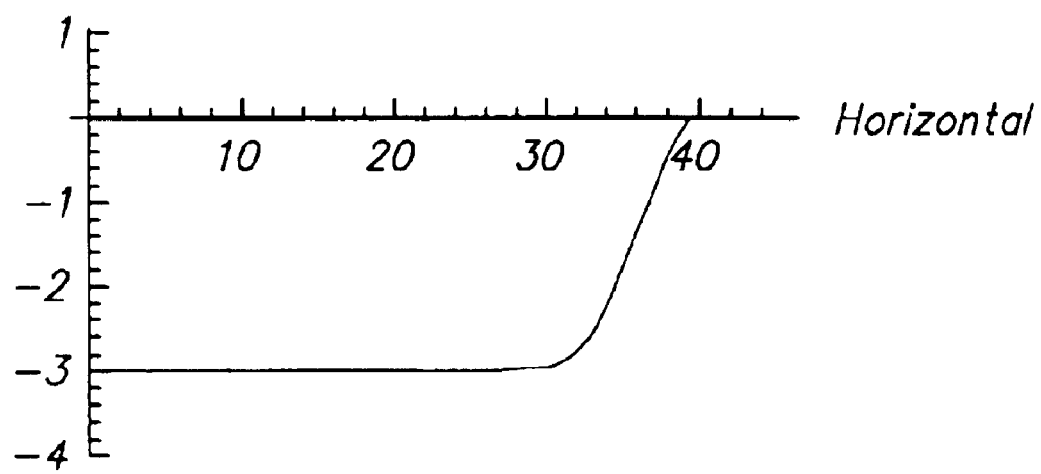
Figure 9A:
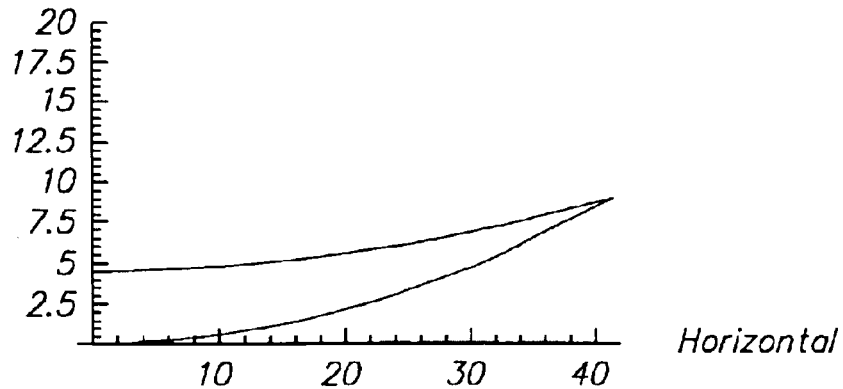
Figure 9B:
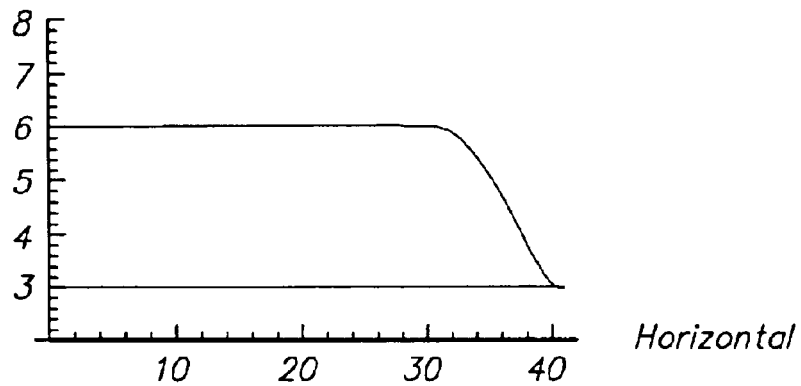
Figure 9C:
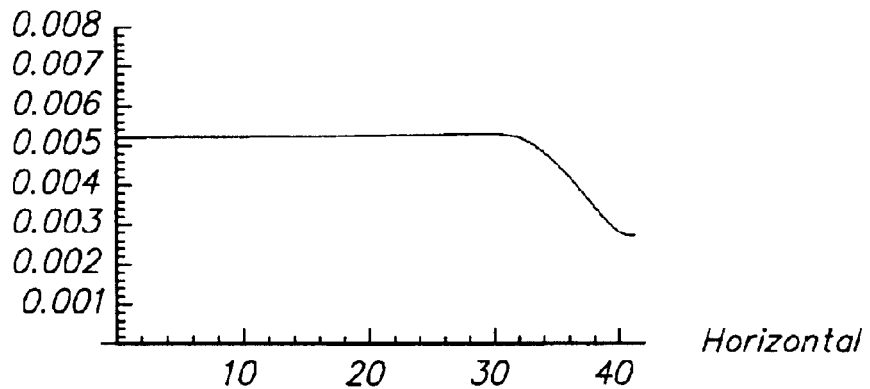
Figure 9D:
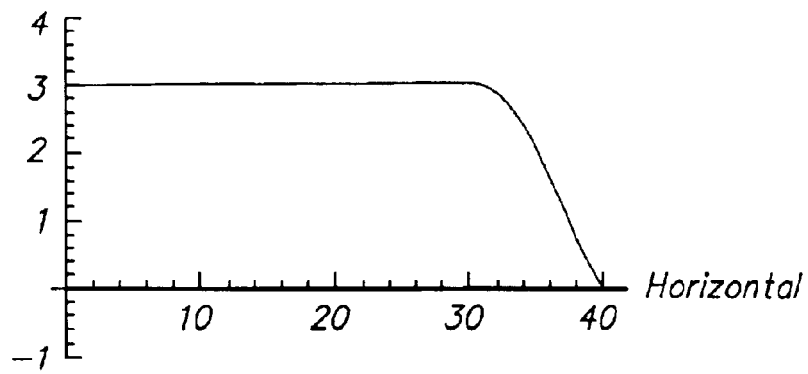
Figure 10A:
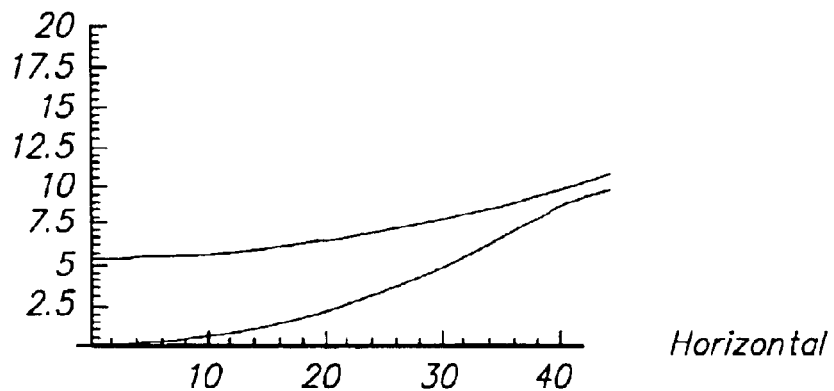
Figure 10B:
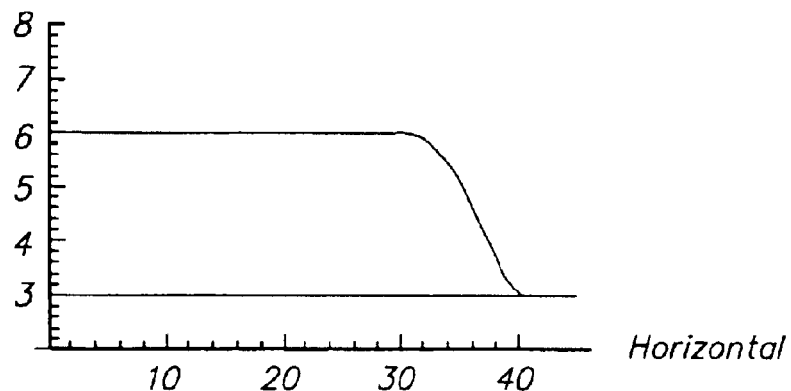
Figure 10C:
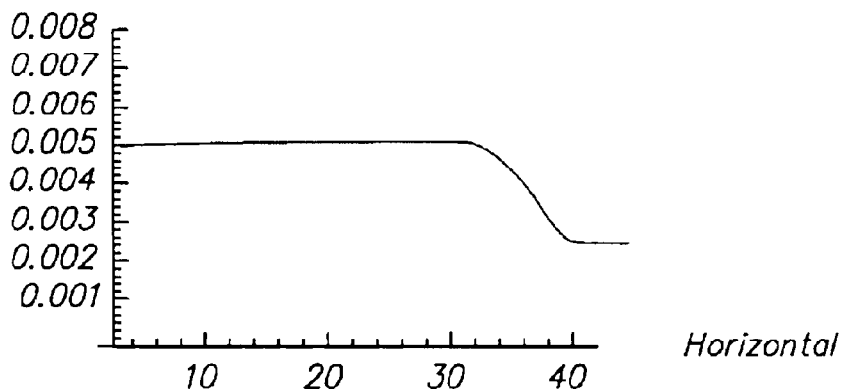
Figure 10D:
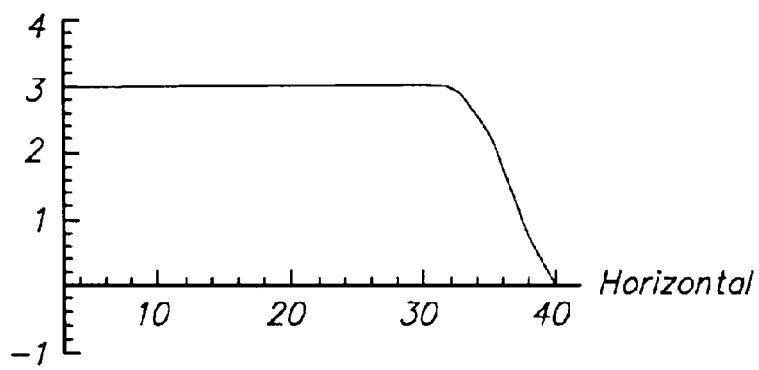

Optionally the central optical zone of the optical lens element in this embodiment may similarly be modified according to the scheme of FIG. 3 to exhibit a local progressive addition lens surface or multi-focal lens segment to provide for close or near vision.

The optical lens elements according to the present invention may accordingly provide one or more of the following features;

1. Full-field wrap around styling with flexible choice of the general shape of the product to appear spherical, conical, cylindrical and the like according to conventional non-prescription sunglass lens design principles whilst nevertheless delivering a comprehensive Rx range to suit at least 95% of wearers,
2. Wrap style lenses which depart substantially from all prior shape conventions in ophthalmic lens design principles and which represent totally new style options for lenses and frames beyond any of those employed in the non-prescription lens category and nevertheless deliver uncompromised prescription optics, 3. No abrupt optical changes such as change in curvature or surface slope that may be visible to an observer, thereby allowing use of products as clear dress eyewear, sports goggles and the like if desired,
4. "Conventional" base curves in the region of the central optical zone, meaning that the forward base curve is near or below the Ostwald section of Tschering's ellipse, thereby eliminating bug-eyed appearance and facilitating correct fit of the eyewear to the wearer's pupil locations,
5. The availability of progressive addition or multifocal correction in the central zone by lens surface alteration functionally identical to rendering those features to a spectacle lens of conventional curvatures near or below the Ostwald section,
6. Mean surface curvatures consistent with known art for applying anti-reflective coatings, hard coatings or mirrors coatings to enhance the utility and appeal of the products, and
7. Optical design beyond the optical zone extension may preserve accurate recognition of objects in the extreme limits where the human visual can no longer fixate objects but nevertheless depend upon their identification to activate physical response stimuli (especially physical movement and re-orientation of the direction of sight).

Optionally, the central curvature may be unusually high, in which case the design between central optical zone and optical zone extension is configured to decrease the curvature smoothly according to a predetermined mathematical function and so overcome physical contact between the rear prescription surface and the wearer's eyes or temples.

In a further aspect of the present invention, the curve or shape of at least one surface of the optical lens element may be varied over a significant range, whilst maintaining the power of the lens substantially constant.

Convention in the prior art with respect to spectacles and sunglasses is to employ conic sections as the basis of lens design. That is, lenses have to be overall spherical, cylindrical, conicoidal or toroidal.

In contrast, Applicants have discovered a fundamental principle of lens design which allows the specification in the first instance of unusually curved surface shapes that may fit the above definitions or desirably, which are totally new shapes for the category of ophthalmic products.

In particular, Applicants have shown the ability to take lenses of known, e.g. spherical or aspheric form, and bend them mathematically by approximately 15 mm at the limit of the visual fixation field (approximately 50° off axis, which corresponds to about 30 mm aperture width in the horizontal direction), thereby wrapping around Rx corrected temporal vision, and retain mean power and near horizon blur within approximately 0.25D or less.

In this embodiment, the curvatures of the first and second surfaces are smoothly varying functions that allow the surfaces of the optical lens element to deviate substantially from, for example, a conventional conic section whilst providing between them substantially constant mean through power through the lens.

Thus the first and/or second conventional functions may be of a conventional conic type, defined as a conic section of rotation, given by the following equation describing the sagittal depth z of the lens in terms of distance from the optical axis OZ;

$$z(x, y) = \sum_{n=1}^{4} A_{2n} r^{2n}$$

where
$r^2 = x^2 + y^2$,
$A_2 = 1/2R$, $A_4 = p/8R^3$, $A_6 = p^2/16R^5$, $A_8 = 5p^3/128\ R^7$,
R is the radius of curvature in millimeters,
$D = (N-1) \cdot 10^3/R$ is surface power, or Base Curve, in Dioptres, and
N is refractive index of the lens material.

The parameter p is an aspherizing coefficient. If p=1, the surface is spherical. If p=0, the surface is parabolic. For negative values of p, the surface is hyperbolic and for positive values of p it is elliptical. Most lens designers use the representation in terms of p for initial form functions only and prefer to optimise a lens design by direct manipulation of the coefficients $A_{2n}$.

According to the present invention, Applicants achieve far greater control over surface shape than manipulation of the coefficients allows.

Applicants employ a design approach wherein the curvatures of front and back are smoothly varying functions that allow the surfaces of the lens to depart substantially from a conic section whilst still defining between them smoothly varying mean through power through the lens.

That is to say, the optical lens element according to the present invention is an Rx lens of conventional form within a central aperture which is distorted mathematically so as to change their shape, without discontinuity in mean through power outside that aperture.

As stated above, the conventional mathematical formulation of the first and/or second surfaces may be modified by addition of a variable function. Thus in this embodiment, the first and/or second surfaces of the optical lens element may be defined by the following formula:

$$z(x, y) = \left[\sum_{n=1}^{4} A_{2n} x^{2n}\right] - f(x/R_0)\left[\sum_{n=1}^{4} [A_{2n} - B_{2n}]x^{2n}\right] + \left[\sum_{n=1}^{4} A'_{2n} y^{2n}\right]$$

Where the function $f(x/R_0)$ is a conforming function which imposes a second conic section with coefficients $B_{2n}$ on the first surface with coefficient $A_{2n}$. Preferably, the second (rear) surface of the lens is defined in its entirety by the coefficients $B_{2n}$.

The lens is distorted smoothly outside a central aperture $x \leq R_0$ having asymptotically vanishing effect at $x = R_0$ and maximum effect at the lens edges, utilising the conforming function:

$$f(r/R_0) = 0.75\left\{1 - \left[1 + \sum_{n=2}^{4} R_{2n}((r - R_0)/2R_0)^{2n}\right]^{-m}\right\} \quad \text{for } r > R_0$$

$$= 0 \quad \text{for } r \leq R_0$$

This function and both its first and second derivatives vanish at $r = R_0$.

Starting at x=28 mm, the front surface of the optical lens element begins to deviate toward the rear prescription surface, thereby reducing the rate at which the difference in front and back Sag depths grows. Simultaneously, the curvature of the front surface increases smoothly and approaches that of the back surface at the outermost horizontal distances on the lens.

An example of such a design is given in the following FIG. 7 below for a six base lens with −3 D mean through power.

Note the existence of precise control over the surfaces and corresponding mean through powers out to the edge of the lens element, so that the Rx power is constant across the aperture of the central zone and thereafter declines in a smooth fashion without discontinuity in the rate of change of power along the entire axis 1–1'.

In an alternative embodiment of the present invention, where an optical lens element, for example a progressive optical lens element, exhibits unwanted optical astigmatism in a region of the lens, for example towards the periphery of the lens element, the optical zone may simply function to reduce the excessive surface power of the lens.

As stated above, the optical lens element may be a progressive optical lens element. The peripheral optical zone may extend generally along the horizontal meridian of the optical lens element. The peripheral optical zone may appear on opposite sides of the central optical zone generally along the horizontal meridian.

The optical zone extension may correspondingly extend from opposite sides of the central optical zone of the lens element.

The optical zone extension may be represented by a suitable mathematical formula including a conforming function selected to substantially balance the unwanted optical astigmatism of the peripheral optical zone.

Thus, in this embodiment localised surface correction may be applied to a progressive addition lens element near the ends of the horizontal meridian. For example, prior art lenses manufactured by several ophthalmic lens suppliers such as SOLA, Essilor, and American Optical, show intruding ridges of excessive front surface power extending inward from the ends of the meridian in narrowing wedge shaped forms. The effect is that a wearer experiences both growing astigmatism and unaccommodatable power that further decreases the utility of the lens in the peripheral horizon.

If the front surface Z(x,y) near the horizon of such a lens element is represented in a perturbed form where change is preferably applied to the temporal periphery as follows:

$$z(x, y) = Z(x, y) + f'(y/R'_0) * f(x/R_0) \left[ \sum_{n=1}^{4} C_{2n} x^{2n} + \sum_{n=1}^{4} C_{2n} y^{2n} \right]$$

$$\text{where } f'(y/R'_0) = \left[ 1 - \sum_{n=2}^{4} R'_{2n}(y/2R'_0)^{2n} \right]^{-m}$$

The required surface modification may be interpreted as the reverse of the design approach in FIG. 7.

Direct measurement of lens elements designed according to this aspect of the present invention will provide plots of horizontal and cross powers at the meridian, of form somewhat similar to those created in the worked example for FIG. 7. Suitable parameters $R_{2n}$, $C_{2n}$ and m along the horizontal meridian may be determined by fitting the sagittal power in that direction to an approximately constant value defined by the power at the optical axis of the lens.

The formulation above preferably results in substantially equal cross power correction at the meridian to that applied horizontally. However, the intention is to perturb the lens surface only in an area close to the meridian and matching as far as possible the region of excessive surface power on the progressive lens. Accordingly, the function $f'(y/R'_0)$ is next fitted as closely as possible to the excess power region, attempting at all times to make surface adjustment which introduces no additional astigmatism to the lens surface. Accordingly, it will not be possible to eliminate the excess surface power entirely by such localised surface perturbation.

In a still further aspect of the present invention the optical lens element may be designed such that the first and second surfaces each exhibit a substantially equivalent change of curvature in the optical zone extension such that the mean through power remains substantially constant.

Accordingly, in this aspect, there is provided an optical lens element including a first and second surface, the first surface defining
 a central optical zone; and
 a optical zone extension extending from the central optical zone toward the temporal region of the lens and exhibiting a relatively smooth change of curvature across substantially the entire width of the zone;
 the second surface being defined by a complementary surface function to substantially balance the variation in the second optical zone of the first surface, the mean through power of the optical lens element remaining substantially constant as the curvatures are varied beyond the central optical zone.

In a still further embodiment, the second optical zone may include a temporal optical zone displaced laterally along the horizontal meridian of the lens; and an intermediate optical zone extending between the central optical zone and the temporal optical zone.

Accordingly, in this embodiment there is provided an optical lens element including
 a first surface; and
 a second surface of complementary curvature,
 at least one surface exhibiting a deviation in curvature from a standard optical surface;
 the first and second surfaces in combination defining
  a central optical zone exhibiting substantially constant mean through power; and
  an optical zone extension extending from the central optical zone towards the temporal region of the lens and exhibiting a change of curvature in at least the horizontal direction across substantially the entire width of the extension.

Thus in this embodiment both front and back surfaces are bent together beyond the central optical zone so that the mean through power remains substantially constant and the lens bends more or less steeply. In contrast, other examples herein of constant power lenses apply the bending equations from R=0 outwards.

If the conforming function f' (y/R'o) for a general lens form of the type described above is either a slowly varying function of y or is set to unity, and the back surface is described by a complementary surface function, both surface will move together, bending away from the mean curve of the central optical zone.

If required, in a still further embodiment, the optical lens element may further include a third zone in which to thin the extreme limits of the lens by allowing continuous decline of mean through power.

In an alternative embodiment, FIG. 8 illustrates a further example of the design approach illustrated in FIG. 7, for a six base lens of +3 D mean through power.

Again starting at x=28 mm, the front surface of the optical lens element begins to deviate away from the rear prescription surface, thereby reducing the rate at which the difference in front and back Sag depths declines. Simultaneously, the curvature of the front surface decreases smoothly and approaches that of the back surface at the outermost horizontal distances on the lens element.

Note the extension of the temporal edge beyond the limit of a simple spherical lens of the same power and center thickness.

In a further preferred aspect of the present invention this extension may be exaggerated further by increasing the curvatures of front and back surfaces continuously across the optical zone in addition to changing the temporal surfaces at the axis 1–1'. In this embodiment, the first and second surfaces of the optical lens element, for example the front and back surfaces, are defined by the following formulae:

$$z_1(x) = S A_{2n} x^{2n} + \left\{ 1 - \left[ 1 + \sum_{n=1}^{4} N_{2n}(r/2N_0)^{2n} \right]^{-m'} \right\} * S G_{2n} x^{2n}$$

and, $$z_2(x) = S B_{2n} x^{2n} + \left\{ 1 - \left[ 1 + \sum_{n=1}^{4} M_{2n}(r/2M_0)^{2n} \right]^{-m'} \right\} * S F_{2n} x^{2n} -$$

$$f(x/R_0) \left[ \sum_{n=1}^{4} [A_{2n} - B_{2n}] x^{2n} \right]$$

wherein the coefficients $A_{2n}$ and $B_{2n}$ are the chosen front and back curvatures at the optical axis.

The features of the consequent lens element design are shown in FIG. 9 as lens [2]. Note the considerable temporal reach and length of the modified lens element compared to the spherical lens [1] to which it corresponds.

As elaborated in WO97/35224 to Applicants, the entire disclosure of which is incorporated herein by reference, the use of tilted alignment requires that front or back surface be further modified with atoric correction to eliminate mean power and astigmatic errors.

Corrections to physical shape that are not provided in the physical design are achieved by horizontal displacement of viewing axis and optical axis. This may require prismatic correction to front or back surface, as elaborated in Australian Provisional Application PP2612 to Applicants, the entire disclosure of which is incorporated herein by reference.

The optical lens element according to this aspect of the present invention may be mounted directly in a spectacle frame, for example of the wrap around or shield type. When mounted, the optical lens element may be rotated temporally about a vertical axis through the optical centre thereof ("tilt"), or translated so that the line of sight remains parallel to the optical axis of the lens ("offset"), or a combination of both tilt and offset as described below.

Preferably, the front and/or back surface(s) of the optical lens element include a compound spherical design to provide the desired prescription (Rx) in the prescription zone. More preferably, this prescription zone will extend across the full aperture of the spectacle frames being employed.

In a further preferred aspect the optical lens element in the region from the nasal limit to the optical centre may be generally of the meniscus type Alternatively, the nasal region of the optical lens element may be biconvex in shape. The biconvex shape is preferred, particularly for lenses of high power, due to its ease of mounting and improved cosmetics for the wearer.

The lens element may be rotated temporally about a vertical axis through the optical centre thereof or the optical axis may be decentred relative to the geometric axis, or the lens element may be both rotated and decentred. Where this is required, a surface correction to at least partially adjust for optical errors, may be applied. Such corrections are described in detail in International application WO97/35224 to Applicants, referred to above.

Preferably the front surface is capable of being mounted in a frame of constant design curve of between 8.0 D and 9.0 D or above.

More preferably the front surface of the lens element has a high compound curve extending from nasal to temporal limits, but the vertical or orthogonal generating curve is 6.0 D or below.

It will be understood that such vertical curves permit the final prescription lenses, preferably edged lenses, to be adapted to the shape of the wearer's face and so locate closely in a form of the wrap-around type (a so-called "geometrically toric" design for which the vertical curve of the back surface is selected to maintain the desired mean through power or Rx correction provided by the lens. This may be distinguished from a conventional "optically toric" design wherein one surface is rotationally symmetric and the other is shaped to provide the sphere and cylinder components of the wearer's Rx without consideration of the facial form of a wearer).

Alternatively the optical lens elements may be adapted for mounting in a frame of the shield type.

In a still further aspect of the present invention there is provided prescription ophthalmic eyewear, including:

a frame for holding a pair of ophthalmic lens, preferably each of which lenses have a non-zero mean through power, wherein each lens curves around the face of the wearer toward one of the wearer's temples in an as-worn configuration; and wherein each lens has a front surface with a smoothly horizontal varying surface power, and a concave rear surface which clears the wearer's eyelashes in the as-worn configuration, and which has a smoothly, horizontally varying surface power providing, in combination with the front lens surface power, a mean through power constant to within ±0.75 D, preferably ±0.50 D, horizontally between the primary line of sight through the lens in the as-worn configuration and a peripheral line of sight rotated temporally at least 40° from the primary line of site More preferably the mean through power is constant to ±0.125 D up to 40° off axis and declining to no more than ±0.25 D at 50° off axis.

In a still further preferred embodiment of the present invention, there is provided an optical lens element including:

a first lens surface having a surface power varying radially symmetrically from a sphere point and exhibiting high levels of surface astigmatism over substantial portions of the lens such that the lens would be unusable as an ophthalmic lens if combined with a second standard optical surface; and a second lens surface such that the front and rear surfaces define an optical body having an approximately constant mean through power and ophthalmically acceptable properties over said substantial portion of the lens element.

Preferably the lens element is a prolate bowl such that the first surface deviates from a reference sphere defined at the sphere point by at least 3 mm at a location 30 mm from the sphere point.

In a further embodiment, the present invention may provide a single vision, prescription ophthalmic lens element having a relatively flat face portion, and a temporal portion curved to conform to the head of the wearer including:

a front surface with a surface power which increases in temporal direction by at least 3.0 D; and a rear surface with a surface power which increases in a temporal direction by at least 3.0 D so that the lens has a non-zero mean through power constant to within ±0.75 D, preferably ±0.5 D, more preferably 0.25 D.

Preferably, the lens element further includes a nasal portion curved to confirm to the bridge of the nose of the wearer.

In a further aspect of the present invention, there is provided a method of making an optical lens element including a first surface; and a second surface of complementary curvature;

at least one surface exhibiting significant deviation in curvature from a standard optical surface;

the first and second surfaces in combination defining an optical zone exhibiting substantially constant mean through power along at least one meridian;

which method includes providing a mathematical or geometrical representation of a first surface exhibiting a deviation in curvature from a standard optical surface; and a mathematical or geometrical representation of a second surface of complementary curvature; the first and second surfaces in combination defining an optical zone exhibiting substantially constant mean through power;

forming a lens mould corresponding to the representations of the first and second surfaces; and casting an optical lens element from the mould.

In a preferred form, when the lens element is radially symmetric, the sagittal depth is given by the formula $$Z(r,\theta)=Z(r)$$

wherein r, θ, Z, are cylindrical coordinates $$Z(r) = \sum_{2n=0}^{4} A_{2n} * r^{2n}$$

wherein $A_4=(A_2)^3$, $A_6=2*(A_2)^5$, and $A_8=5*(A_2)^7$
wherein $A_2=P_0+K(r)$
wherein the function $K(r)$ is continuous.

Alternatively when the lens element deviates from a toric surface, the sagittal depth is given by the formula $$Z(r,\phi)=Z(x,y)$$

wherein r, φ are cylindrical co-ordinates $$Z(x, y) = \sum_{2n=0}^{4} A_{2n} * x^{2n} + \sum_{2n=9}^{4} B_{2n} * y^{2n}$$

wherein $A_2 = P_0 + K(x)$, and $B_2 = P_0$.

In a particularly preferred form, wherein when a surface carries a surface correction, the sagittal depth is given by the formula $$Z(r,\theta)=R(r,\theta)-\sqrt{R(r,\theta)^{2r^2}}$$

and where $$R(r, \theta) = \frac{R(r, 0) * R(r, \pi/2)}{R(r\theta)\sin^2\theta + R(r, \pi/2)\cos^2\theta}$$

is the radial curvature along the meridian at θ, and the values θ=0 and π/2 represent the principal meridians.

In a further preferred aspect the first and second surfaces further define an optical zone extension extending from the central optical zone towards the temporal region of the lens; the front surface exhibiting an increase in curvature towards the temporal region of the lens such that the mean through power of the lens reduces gradually along a horizontal meridian across the extension such that unwanted optical astigmatism is significantly reduced. In this embodiment, the sagittal depth may be given by the formula $$z(x, y) = Z(x, y) + f'(y/R_0') * f(x/R_0) \left[ \sum_{n=1}^{4} C_{2n}x^{2n} + \sum_{n=1}^{4} C_{2n}y^{2n} \right]$$

where $f'(y/R_0') = \left[ 1 - \sum_{n=2}^{4} R'_{2n}(y/2R_0')^{2n} \right]^{-m}$ wherein the value of parameters $R_{2n}$, $C_{2n}$ and m are determined along the horizontal meridian by fitting the sagittal power to an approximately constant value.

In a preferred aspect of the present invention, as stated above, the optical lens element may be formed as a laminate of a back and front lens element, as described above.

It will be understood, in this embodiment, inventories may be reduced by providing a single front lens wafer for a range of complementary back wafers or vice versa. Furthermore, the need to employ the most modern lens finishing techniques as for example to complete an Rx from a semi-finished blank is alleviated.

It will be understood further that any feature described as being included via the front lens element may equally be included by the back lens element and vice-versa.

In a further preferred embodiment, in order to permit introduction of cylinder correction, the mating surfaces of front and back lens elements may be generally rotationally symmetric about their respective optical axes through the central optical zone of the laminate optical article. The lens wafers may be oriented by rotation with respect to each other to provide the desired orientation for a wearer's astigmatic correction. The final lens may be completed by laminating the two parts together.

In a particularly preferred form, the laminate optical article may include an inner layer providing desired optical properties of the type described in International Patent Application PCT/AU96/00805 to Applicants, the entire disclosure of which is incorporated herein by reference.

The optical lens element may be formulated from any suitable material. A polymeric material may be used. The polymeric material may be of any suitable type. The polymeric material may include a thermoplastic or thermoset material. A material of the diallyl glycol carbonate type, for example CR-39 (PPG Industries) may be used.

The polymeric article may be formed from cross-linkable polymeric casting compositions, for example as described in Applicants' U.S. Pat. No. 4,912,155, U.S. patent application Ser. No. 07/781,392, Australian Patent Applications 50581/93, 50582/93, 81216/87, 74160/91 and European Patent Specification 453159A2, the entire disclosures of which are incorporated herein by reference.

The polymeric material may include a dye, preferably a photochromic dye, which may, for example, be added to the monomer formulation used to produce the polymeric material. The variation in depth of colour may be minimised by incorporating a pigment or dye into one or more layers of the optical article.

The optical lens element according to the present invention may further include standard additional coatings to the front or back surface or either of the mating surfaces of wafers for a laminated lens, including electrochromic coatings.

The front lens surface may include an anti-reflective (AR) coating, for example of the type described in U.S. Pat. No. 5,704,692 to Applicants, the entire disclosure of which is incorporated herein by reference.

The front lens surface may include an abrasion resistant coating. e.g. of the type described in U.S. Pat. No. 4,954,591 to Applicants, the entire disclosure of which is incorporated herein by reference.

The front and back surfaces may further include one or more additions conventionally used in casting compositions such as inhibitors, dyes including thermochromic and photochromic dyes, e.g. as described above, polarising agents, UV stabilisers and materials capable of modifying refractive index.

The present invention will now be more fully described with reference to the accompanying figures and examples. It should be understood, however, that the description following is illustrative only and should not be taken in any way as a restriction on the generality of the invention described above.

EXAMPLE 1A

FIGS. 7a–d illustrates a six base optical lens element according to the present invention with mean through power of −3 D beginning with Rx lens of conventional form within a central aperture and are distorted mathematically so as to change their shape without discontinuity in mean through power outside that aperture based on the following formula:

$$z(x, y) = \left[\sum_{n=1}^{4} A_{2n} x^{2n}\right] - f(x/R_0) \left[\sum_{n=1}^{4} [A_{2n} - B_{2n}] x^{2n}\right] + \left[\sum_{n=1}^{4} A'_{2n} y^{2n}\right]$$

where the function $f(x/R_0)$ is a conforming function which imposes a second conic section with coefficients $B_{2n}$ on the first surface with coefficient $A_{2n}$. The second (rear) surface of the lens is in this example defined in its entirety by the coefficients $B_{2n}$.

The lens is distorted smoothly outside a central aperture $x \leq R_0$ having asymptotically vanishing effect at $x = R_0$ and maximum effect at the lens edges, utilising the conforming function:

$$f(r/R_0) = 0.75 \left\{ 1 - \left[ 1 + \sum_{n=2}^{4} R_{2n}((r - R_0)/2R_0)^{2n} \right]^{-m} \right\} \quad \text{for } r > R_0$$

$$= 0 \quad \text{for } r \leq R_0$$

This function and both its first and second derivatives vanish at $r = R_0$.

FIG. 7 shows the application of this formulation to a six base lens of −3D mean through power, for which the coefficients are;

$A_2 = 5.12 \times 10^{-3}$, $A_4 = 1.34 \times 10^{-7}$, $A_6 = 7.02 \times 10^{-12}$, $A_8 = 4.60 \times 10^{-16}$, and $B_0 = 1$, $B_2 = 7.68 \times 10^{-3}$, $B_4 = 4.52 \times 10^{-8}$, $B_6 = 5.33 \times 10^{-11}$, $B_8 = 7.86 \times 10^{-15}$ $R_0 = 30$, $R_2 = 0$, $R_4 = 1.0$, $R_6 = -2.4$, $R_8 = 0$, $m = 2$.

Since it is desirable for the temporal extension to be umbilic at least on the horizontal meridian 1–1', the coefficients $A'_2$ which define the local cross-curve vertically are computed at each value of x from the changing value of the horizontal curvature (surface power) at the axis 1–1'. The remaining coefficients $A'_{2n}$ are determined for chosen values of the asphericity coefficient p, as defined above. This creates an initial surface form to be optimised in terms of astigmatic and mean power errors, taking into account the chosen lens tilt or offset displacement as required to locate the lens in a frame of the wrap around type.

The variation of $A'_2$ and the mean through power of the lens along the axis 1–1' are shown also in FIG. 7.

Note the existence of precise control over the surfaces and corresponding mean through powers out to the edge of the lens element, so that the Rx power is constant across the aperture of the central zone and thereafter declines in a smooth fashion without discontinuity in the rate of change of power along the entire axis 1–1'.

The purpose of the design example is to show the freedom obtained by eliminating circular symmetry in the lens and calculating the cross curve from the tangential power (the focus of which falls within the plane of the horizontal sagittal plane). Sagittal power as would be defined for rotational symmetry, would introduce very large astigmatism levels.

The designs bring the through tangential power (and as a result the through sagittal power) smoothly to zero at the edge of the lens.

EXAMPLE 1B

In the event that a piano extension is required, this may be achieved without prismatic jump by extending one or other of the surfaces from the established boundary of plano power outward to greater radii. An example is calculated and depicted below in FIGS. 8a to d. Note that the tangential curvature and power coefficients are continuous, but the surface has a discernible kink to it. Accordingly it would be visible to an observer. However, it is free of local power oscillations that would emerge from a discontinuity in sagittal power if the lens were rotationally symmetric.

EXAMPLE 2A

FIGS. 9a–d illustrates a six base optical lens element according to the present invention with mean through power of +3 D. The lens element was designed in a similar manner to that described in Example 1 except that the coefficients are as follows:

$A_2 = 5.12 \times 10^{-3}$, $A_4 = 1.34 \times 10^{-7}$, $A_6 = 7.02 \times 10^{-12}$, $A_8 = 4.60 \times 10^{-16}$, and $B_0 = 4.5$, $B_2 = 2.56 \times 10^{-3}$, $B_4 = 1.68 \times 10^{-8}$, $B_6 = 2.19 \times 10^{-13}$, $B_8 = 3.59 \times 10^{-18}$ $R_0 = 30$, $R_2 = 0$, $R_4 = 1$, $R_6 = -1.9$, $R_8 = 0$, $m = 2$.

The initial form coefficients $A'_2$ which define the local cross-curve vertically are computed as before at each value of x from the changing value of the horizontal curvature (surface power) at the axis 1–1'. The dependence of $A'_2$ and the mean through power of the lens element at the axis 1–1' are shown also in FIG. 9.

Note the extension of the temporal edge beyond the limit of a simple spherical lens of the same power and center thickness.

EXAMPLE 2B

In this example, a plan of extension is provided in a manner similar to that illustrated in Example 1 B attached. The resultant optical lens element is illustrated in FIGS. 10a to d below.

EXAMPLE 3A

FIG. 11 illustrates a modified form of the optical lens element of FIG. 9 wherein the temporal extension is further exaggerated by increasing the curvatures of front and back surfaces continuously across the optical zone in addition to changing the temporal surfaces at the axis 1–1'.

In this embodiment, the first and second surfaces of the optical lens element, for example the front and back surfaces, are defined by the following formulae:

$$z_1(x) = S\,A_{2n}x^{2n} + \left\{1 - \left[1 + \sum_{n=1}^{4} N_{2n}(r/2N_0)^{2n}\right]^{-m'}\right\} * S\,G_{2n}x^{2n}$$

and, $$z_2(x) = S\,B_{2n}x^{2n} + \left\{1 - \left[1 + \sum_{n=1}^{4} M_{2n}(r/2M_0)^{2n}\right]^{-m'}\right\} * S\,F_{2n}x^{2n} -$$

$$f(x/R_0)\left[\sum_{n=1}^{4} [A_{2n} - B_{2n}]x^{2n}\right]$$

wherein the coefficients $A_{2n}$ and $B_{2n}$ are the chosen front and back base curves at the optical axis. In this example the base curves are 6 D and 3 D to give an Rx of +3 D;

$A_2=5.12*10^{-3}, A_4=1.34*10^{-7}, A_6=7.02*10^{-12}, A_8=4.60*10^{-16}$, and $B_0=5.5, B_2=2.56*10^{-3}, B_4=1.68*10^{-8}, B_6=2.19*10^{-13}, B_8=3.59*10^{-18}$ and the coefficients $G_{2n}$ and $F_{2n}$ correspond approximately to +10D base curves, being $G_2=8.53*10^{-3}, G_4=4.65*10^{-7}, G_6=5.08*10^{-11}, G_8=6.96*10^{-15}$, and $F_2=8.00*10^{-3}, F_4=4.0*10^{-7}, F_6=5.08*10^{-11}, F_8=6.93*10^{-15}$.

The conforming coefficients are, $N_0=75, N_2=0.415, N_4=0.45, N_6=-0.72, N_8=1.50, m'=3$ $M_0=77.5, M_2=0.50, M_4=0.40, M_6=-0.72, M_8=0$, $R_0=28, R_2=0, R_4=2.75, R_6=-2.0, R_8=0, m=2$.

Figure 11A:
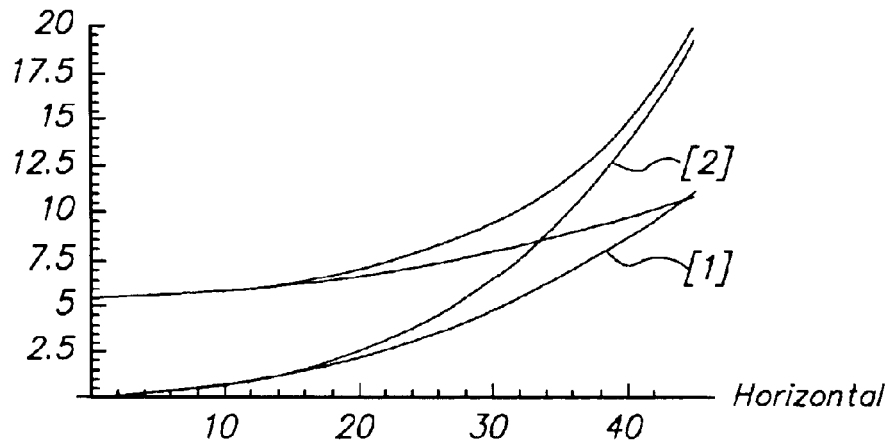
Figure 11B:
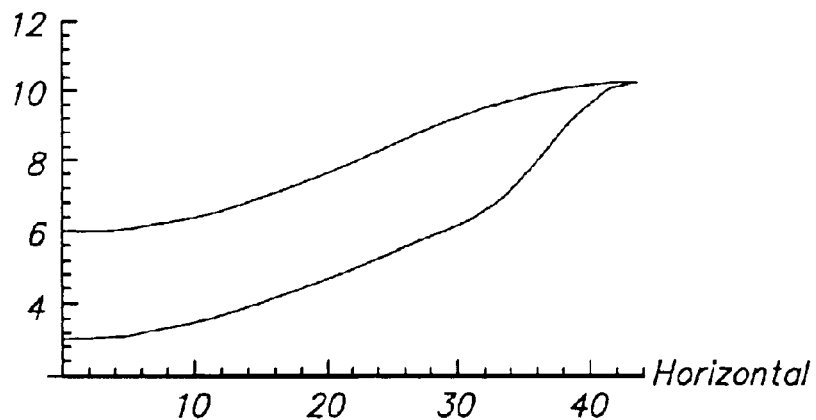
Figure 11C:
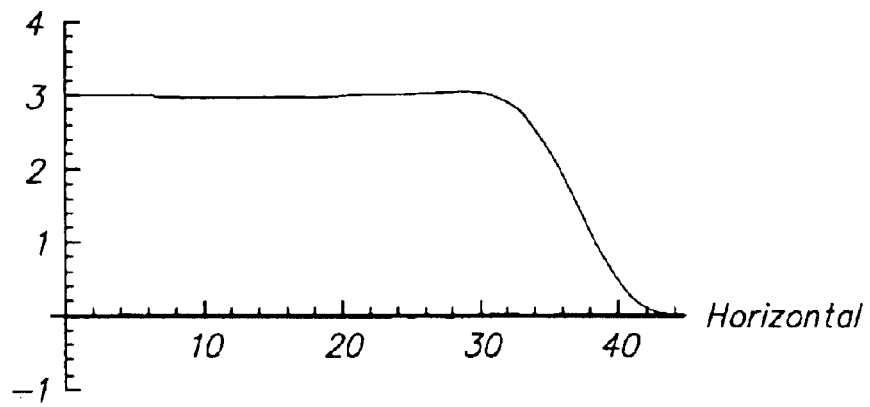
Figure 11D:
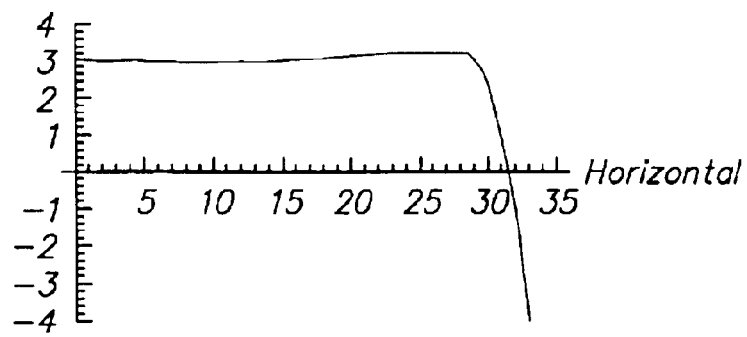

The features of the consequent lens element design are shown in FIG. 11a as lens [2]. Note the considerable temporal reach and length of the modified lens element compared to the spherical lens [1] to which it corresponds.

EXAMPLE 3B

In this example, a temporal extension may be provided with the geometric appearance of an elongated piano region, as in FIG. 11a. However, this is a feature of the sagittal power (FIG. 11b and FIG. 11c), not of the tangential power defined by the surface curvature. The tangential power becomes highly negative in the region of the extension (FIG. 11d) so that if, for example a rotationally symmetric lens of section like FIG. 11a were to be made, it would exhibit several diopters of astigmatism within the extension area.

Figure 12A:
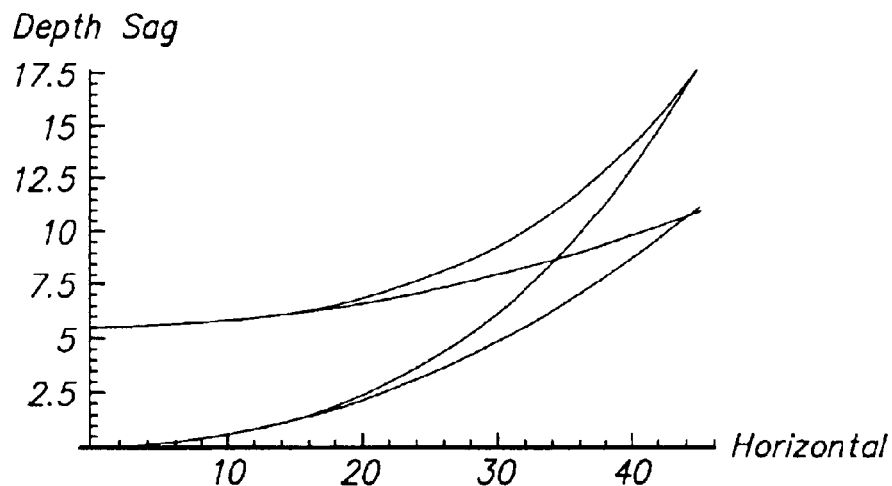
Figure 12B:
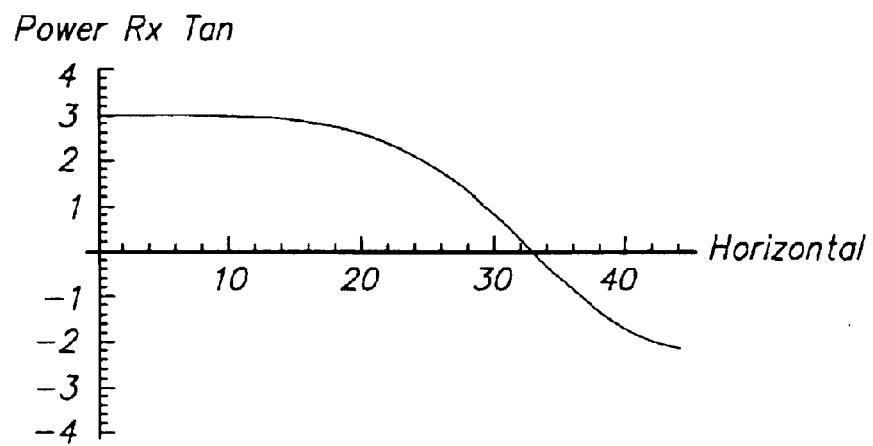

The divergence of tangential power to highly negative values may be controlled by a lens element design which draws back the physical length of the temporal extension, as shown below for parametric settings;

$N_0=82.5, N_2=0.415, N_4=0.45, N_6=-0.72, N_8=1.5$ and $m=3$ $M_0=82.5, M_2=0.45, M_4=0.4, M_6=0$ and $M_8=0$ $R_0=50, R_2=0.45, R_4=0.4, R_6=0$ and $R_8=0$ When corresponding cross-coefficients are applied to the vertical curve, the resultant lens has a central Rx region outside of which the power declines to zero before stabilizing at a negative value in the outer extremities of the temporal extension. The image in this region will be essentially free of astigmatism and prism displacement, but will be blurred to a greater degree than the wearer is used to experiencing with uncorrected vision. The resultant optical lens element is illustrated in FIGS. 12a and 12b.

Figure 13A:
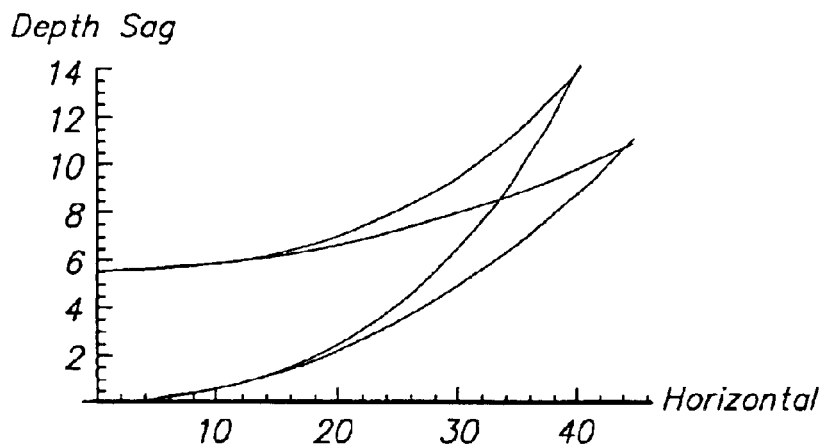
Figure 13B:
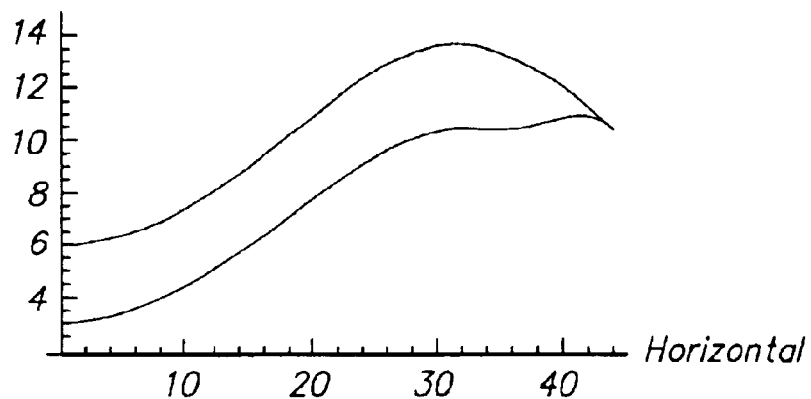
Figure 13C:
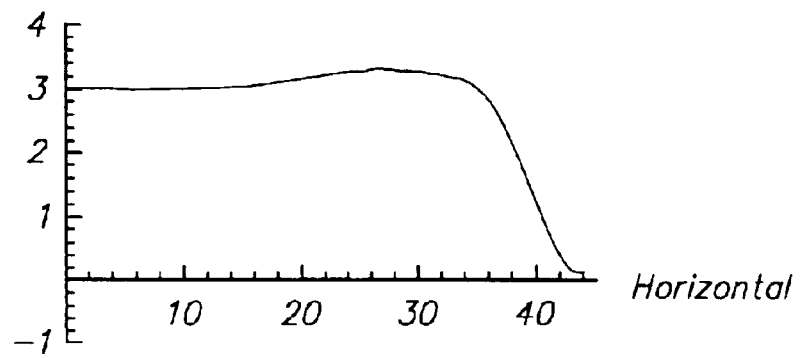

The most desirable optics are provided by a lens design in which the through tangential power declines smoothly to zero at the temporal edge. The cross-coefficients for the vertical lens surface may then be calculated as in Example 2 to achieve the desired asymmetric lens form with minimal astigmatism. Such a lens form is shown below, corresponding to the parameter values;

$N_0=75, N_2=0.415, N_4=0.45, N_6=-0.72, N_8=1.5$ and $m=3$ $M_0=77.5, M_2=0.5, M_4=0.4, M_6=-0.72$ and $M_8=0$ $R_0=33.5, R_2=0, R_4=0.8, R_6=-2$ and $R_8=0$ The resultant optical lens element is illustrated in FIGS. 13a to 13c.

EXAMPLE 4A

Figure 14A:
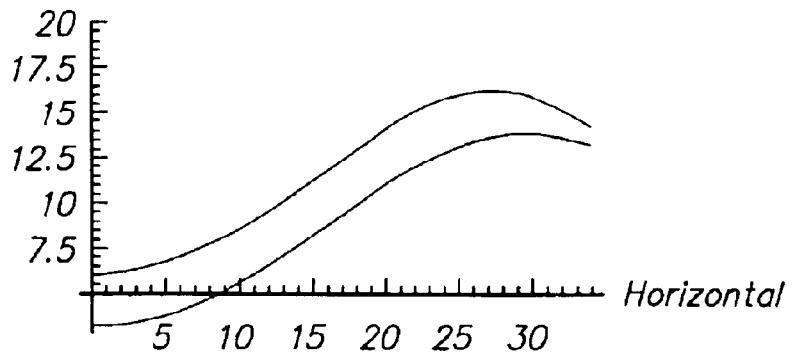
Figure 14B:
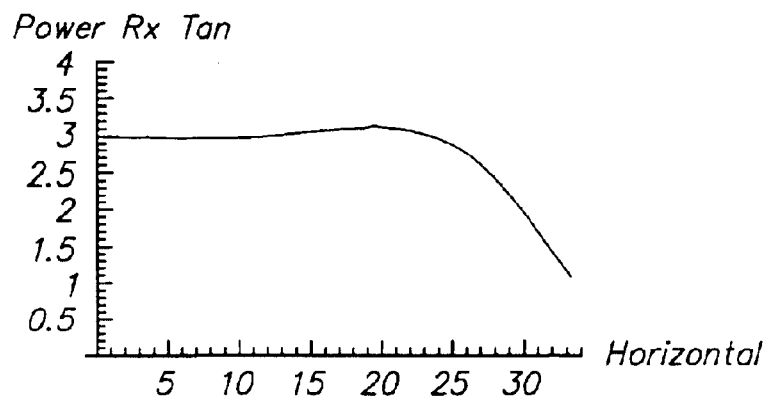

FIGS. 14 and 15 illustrate an optical lens element according to the present invention with mean through power of +3 D.

The lens element was designed setting up the description of front and back surfaces of a lens so that banding Is occurring only in the horizontal plane (x, z):

$$z_1(x) = \Sigma A_{2n}x^{2n} + [\cos(\pi x/2R_0)]^m * \pi B_{2n}x^{2n}$$

$$z_2(x) = \Sigma G_{2n}x^{2n} + [\cos(\pi x/2M_0)]^m * \pi F_{2n}x^{2n}$$

Figure 15A:
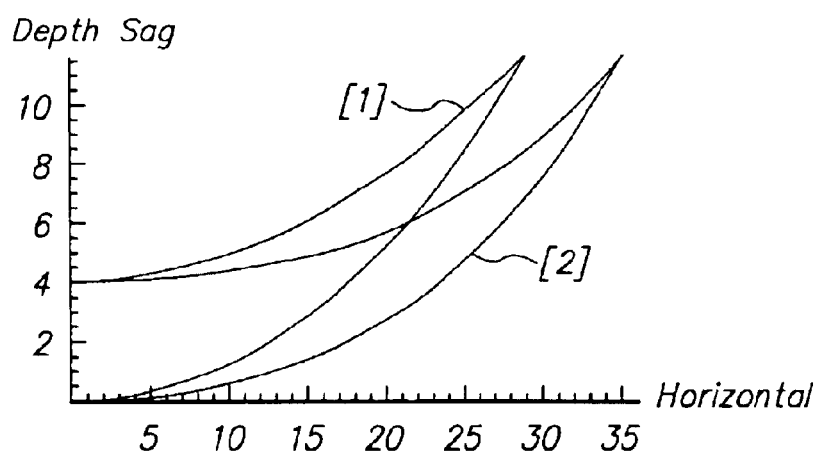
Figure 15B:
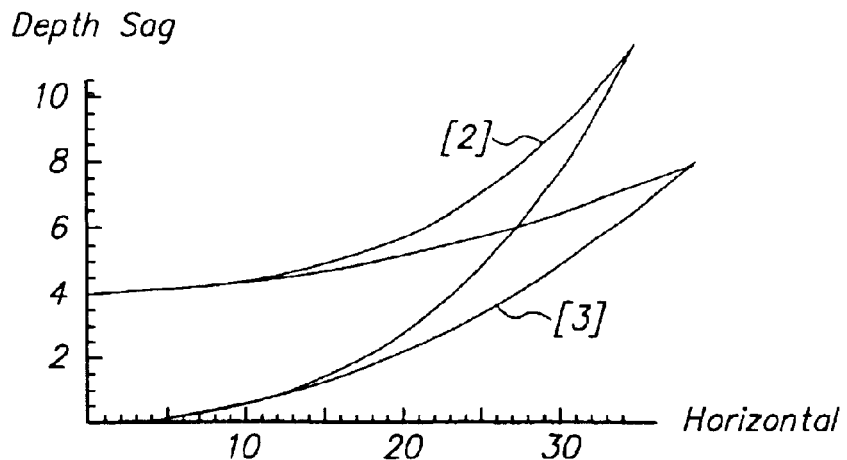

The utility of the design approach is depicted in FIGS. 15(a) and 15(b), which shows lens cross-sections in the horizontal or (x,z) plane. The section denoted [1] has constant front base curve of 14D, that denoted [2] is the current variable curvature design, and that denoted [3] has constant front base curve of 6D. All three lenses have mean through power of +3D over wide aperture ranges, The variable base design [2] has equivalent capability to wrap around to the temples as the high base design [1] and provides much enhanced physical space for the human eyes to sit behind the lens. The lower curvature design [3] reaches across the field of vision but has relatively much less wrapping tendency. If this is compensated by tilting the lens off axis, the flat rear surface will truncate the space available to the eyes, clashing with the lashes and eye lids.

The numerical value of the base curve at the central optical zone CZ is defined by the sum $A_{2n}+B_{2n}$ and that at the temples approaches the $A_{2n}$ value. In the current example, the curvature Increases from CZ towards TZ because of the choice of negative $B_{2n}$.

$A_2=1.203*10^{-2}$; $A_4=22*10^{-7}$; $A_6=4.4*10^{-11}$; $A_8=4.68*10^{-15}$ $B_0=0$; $B_2=-6.82*10^{-3}$; $B_4=-3.18*10^{-7}$; $B_6=-2.96*10^{-11}$; $B_8=-3.45*10^{-15}$ $R_0=120$; $m=3$ $G_0=4$; $G_2=8.9*10^{-3}$, $G_4=1.65*10^{-7}$; $G_6=0.508*10^{-10}$; $G_8=0.693*10^{-14}$ $F_0=0$; $F_2=-6.26*10^{-3}$; $F_4=-7.76*10^{-8}$; $F_6=-2.82*10^{-12}$; $F_8=-1.28*10^{-16}$ $M_0=81$

If, on the other hand, $A_{2n}$ and $B_{2n}$ are both positive, the curvature will trend oppositely, being highest at the CZ, decreasing smoothly toward TZ.

EXAMPLE 4B

In this example, an alternative approach to designing the lens element of example 4A is illustrated in which the function K(r) [introduced on page 10 at line 14 above] has a convenient form, for example defining the front surface of a lens via the expression;

$A_2(x)=Q(x)*(10^{-3}/1.170)$ $Q(x)=Q_0+Q_1+Q_2*x2+Q_3*x^5$ $B_2(x)=P_2(x)*(10^{-3}/1.170)$ $P(x)=P_0+P_1*x+P_2*x^2+P_3*x^3$

Figure 16A:
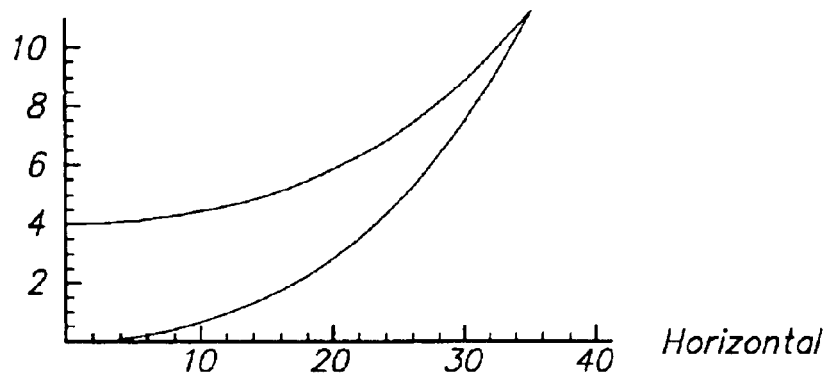
Figure 16B:
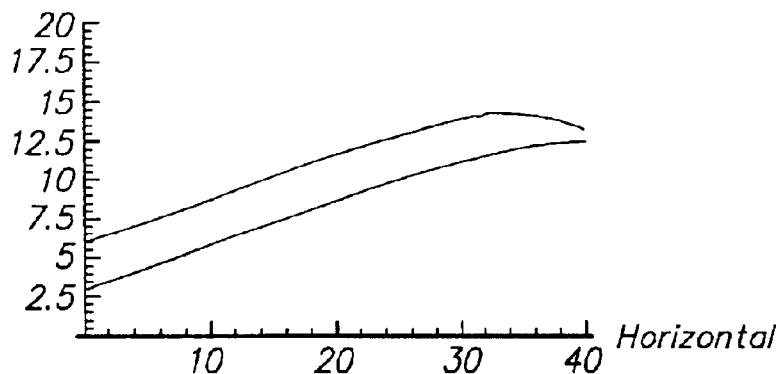
Figure 16C:
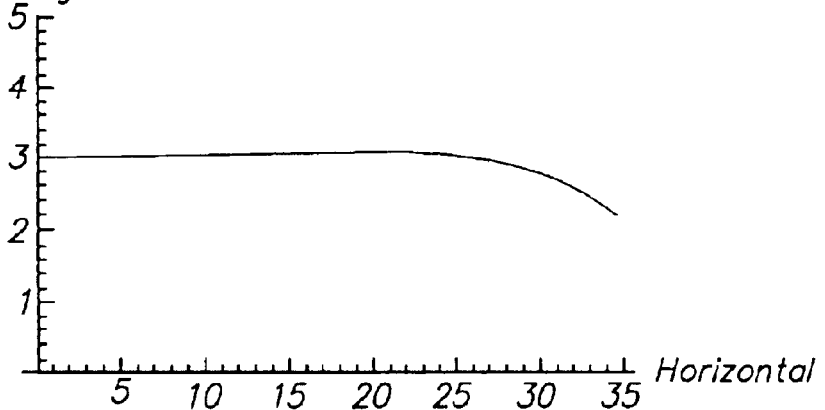

A lens designed in this way, using the parametric values;

$Q_0=6$; $Q_1=0.9*10^{-1}$; $Q_2=0.17*10^{-3}$; $Q_3=0.225*10^{-5}$ $P_0=3$; $P_1=0.9*10^{-1}$; $P_2=0.15*10^{-3}$; $P_3=0*10^{-3}$; $x_0=40$ has the features represented in the following FIGS. 16*a* to 16*c*. The design method is more direct and convenient than the more complex formulations of previous examples. Note that the decline in tangential through power toward the lens extremity is not as abrupt as the changes shown in FIG. 14*b*.

EXAMPLE 5A

FIG. 17 illustrates an optical lens element according to the present invention with mean through power of +3 D based on an asymmetrical lens design.

An example of an asymmetric optical lens element design with continuous and smoothly varying curvature, and consequently, constant mean through power notwithstanding the design asymmetry can be created using the following mathematical formulae, defining the first and second surfaces of the optical lens element.

$z_1(x)=\Sigma A_{2n}x^{2n}$      for $x<0$ $z_1(x)=\Sigma A_{2n}x^{2n}-[\cos(\pi x/2R_0)]^m*\Sigma B_{2n}x^{2n}$      for $x>0$ $z_2(x)=\Sigma G_{2n}x^{2n}$      for $x<0$ $z_2(x)=\Sigma G_{2n}x^{2n}+[\cos(\pi x/2M_0)]^m*\Sigma F_{2n}x^{2n}$      for $x>0$ while $z_1(y)=\Sigma\alpha_{2n}y^{2n}$ and $z_2(y)=\Sigma\gamma_{2n}y^{2n}$ where the coefficients are as defined above in Example 4A.

Figure 17A:
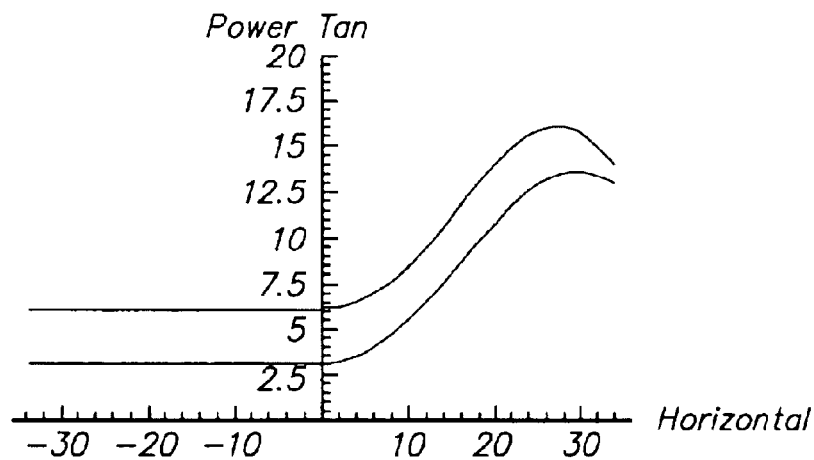
Figure 17B:
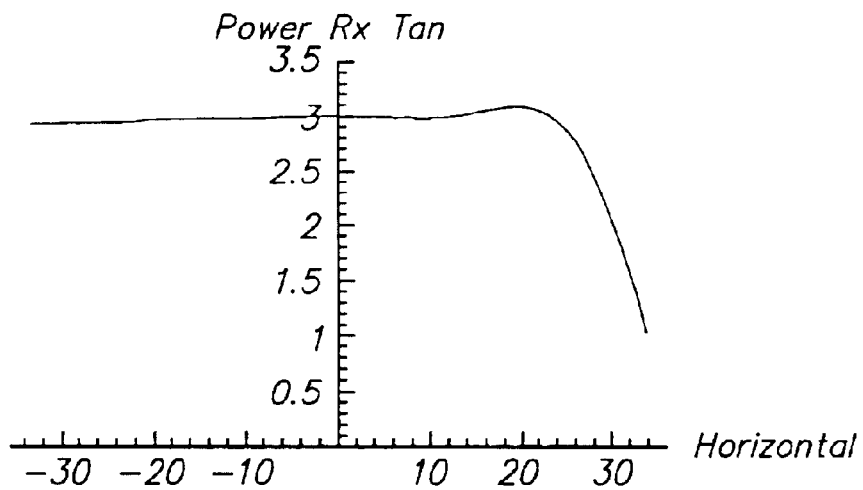
Figure 17C:
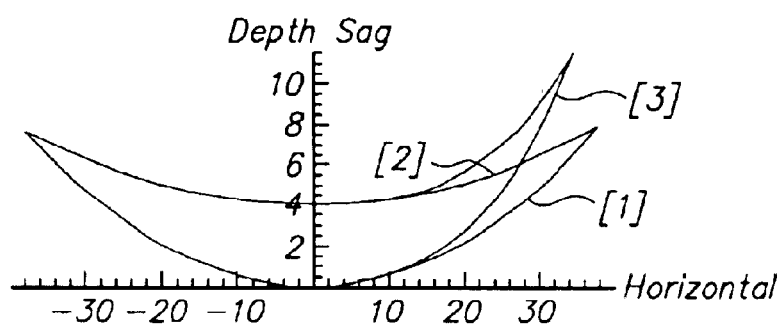

The features of the resultant element lens are illustrated in FIGS. 17*a* to 17*c*.

EXAMPLE 5B

The alternative approach to designing the lens element illustrated Example 4B via the function K(x) also provides an asymmetric lens for an appropriate selection of coefficients in plus and minus ranges of x. The formulation is shown as the second design in Example 4B and yields an asymmetric lens when x is allowed to assume negative values without correction of the odd-powered terms on P and Q, as shown below. The primary difference between this and the lens element of FIG. 17 is that the tangential surface power is locally constant for a region about the optical axis, whereas in the present example. It varies continuously across that axis.

Figure 18A:
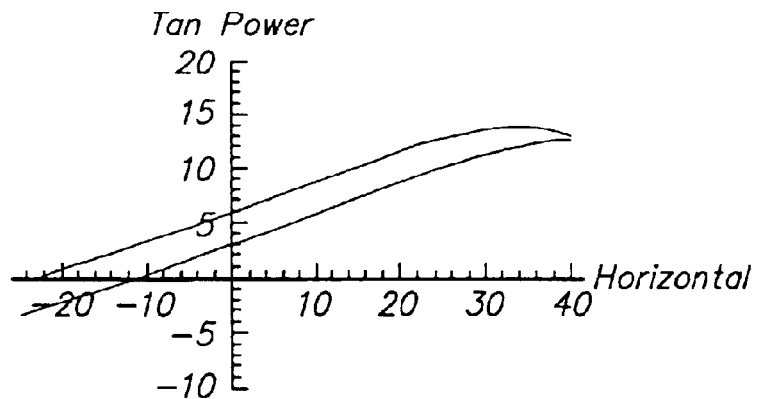
Figure 18B:
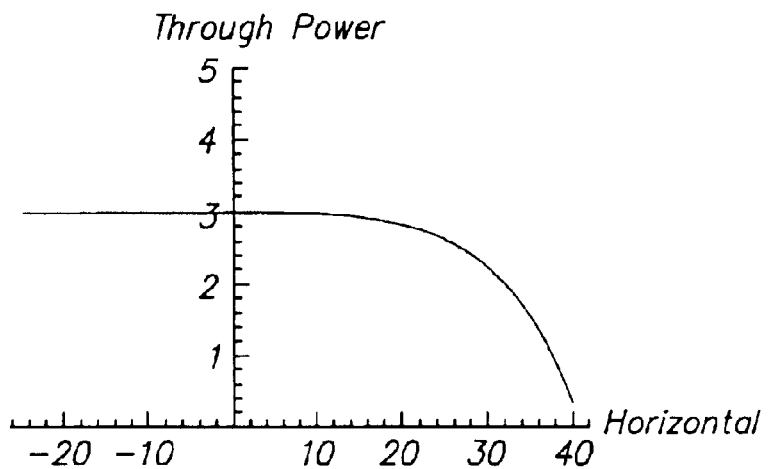
Figure 18C:
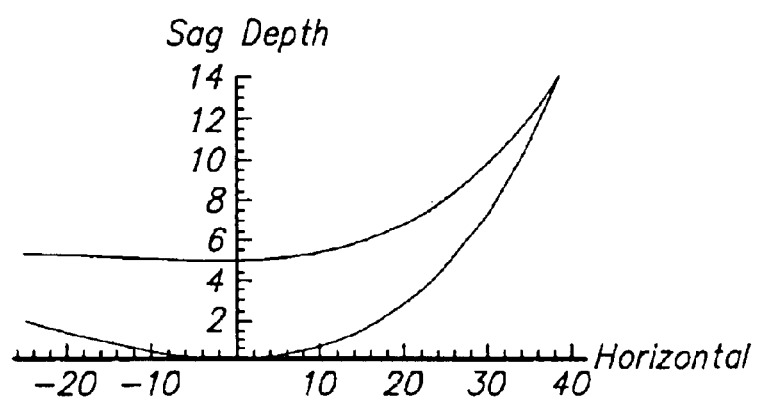

Both lens designs in Example 5a and b show continuous tangential power and continuous gradient in the power profile at the optical axis, indicating surfaces that are continuous to the third derivative, However, the formulation based on K(x) can, if desired involve continuity of the surface to the second derivative with a discontinuity in the third derivative. The features of the resultant optical lens element are illustrated in FIGS. 18*a* to 18*c* below.

EXAMPLE 6

Figure 19:
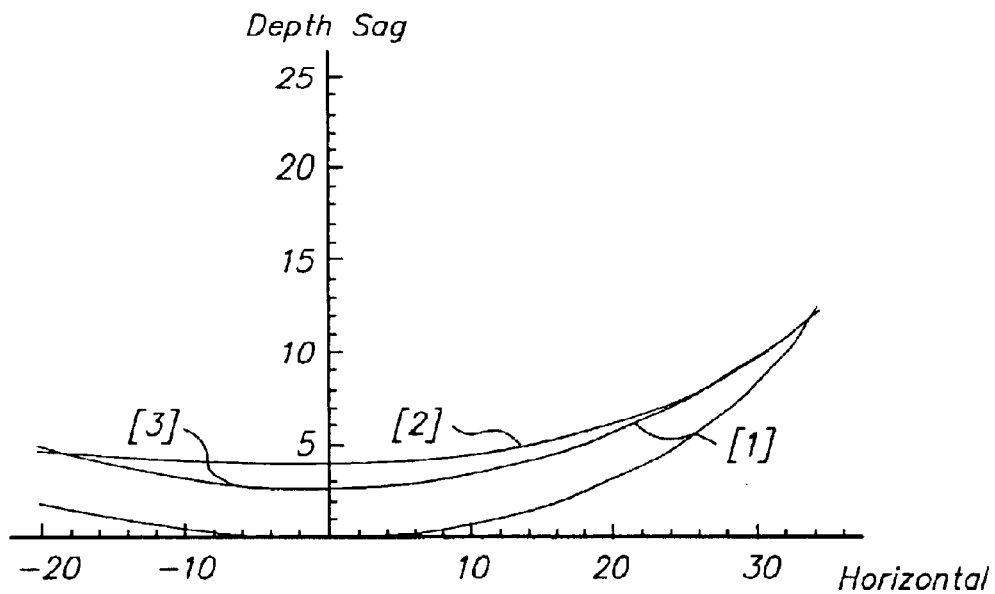

FIG. 19 illustrates a modified form of the optical lens element of FIG. 17.

The horizontal lens section of FIG. 17*c* is reproduced in FIG. 19. The lens front and back surfaces are [1] and [2]. An 8D curve [3] is superimposed between nasal and temporal limits. The back surface [2] intrudes approximately 1.5 mm behind the inner curve [3]. This provides satisfactory clearance for the eyes when the lens is mounted in a frame involving an off-axis tilt to achieve the desired degree of wrap. As elaborated in WO097/35224 to Applicants, the use of tilted alignment requires that front or back surface be further modified with atoric correction to eliminate mean power and astigmatic errors.

EXAMPLE 7

Figure 20:
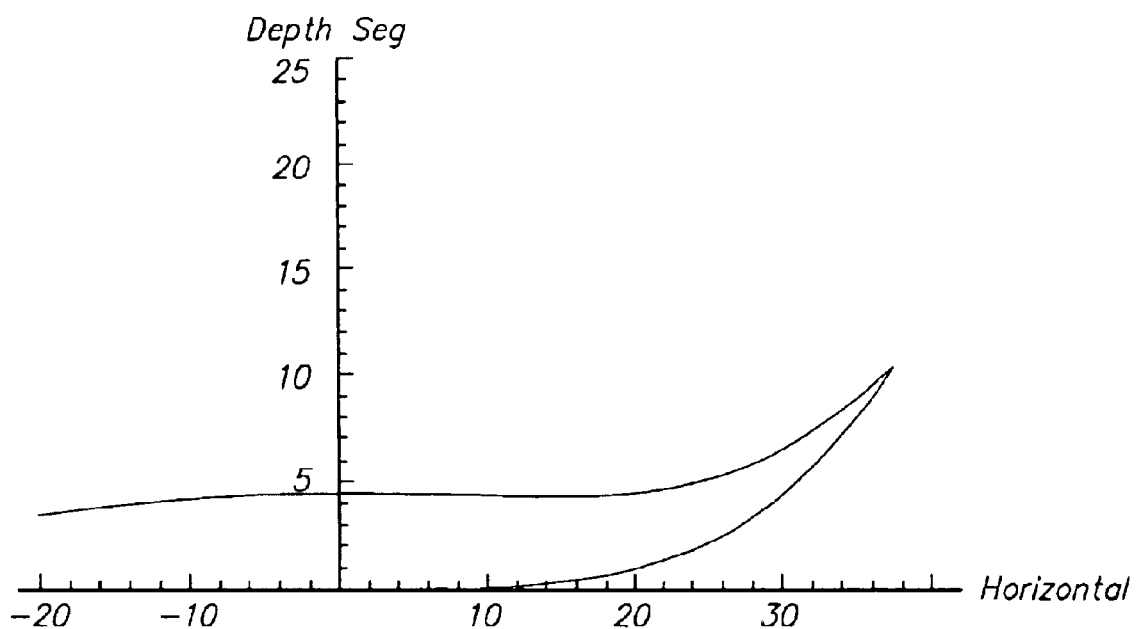

FIG. 20 illustrates a modified form of the optical lens element of FIG. 19.

The first and second surfaces of the optical lens elements are defined by the following mathematical formulae $z_1(x)=0$      for $x<0$ $z_1(x)=\Sigma A_{2n}x^{2n}-[\cos(\pi x/2R_0)]^m*\Sigma A_{2n}x^{2n}$      for $x>0$ $z_2(x)=G_0$      for $x<0$ $z_2(x)=\Sigma G_{2n}x^{2n}-[\cos(\pi x/2M_0)]^m*\Sigma A_{2n}x^{2n}$      for $x>0$ while $z_1(y)=\Sigma\alpha_{2n}y^{2n}$ and $z_2(y)=\Sigma\gamma_{2n}y^{2n}$ wherein the sign of the variable functions are reversed.

Applicants have discovered therefore that a lens equivalent to that in FIG. 19 below may be created wherein the front surface has zero curvature on the nasal side of the optical axis. That is, the front surface is identical to its own tangent for $x\leq 0$.

EXAMPLE 8

Figure 21A:
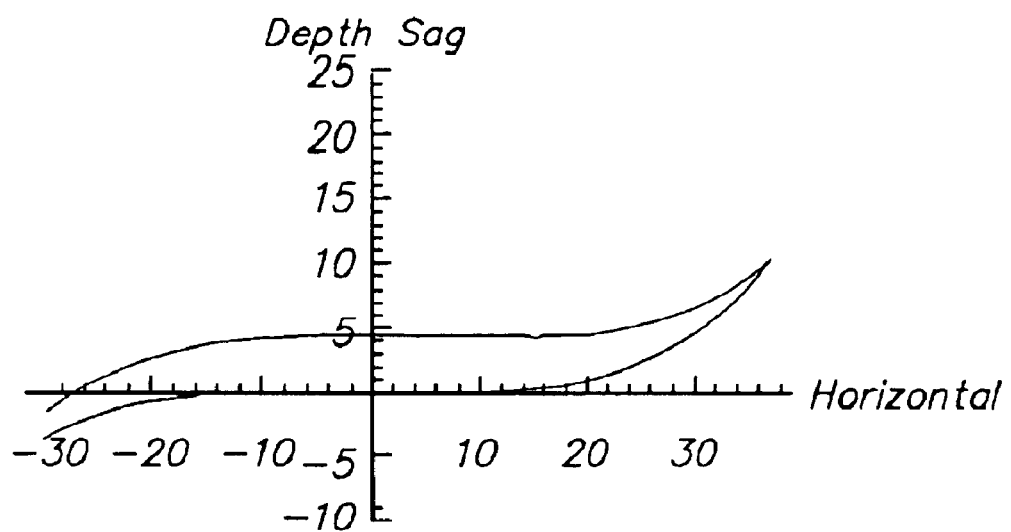
Figure 21B:
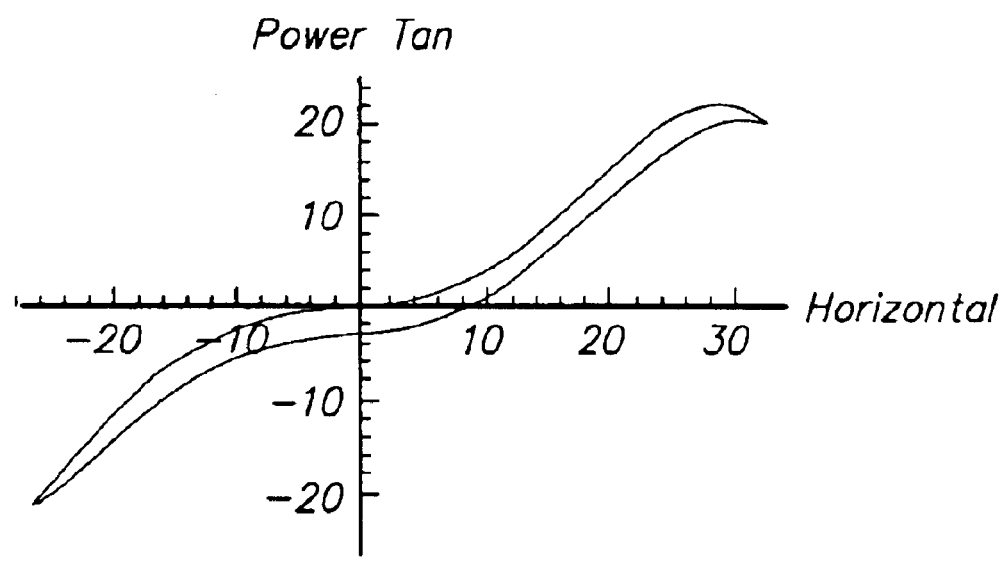
Figure 21C:
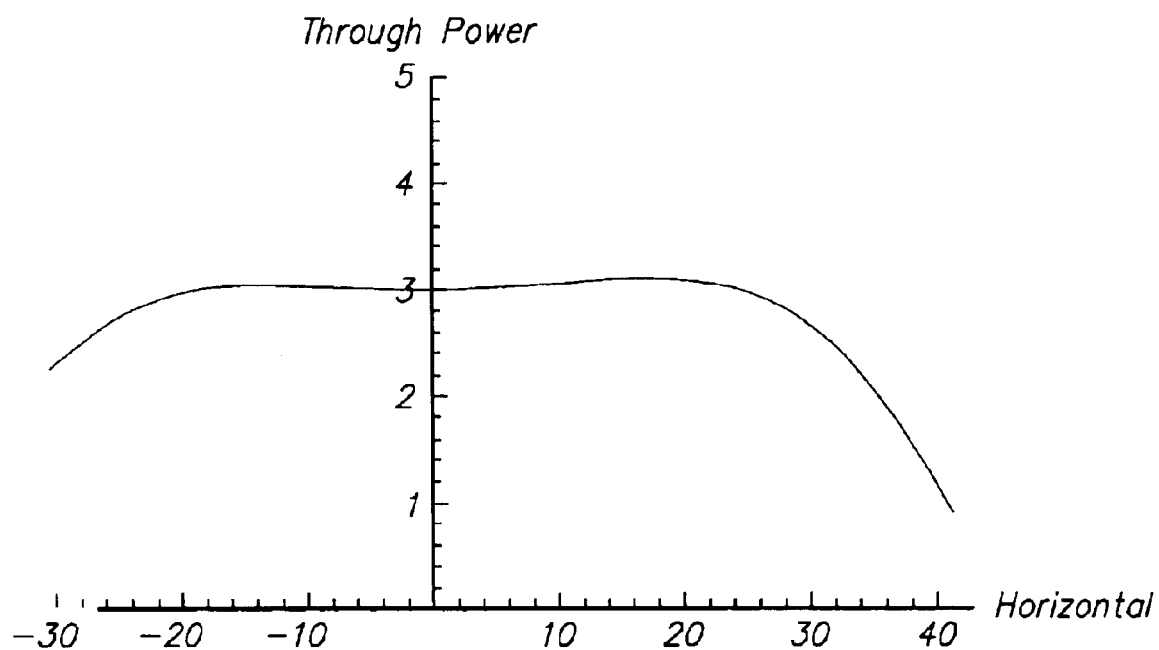

FIG. 21 illustrates a modified form of the optical lens element of FIG. 20 in which the surface of the FIG. 20 optical lens element design is displaced increasingly forward in the nasal region.

The first and second surfaces of the optical lens element of FIG. 21 are defined by the following mathematical formulae:

$$z_1(x) = [\text{Sin}(\pi x/2R'_0)]^{m'} * \Sigma B'_{2n} x^{2n} \quad \text{for } x<0$$

$$z_1(x) = \Sigma A_{2n} x^{2n} - [\text{Cos}(\pi x/2R_0)]^{m} * \Sigma A_{2n} x^{2n} \quad \text{for } x>0$$

$$z_2(x) = G_0 + [\text{Sin}(\pi x/2M'_0)]^{m'} * \Sigma B'_{2n} x^{2n} \quad \text{for } x<0$$

$$z_2(x) = \Sigma G_{2n} x^{2n} - [\text{Cos}(\pi x/2M_0)]^{m} * \Sigma A_{2n} x^{2n} \quad \text{for } x>0$$

while $z_1(y) = \Sigma \alpha_{2n} y^{2n}$ and $z_2(y) = \Sigma \gamma_{2n} y^{2n}$ where the various coefficients are as described above, and there being additional parameters $R'_o$, $M'_o$ and $m'$ corresponding to $R_o$, $M_o$ and $m$.

According to the choice of parameters, this representation may displace the surface of the asymmetric tangent optical lens element illustrated in FIG. 20 increasingly forward in the nasal region to a maximum forward displacement at approximately $x=-1.3 R'_0$. When these designs are set with $R'_o \approx M'_o < PD/2.6$ where PD is the pupilliary distance for the wearer a pair of left and right lenses is created with a point of mirror symmetry corresponding to the center of the nasal bridge.

For the lens element illustrated in FIG. 21

$m'=2$ $R'_0 = M'_0 = 25$ $B'_2 = -2.56*10^{-3}$, $B'_4 = 1.68*10^{-6}$, $B'_6 = -2.19*10^{-11}$, $B'_8 = -3.59*10^{-18}$

EXAMPLE 9

FIG. 22 illustrates a modified form of the optical lens elements of FIGS. 14 and 15 wherein the conforming function is of the "Witch of Agnesi" type.

The first and second surface of the optical lens element of FIG. 16 are defined by the mathematical formulae $$z_1(x) = \Sigma A_{2n} x^{2n} + \left[1 + \sum_{n=1}^{4}(R_{2n}(r/2R_0))^{2n}\right]^{-m} * \Sigma B_{2n} x^{2n}$$

$$z_2(x) = \Sigma G_{2n} x^{2n} + \left[1 + \sum_{n=1}^{4}(M_{2n}(r/2M_0))^{2n}\right]^{-m} * \Sigma F_{2n} x^{2n}$$

Figure 22A:
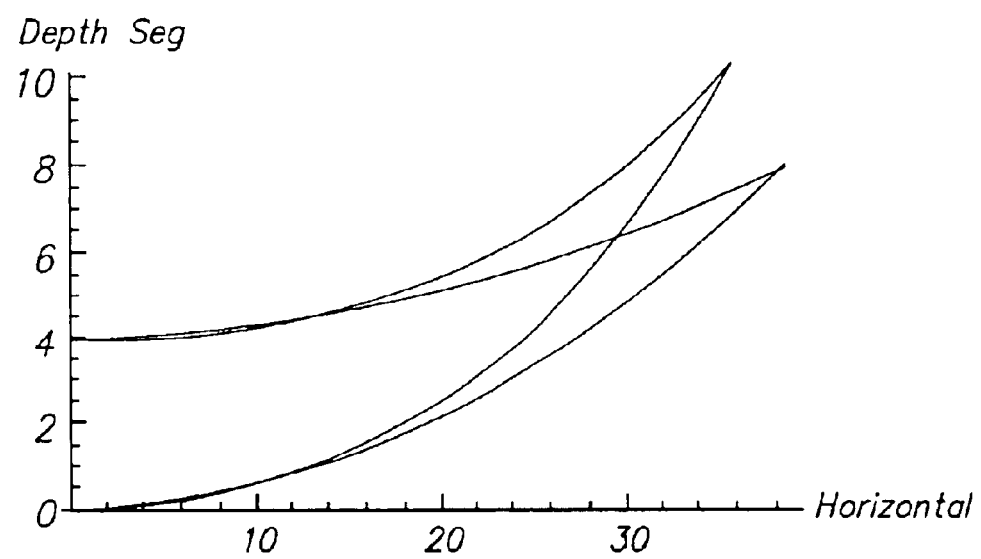
Figure 22B:
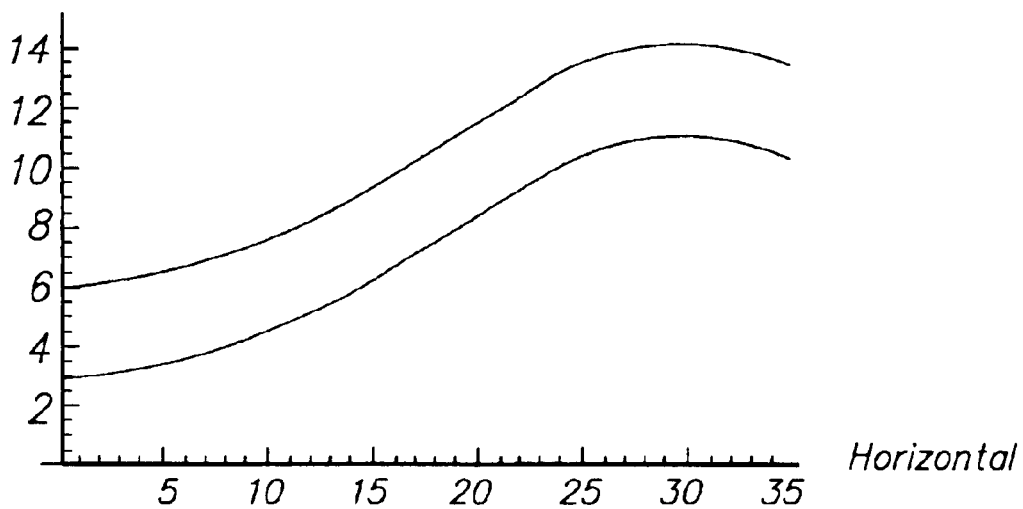
Figure 22C:
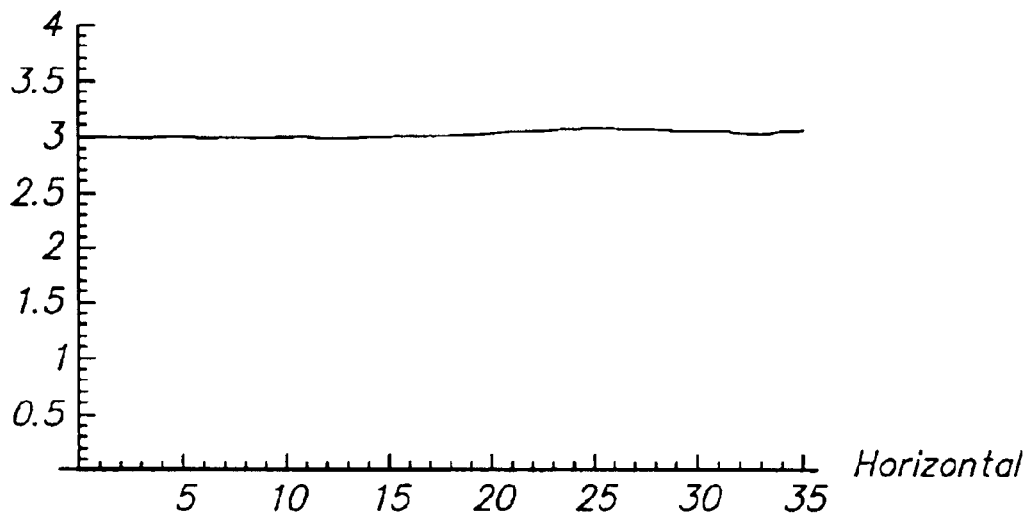

FIGS. 22a to 22c shows the application of this formulation to the example worked in connection with FIGS. 14 and 15.

The coefficients $A_{2n}$ and $G_{2n}$ are the chosen front and back base curves at the optical axis. In this example 6D and 3 D;

$A_2 = 5.12*10^{-3}$, $A_4 = 1.34*10^{-7}$, $A_6 = 7.02*10^{-12}$, $A_8 = 4.60*10^{-16}$, and $G_0 = 4$, $G_2 = 2.56*10^{-3}$, $G_4 = 1.68*10^{-8}$, $G_6 = 2.19*10^{-13}$, $G_8 = 3.59*10^{-18}$ and the coefficients $B_{2n}$ and $F_{2n}$ correspond approximately to +10D base curves, being $B_2 = 25.5*10^{-3}$, $B_4 = 4.65*10^{-7}$, $B6 = 5.08*10^{-11}$, $B_8 = 6.96*10^{-15}$, and $F_2 = 24.0*10^{-3}$, $F_4 = 4.0*10^{-7}$, $F_6 = 5.08*10^{-11}$, $F^8 = 6.93*10^{-15}$.

The conforming coefficients are, $R_0 = 100$, $R_2 = 0.415$, $R_4 = 0.45$, $R_6 = -0.75$, $R_8 = 1.50$, $m=2$ $M_0 = 82.5$, $M_2 = 0.3075$, $M_4 = 0.2$, $M_6 = -0.75$, $M_8 = 0$, Note the existence of precise control over the tangential powers out to the edge of the lens, so that the Rx power is constant across the entire lens aperture. The tangential power is within 10.03D of target across the entire lens aperture.

EXAMPLE 10

Figure 23A:
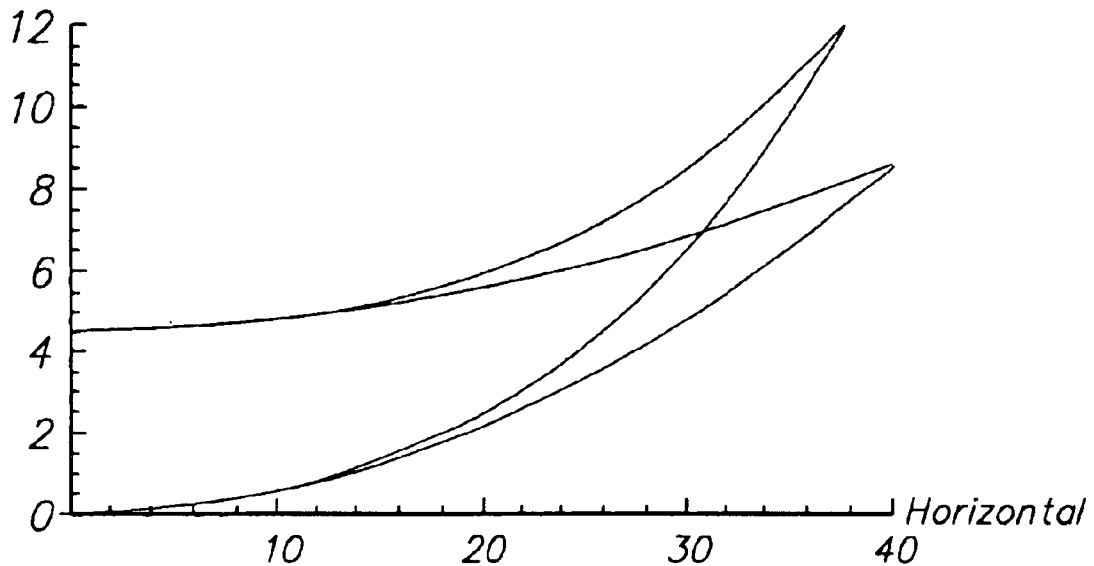
Figure 23B:
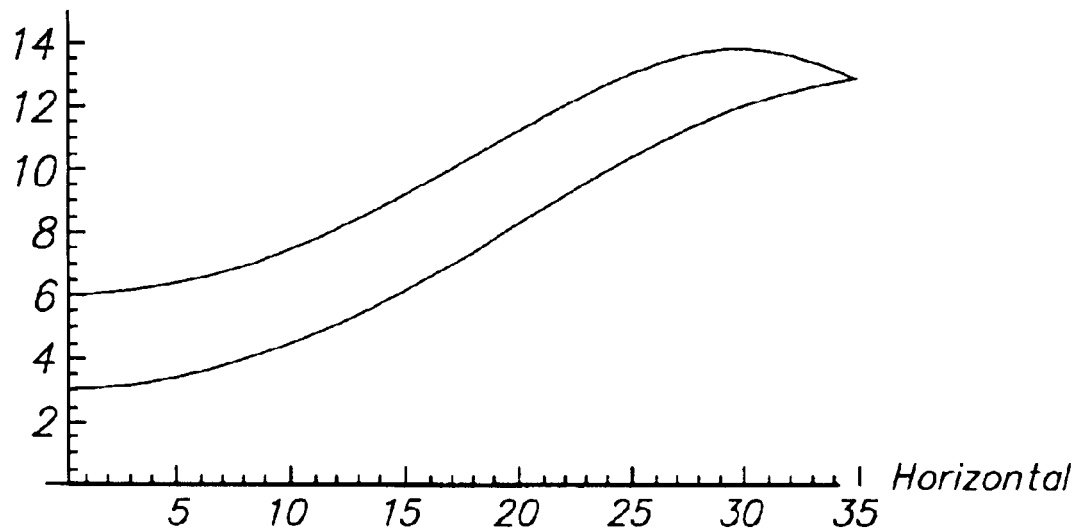
Figure 23C:
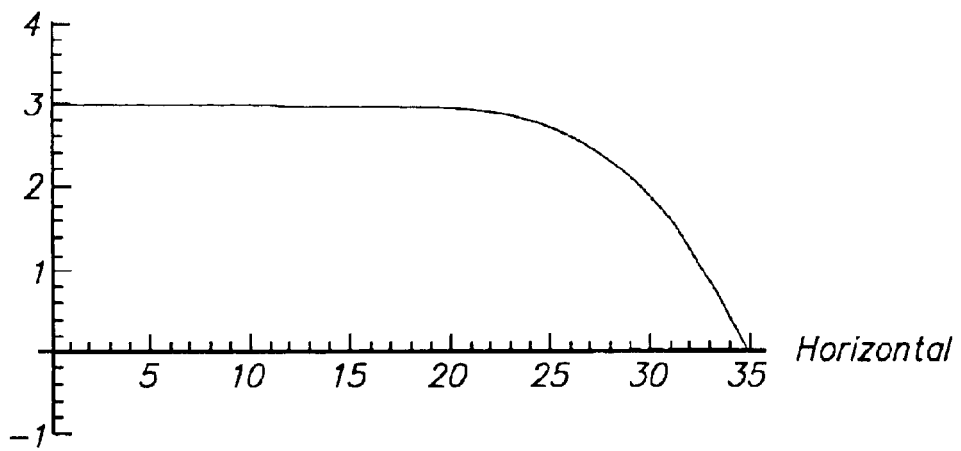

FIG. 23 illustrates a modified form of the optical lens element of FIG. 22 wherein the conforming parameters are altered without change in the curvature coefficients, whence $R_0 = 100$, $R_2 = 0.415$, $R_4 = 0.45$, $R_6 = -0.75$, $R_8 = -3.0$, $m=2$ $M_0 = 82.5$, $M_2 = 0.3075$, $M_4 = 0.2$, $M_6 = -0.75$, $M_8 = 1.8$, Note the more extensive wrap achieved by changing only the parameters $R_8$ and $M_8$. The Rx power commences to drop from a target at about 25 mm off-axis and has fallen by 1.2D at 30 mm off-axis.

EXAMPLE 11A

Figure 24A:
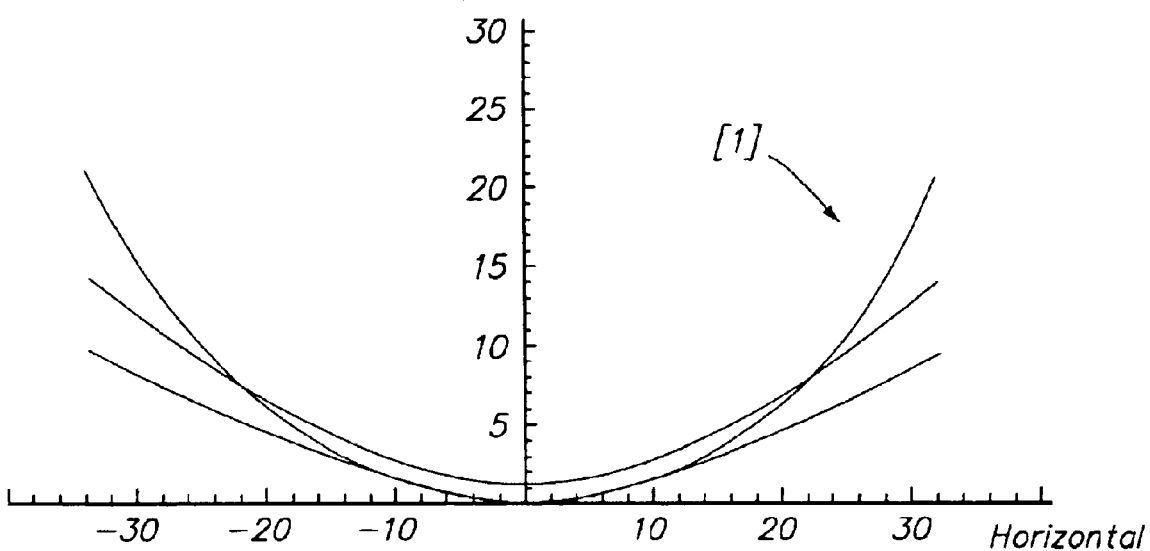
Figure 24B:
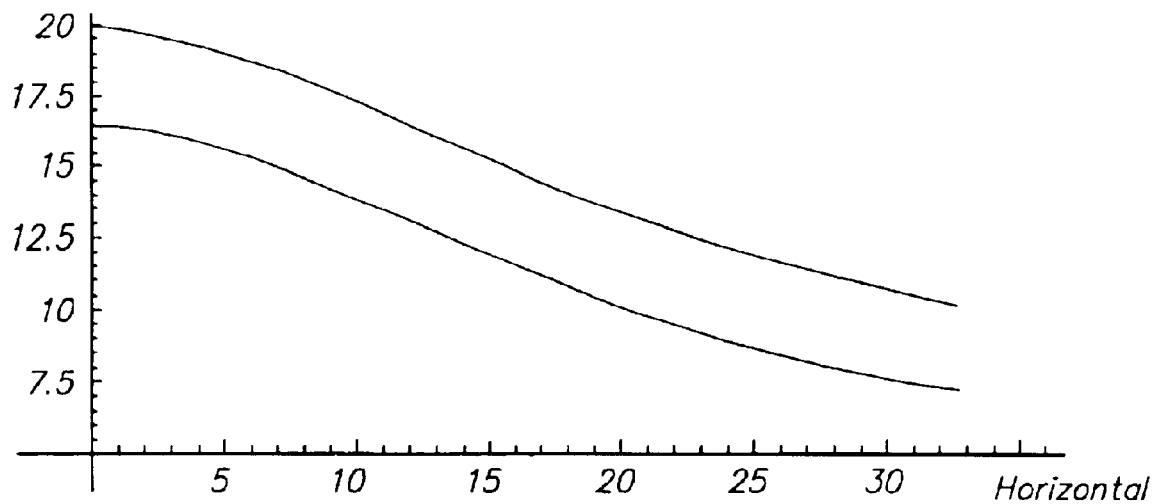
Figure 24C:
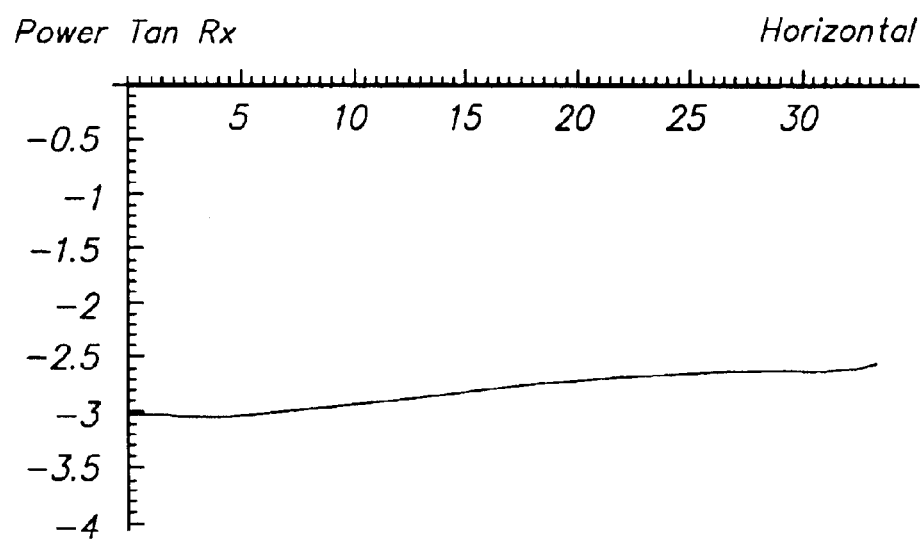

FIG. 24 illustrates an optical lens element having Rx of −3 D which is flattened by 9 D between the optical axis and a point 30 mm off-axis.

The first and second surfaces of the optical lens element are defined by the following mathematical representation $$z_1(x) = \Sigma A_{2n} x^{2n} + \left[1 + \sum_{n=1}^{4}(R_{2n}(r/2R_0))^{2n}\right]^{-m} * \Sigma B_{2n} x^{2n}$$

$$z_2(x) = \Sigma G_{2n} x^{2n} + \left[1 + \sum_{n=1}^{4}(M_{2n}(r/2M_0))^{2n}\right]^{-m} * \Sigma F_{2n} x^{2n}$$

The coefficients $A_{2n} + B_{2n}$ are the chosen front curve at the optical axis (16.5 D) and $G_{2n} + F_{2n}$. is the back curve, in this example 19.5 D for an Rx of −3 D;

$A_2 = 5.97*10^{-3}$, $A_4 = 2.13*10^{-7}$, $A_6 = 1.52*10^{-11}$, $A_8 = 1.35*10^{-15}$, and $G_0 = 1$, $G_2 = 8.53*10^{-3}$, $G_4 = 4.65*10^{-7}$, $G_6 = 5.08*10^{-11}$, $G_8 = 6.93*10^{-15}$.

The coefficients $B_{2n} = F_{2n}$ correspond approximately to +10D base curves, being in this example;

$B_2 = 8.1*10^{-3}$, $B_4 = 5.32*10^{-7}$, $B_6 = 6.99*10^{-11}$, $B_8 = 1.15*10^{-14}$, and the conforming coefficients are, $R_0 = 27.5$, $R_2 = 0.5$, $R_4 = -0.03$, $R_6 = 0.03$, $R_8 = 0.08$, $m=2$ $M_0 = 30$, $M_2 = 0.5$, $M_4 = -0.03$, $M_6 = 0.03$, $M_8 = 0.08$, The curve marked [1] in FIG. 24 denotes the location of the front surface if the curvature were to be held constant at 16.5D. It is seen that the front surface of the lenses according to the current invention are moved approximately 7 mm outward, opening out the lens as it wraps around the eyes from an aperture of 23 mm to 30 mm as desired. It is also seen from the Rx tangential power plot that the mean through power error is less than 0.3 D across the lens aperture.

EXAMPLE 11B

A very similar result may be achieved in which the front curve of a rotationally symmetric lens element is flattened from 19.5D at the optical axis to 9.5D 30 mm off axis, using the representation Where the $A_{2n}$, and $B_{2n}$ are themselves functions of distance [r], per the expressions;

$$z_1(r) = \sum_{n=1}^{4} (A_{2n}[r]*r^{2n}) \quad z_2(r) = \sum_{n=1}^{4} (B_{2n}[r]*r^{2n})$$

$P[r]=P_0+P_1*r+P_2*r^2$ and $Q[r]=Q_0+Q_1*r+Q_2*r^2$, $A_2[r]=P[r]*10^{-3}/1.170$, $A_4=(A_2)^3$, $A_6=2(A_2)^5$, $A_8=5(A_2)^7$, and $B_2[r]=P[r]*10^{-3}/1.170$, $B_4=(B_2)^3$, $B_6=2(B_2)^5$, $B_8=5(B_2)^7$.

In this case, both sagittal and tangential powers decrease approximately linearly from the optical axis, toward the edge of the lens.

Figure 25A:
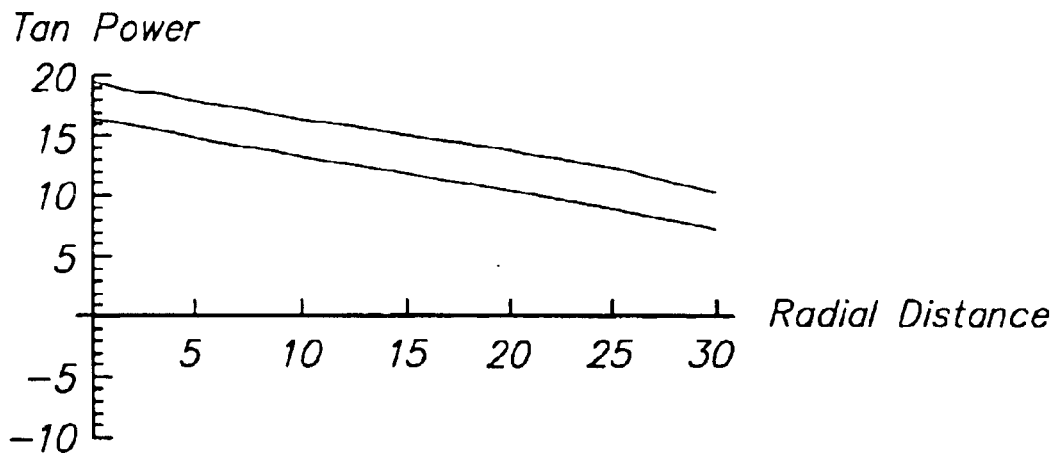
FIGS. 25a–b are plots of tan power and through power as a function of radial distance in accordance with example 11B.
Figure 25B:
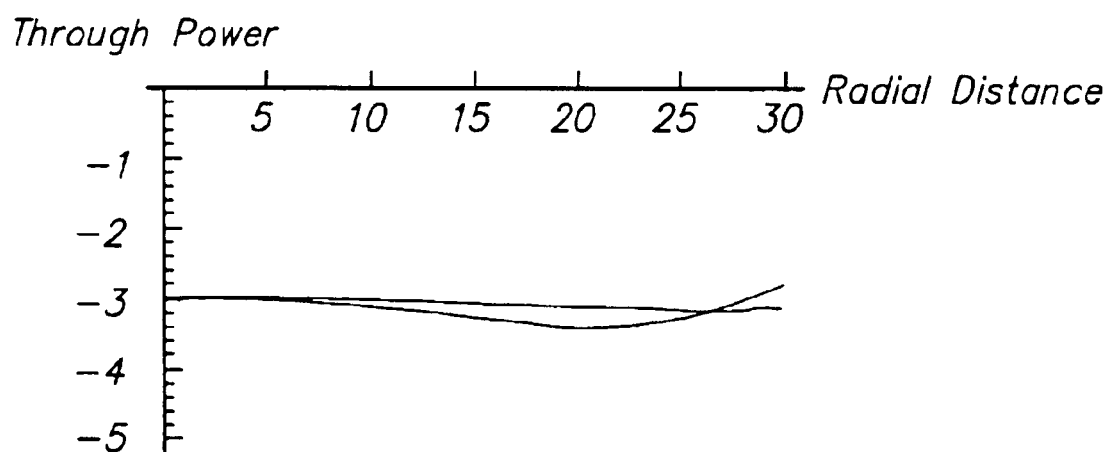
Figure 28A:
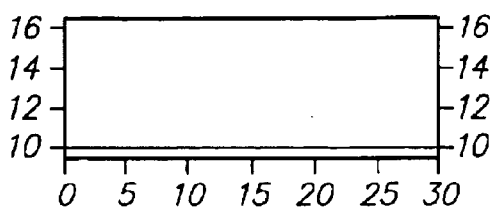
Figure 28B:
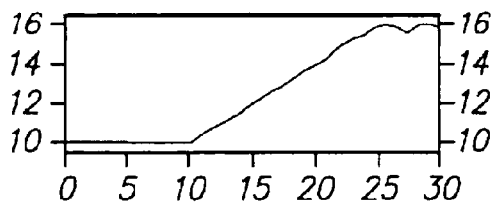
Figure 28C:
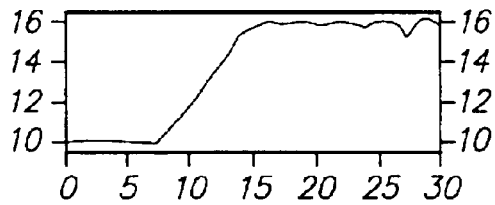
Figure 28D:
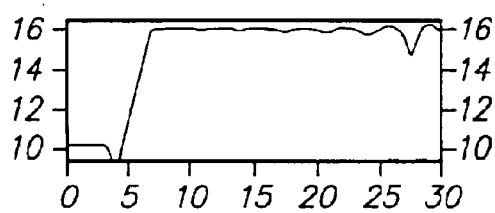
Figure 28E:
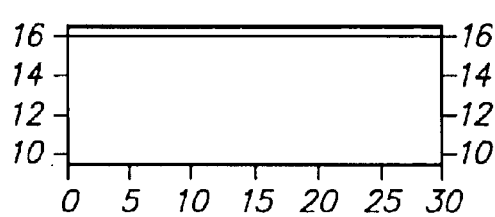
Figure 28F:
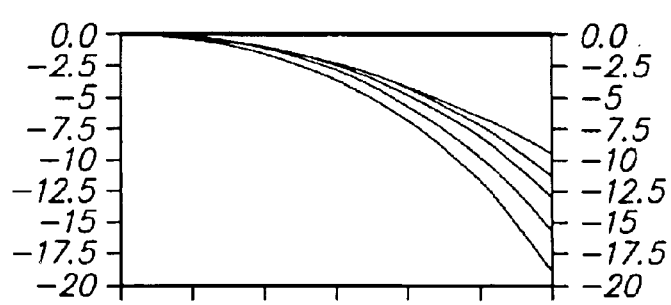

The results of these adjustments are illustrated in FIGS. 25a to b which correspond to the selections $P_0=19.5$, $P_1=-0.115$, $P_2=0$ and $Q_0=16.5$, $Q_1=-0.115$, $Q_2=-1.5*10^{-4}$ The variation of sag and tan powers on front and back surfaces is closely matched, in which case both components of through power remain close to −3.0D from the axis to 30 mm off axis. The difference between the two measures astigmatism, and has a local maximum of 0.27D at about 20 mm off axis, subsequently reversing sign and growing to 0.33D at the edge of the lens (30 mm off axis).

EXAMPLE 12

Bowl Shapes

Examples of some bowl-shaped lens profiles are given in FIGS. 26, 27 and 28 for piano lenses having a 8 D base curvature at the optical axis, increasing via a range of functions to 16 D toward their outer edge. These are compared with prior art spherical surfaces of 8 and 16 D curvature (Figures a and e in each case). To achieve wrap of an 8 D lens around the visual field, it is necessary to decenter the lens so that the forward line of sight is parallel to the optical axis, but not coincident with the axis or tilt the optical axis with respect the forward line of sight and apply atoric corrections to shapes allow for power and prism errors thus introduced. A lens element of high curvature such as 16 D may be mounted so the optical axis coincides with the line of forward gaze of each eye but the curvature is so extreme that lenses cannot actually reach beyond the temples to enclose the visual apparatus. Bowl-shaped lens elements designed according to this method achieve the desired physical wrap and can also be fitted with correct alignment of the optical axis. They also provide greater volume in which to fit an Rx power correction between the front of the lens and the approximately spherical volume defined by the limits of the eye lashes, this being approximately 18 to 23 mm in radius from the center of rotation of the eye. In each case, Figures (b) to (d) illustrate the result on the lens designs of the 3 different selected illustrative tangential power profiles.

EXAMPLE 13

Figure 29A:
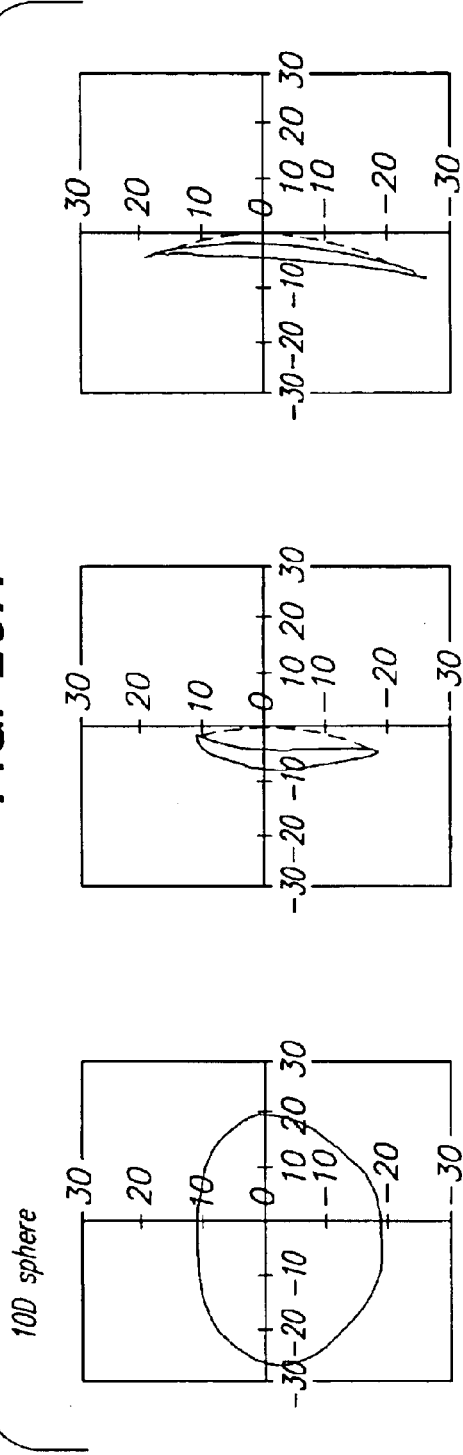
FIGS. 29a and b illustrate, respectively, a plan, side and top view of a 10.0 D base spherical lens (prior art) and an optical lens according to the present invention.

FIGS. 29(a) and (b) respectively illustrate a plan, side or top view of a 10.0 D base spherical lens (prior art) and an optical lens according to the present invention being a 10.0 D to 16.0 D base variable curvature, rotationally symmetric spiral oblate lens corresponding to the optical lens described in FIG. 26(d) above.

In FIG. 29 the dotted lines represent the front surfaces of the lenses and the solid lines represent the back edges of the lenses.

Figure 29B:
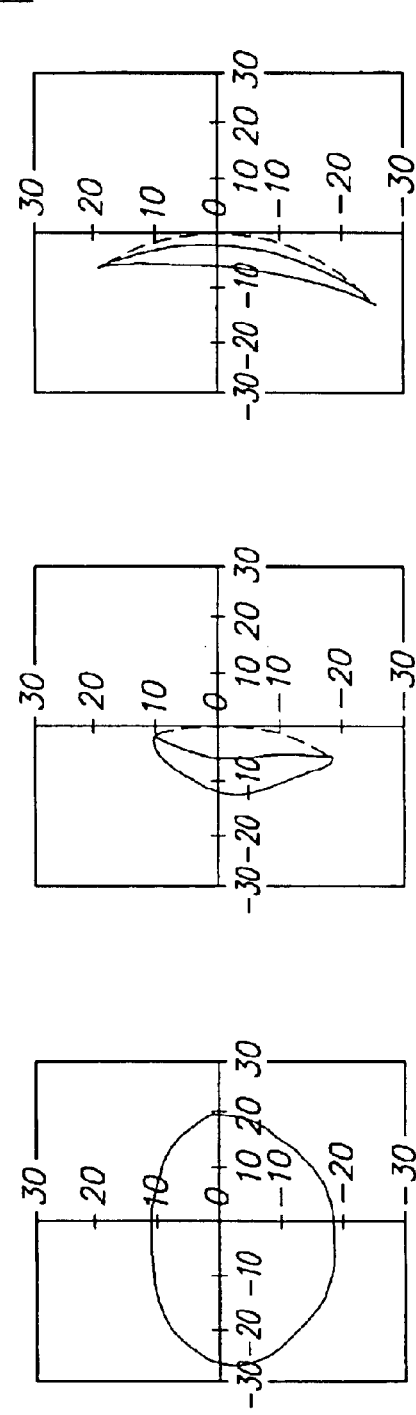

The spiral optical lens according to FIG. 29(b) may be contrasted with a comparable prior art spherical lens of FIG. 29(a). It will be noted that the lens according to the present invention exhibits a radical shape, with significantly increased curvature and sagittal depth, but still permitting mounting in a frame suitable for the prior art spherical lens.

EXAMPLE 14

Spiral Bends

In this example axial symmetry is not maintained and the co-varying surfaces are treated as deviations from toric surfaces, rather than from spheres.

$$Z(r,\phi)=Z(x,y)$$

The Sag is expressed in parametric form $$Z(x, y) = \sum_{2n=0}^{4} A_{2n}*x^{2n} + \sum_{2n=9}^{4} B_{2n}*y^{2n}$$

Where, for example $$A_2=P_0+K(x), \text{ and } B_2=P_0$$

so that there can be produced a changing base curvature in the direction of the Ox axis and the curvature orthogonal to it is held constant. In this case, for example, the Ox axis corresponds to the horizontal axis and Oy is vertical. In an entirely analogous way to the shape changes of a bowl as described above, a lens of this form remains somewhat flat in the vertical sense but reaches increasingly tightly in the horizontal direction to spiral in toward the temples to wrap around the field of vision and sit snugly against the face.

Designs and optical analysis of lenses designed according to this scheme are given in FIG. 30.

FIGS. 30(a) to (e) illustrate the general shape of the front surface (FIG. 30(a)) and back surfaces (FIGS. 30(b) to (e)) of the lens elements configured as spirals. The back surfaces are respectively piano (FIG. 30(b)) or have surface powers of −3 D, −2 D and +2 D (FIGS. 30(c), (d) and (e)).

In each design the curve marked (1) is the reference sphere and the curve marked (2) is the spiral surface of the lens, thus illustrating the degree of deviation.

In FIG. 31(a) to (c), plots of the RMS power error for spiral lens designs according to the present invention are provided which illustrate a spiral lens design of −3 D mean through power optimized at 0 degrees (a) a prior art aspherical design (b) and a spiral lens optimised at 45 degrees (c).

In the spiral lens designs the design in the left hemisphere is a spherical design and in the right hemisphere is a spiral design.

EXAMPLE 15

Figure 32A:
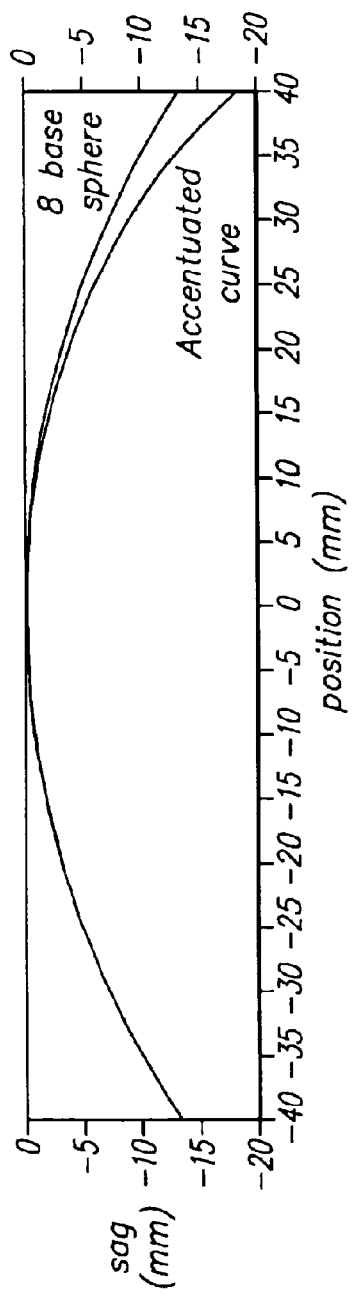
FIGS. 32a–b illustrate the general shape and surface power of the lens element of example 15.
Figure 32B:
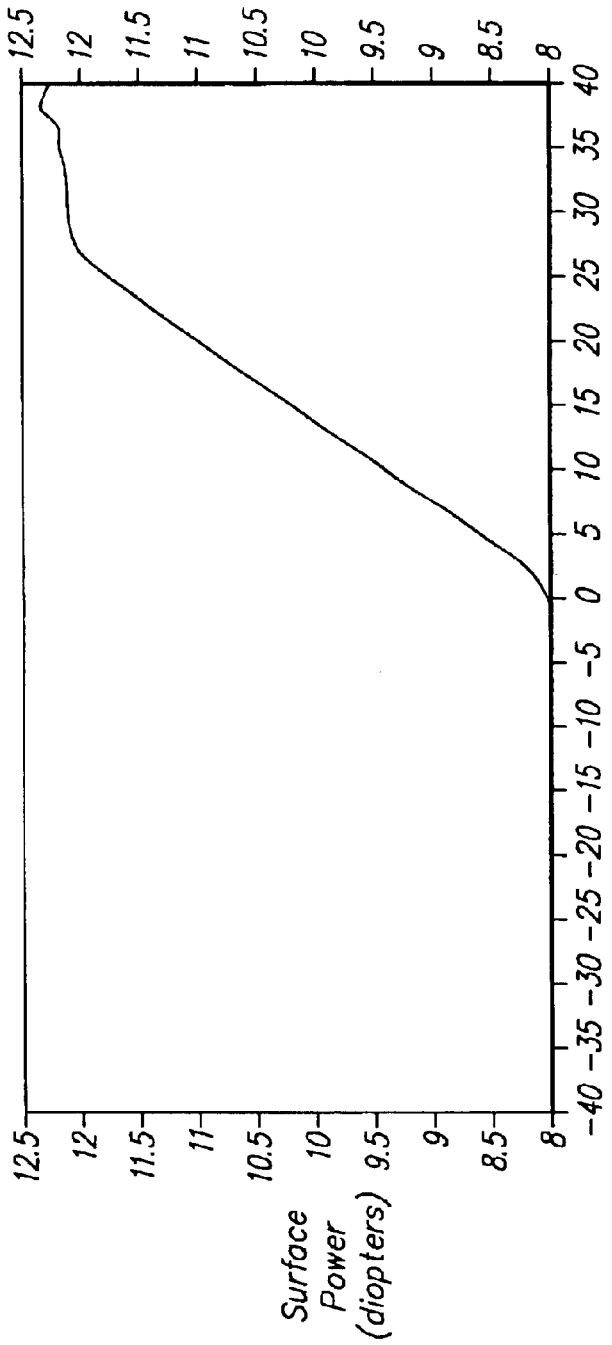

FIG. 32(a) illustrates the general shape (sagittal depth) of a front surface of a lens element according to the present invention and substantially corresponds to the surface in FIG. 30(a) below. FIG. 32(b) illustrates the surface power profile of the deviating surface in FIG. 32(a). In this case the reference sphere has a curvature of 8 D.

The deviating front surface has a curvature of 8 D at the centre and linearly ramps up to 12 D over 27 mm along the "x" axis. It continues with 12 D to the edge. The resulting curvature and sag along the x axis of the surface are shown in FIG. 32(a) below. Also shown is the sag of an 8 base sphere for comparison.

Figure 33:
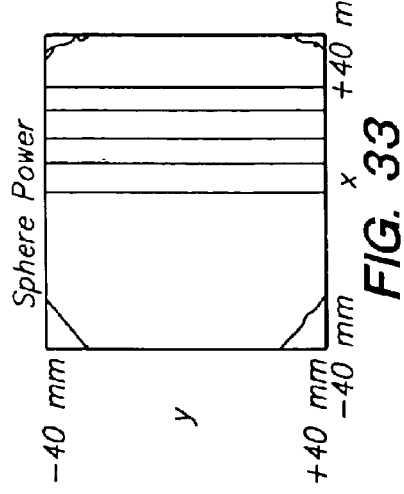
FIG. 33 is a sphere power plot.

The curvature gradient increases the sag by a little over 5 mm and increases the slope from 37 to 53 degrees at 40 mm out. The curvature in the y direction was kept constant at 8 D. The formula used for the surface depth was $$z(x,y) = R - \sqrt{(R-z(x))^2 - y^2}$$

where z(x) is the one x direction height described above and R is the 66.25 mm radius corresponding to 8 D. The following sphere power plot FIG. 33 shows the vertical contours for this design. The contour interval is 1 D.

All subsequent contour plots will also have a range of ±40 mm, or about 56 degrees of eye rotation.

Plano Lens

To make a plano lens element, a back surface was selected that had the same form as the front, but with the central curvature slightly adjusted to give zero through power. The resulting RMS power error is shown below. For comparison FIG. 34(c) is a spherical plano lens element with an 8 base spherical front and appropriate spherical back. The contours are at 0.1 D intervals.

The plots in FIGS. 34(a) and (c) show that the deviating surfaces cause only a slight increase in the error at extreme eye rotation angles on the right side of the lens. The left hemisphere of the accentuated surface is an 8 base sphere so performs substantially identically to the spherical lens. Even without optimization this provides a plano lens that performs essentially as well as a spherical lens with an 8 base front. Optimization was performed by adding some aspherical corrections to the back surface. The optimization procedure is described in more detail in Example 16 below. After optimization (FIG. 34(b)) the performance is nearly perfect everywhere except for the extreme right edge of the lens. Of course optimizing the back of the lens with the spherical front would give the performance shown on the left, spherical half of the lens.

EXAMPLE 16

Optimized Minus Two Lens

A lens element was designed with an Rx of −2 D using a deviating front surface. The back surface consisted of three components; 1) the sag of the front surface 2) a spherical correction to give the proper Rx at the center and 3) an aspherical correction surface. The aspherical correction consisted of two separate 10th order polynomials, one for the left hemisphere and one for the right. The "left hand" polynomial coefficients were adjusted by hand to minimize the RMS power error along the negative half of the x axis. Separate coefficients were similarly determined for the right half optimizing along the positive x axis. The final correction surface used was a linear superposition of these function multiplied by smoothly varying functions of angle ($\theta = \tan^{-1}(y/x)$). The right side polynomial was multiplied by $\cos^2\theta$ out to ±90 in the right hemisphere only. This has the effect of giving the polynomial full influence along the positive x axis and smoothly tapering it to zero along the y. The opposite function, $\sin^2\theta$ in the right hemisphere, was used for the left side polynomial so that it has full effect on the left hemisphere and disappears along the positive x axis.

FIG. 35(a) below shows the RMS power error for a lens with the back surface design as described above. For comparison FIG. 35(b) is from a design with a spherical 8 base front and an optimized asphere on the back. The left side polynomial from the accentuated lens was used for this asphere since, again, that lens is spherical in the left hemisphere.

Figure 36:
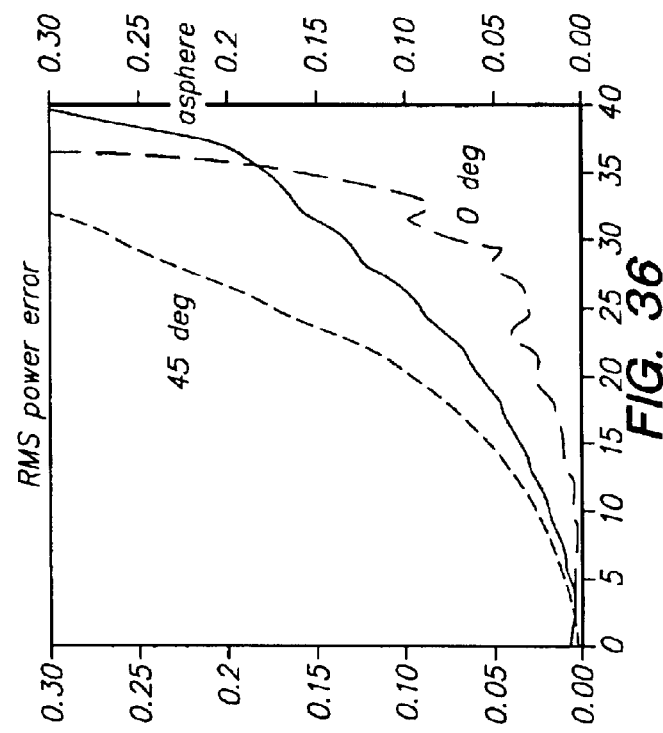

At first glance the result is surprising. The power error along the positive x axis is actually smaller than that along the negative (spherical front) axis, and therefore also less than for the optimized asphere. FIG. 36 below compares the RMS power error along this axis in detail.

The error at 0 degrees, along the positive x axis, is lower for the complex lens than for the spherical lens out to well past 30 mm.

Figure 37:
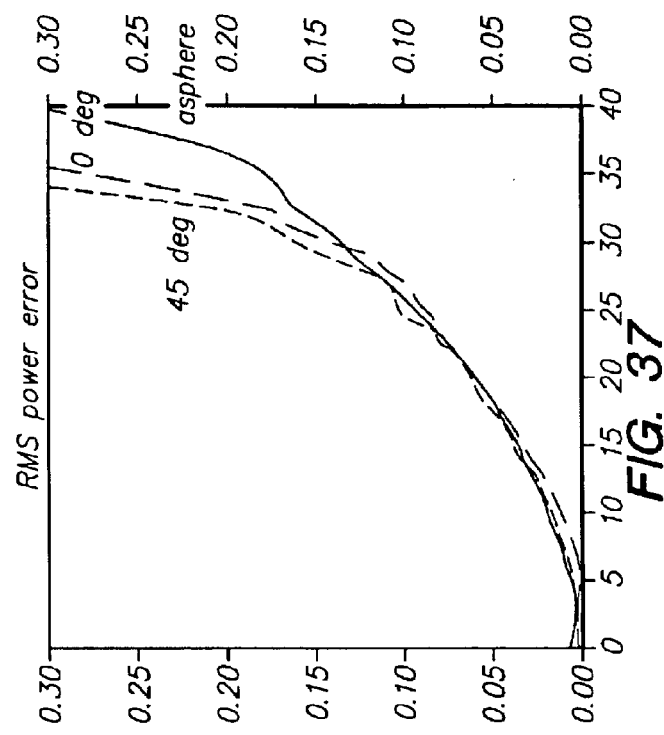
FIGS. 36 and 37 are plots comparing RMS power error.

FIG. 35(c) and FIG. 36 also illustrate the RMS power error at 45 degrees up from the x axis for the accentuated lens. This error is significantly higher than for the aspherical case, which is constrained to have the same error along all axes. $\sin^4\theta$ and $\cos^4\theta$ terms were added to the angular ramping functions for the left and right side polynomials respectively. The new coefficient was adjusted of the left side function to minimize the error at 45 degrees (it does not affect the 0 degree error). Then the coefficient of the $\cos^4\theta$ term was until the errors at 0 and 45 degrees were roughly equal. The result is shown in FIG. 37 below. Surprisingly the curves cross just at the level of the optimised asphere.

In summary, it is possible to design a back surface that gave optical performance essentially equal to a lens with a spherical front of similar complementary curvature. It showed that the performance along one preferred axis could actually be made better than the equivalent spherical front— aspherical back lens. It suggests that the angular averaged RMS error may not be significantly lower than the sphere-asphere combination.

EXAMPLE 17

Bowl Shapes

Figure 38A:
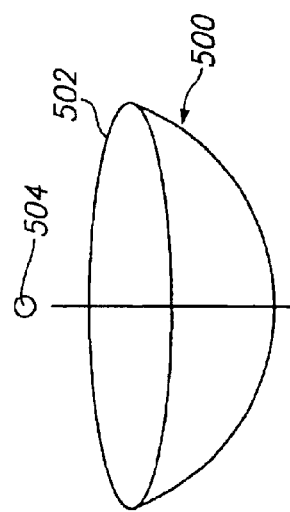
FIGS. 38a–c illustrate pictorially the general shapes of lens elements configured as bowls.
Figure 38C:
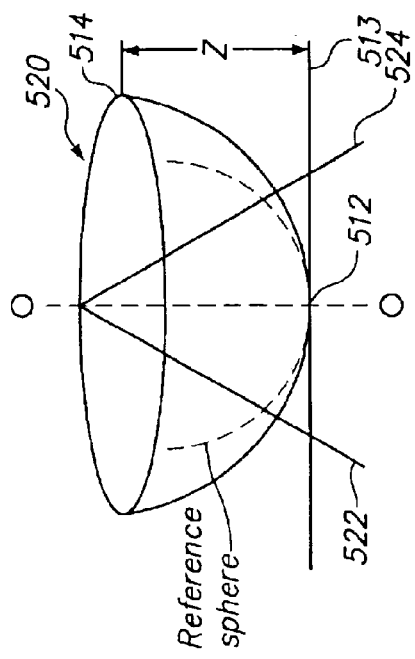
Figure 38B:
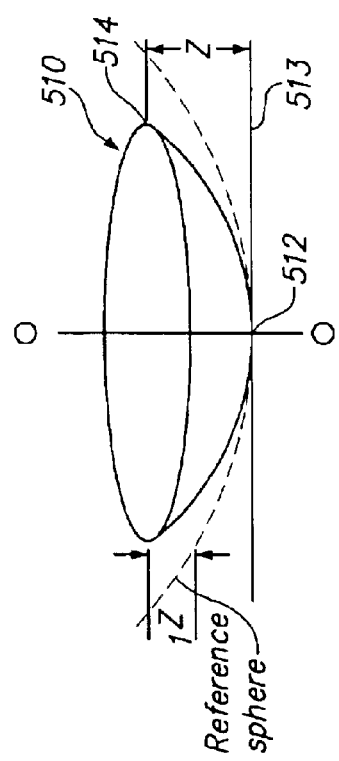

FIGS. 38(a)–(c) illustrate the general shapes of lens elements configured as bowls. It will be understood that lens blanks may be made in the bowl forms shown in FIGS. 38(a)–(c). When edged, the bowl may have a non-circular rim which is adapted to the spectacle frames or mountings desired.

A spherical bowl 500 has an edge or rim 502. It will be understood that the lens elements disclosed in the above-mentioned U.S. application Ser. No. 09/223,006, now U.S. Pat. No. 6,142,624, may have the general shape shown in FIG. 29(a). Such lens elements may be characterized by a generally constant radius of spherical curvature of 35 mm or less, centered on the centroid of rotation 504 of the eye in the as worn condition. An optical axis of the lens O—O is shown intersecting the centroid of rotation 504. The spherical bowl 500 is radially symmetric about axis O—O. When worn, it may require no optical axis tilt or offset from the visual axis of the wearer.

The bowl shapes of FIGS. 38(b) and 38(c) are also radially symmetric about their respective optical axes O—O. FIG. 38(b) illustrates an oblate bowl 510. It is characterized by a relatively gentle instantaneous spherical curvature at a sphere point 512 located at about the intersection of the optical axis O—O with the lens element. The curvature becomes steeper radially outwardly from the axis O—O. The effect is illustrated by a reference sphere indicated in cross-section by dashed line 514. The reference sphere has the same curvature as the instantaneous curvature of the lens element at the sphere point 512. As shown in FIG. 38(b) the lens element gradually deviates from the reference sphere as radial distance increases. Examples of various changes in curvature which may be used are illustrated in FIGS. 26–28.

The shape of a lens made from the lens element of FIG. 38 may be characterized by a sagittal depth Z. The depth may be measured from the fronto-parallel plane 513 (a plane perpendicular to the axis O—O at the sphere point 512) and a point 514 which represents the most radially distant temporal edge point of the edged lens. In preferred embodiments of the present invention this distance may be on the order of 20 mm at a 30 mm radial distance as illustrated more explicitly in FIGS. 26–28.

The value ΔZ represent the perpendicular distance or deviation of the lens element from the reference sphere. It will be understood that ΔZ will have its maximum value in the edged lens at the radial distance corresponding to point 514. In the oblate bowl examples of FIGS. 26–28, ΔZ is shown to range from approximately 3 to 10 mm from the reference sphere at a location 30 mm from the axis O—O.

FIG. 38(c) illustrates a prolate bowl-shaped lens element 520. It is characterized by a relatively steep instantaneous spherical curvature at the sphere point 512. In contrast to the oblate bowl of FIG. 38(b) the curvature becomes less steep radially outwardly from the axis O—O. In a preferred embodiment, the bowl of FIG. 38(c) may take the form of one of the lens objects described in U.S. application Ser. No. 09/223,006, now U.S. Pat. No. 6,142,624, such that it has steeply curved spherical shape in a visual fixation region approximately bounded by a cone whose cross-section is indicated by rays 522 and 524. At the edge of the visual fixation region the curvature begins to gradually change to produce a temporal extension, in accordance with the preceding disclosure, in the lens region between ray 524 and the temporal edge point 514.

EXAMPLE 18

Ovaliform Lens Elements and Spiral Bends

Figure 39B:
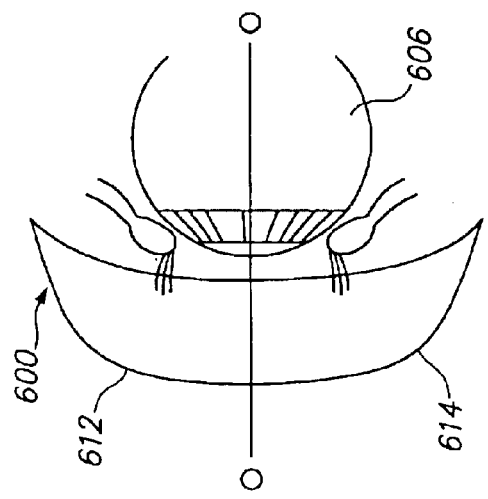
FIGS. 39a–b are, respectively, top and side views of an ovaliform lens with a spiral bend in the horizontal direction.
Figure 39A:
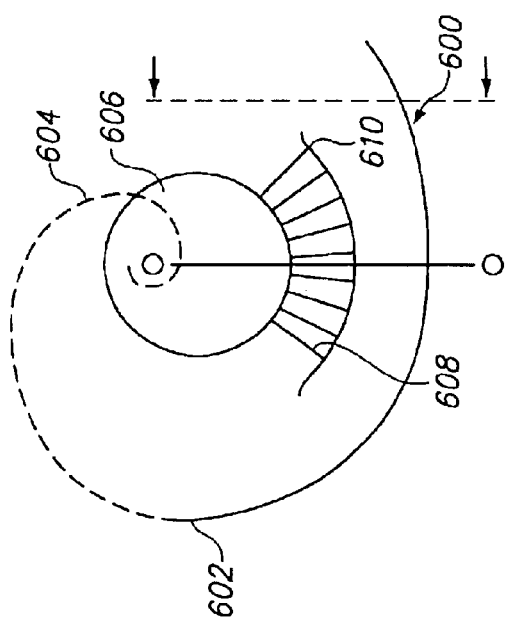

FIGS. 39(a) and (b) are, respectively, top and side views of an ovaliform lens 600 with a spiral bend in the horizontal direction. The lens is illustrated as having an optical axis O—O, which, preferably, is colinear with the wearer's visual axis. The temporal-most edge point of the lens is indicated at 602. The shape of the lens in the horizontal plane of FIG. 39(a) is characterized by a spiral bend (i.e. a monotonic curvature increasing in at least the temporal direction). For illustration purposes, this curvature increase is continued beyond the lens edge point 602 and is indicated by the spiralling dashed line 604.

The eye 606 and eyelashes 608 of the wearer are also shown in FIG. 39(a). A line 610 represents a cross-section of a three dimensional surface which contains the frontal-most possible locations of the eyelashes and lids. This surface 610 preferably lies completely behind the rear surface of the lens to avoid eyelash/lid clash.

FIG. 39(b) is a side perspective view in partial cross-section of the lens 600 and eye 606 of FIG. 39(a). FIGS. 39(a) and (b) illustrate that the vertical curvature of lens is different than the horizontal curvature of the lens. The lens is not radially symmetric and better described as an ovaliform shape than as a bowl.

The vertical shape of the lens 600 is characterized by bends 612 and 614 located above and below the axis O—O, respectively. The change in vertical curvature may be tailored to avoiding eyelash/lid clash and providing protection for the eye above and below the optical axis O—O.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A prescription optical lens element with non-zero mean through power including
   a first surface; and
   a second surface of complementary curvature;
   the surfaces exhibiting significant deviation in curvature from a standard optical surface;
   the first and second surfaces in combination having substantially constant mean through power throughout the visual fixation field of the wearer.

2. An optical lens element according to claim 1, wherein the surfaces exhibit a substantially smooth change of curvature, at least along a horizontal meridian, across at least a portion of the visual fixation field of the wearer.

3. An optical lens element according to claim 2, wherein the surfaces exhibit substantially no visible discontinuity.

4. An optical lens element according to claim 3, wherein the surfaces exhibit substantially no optical discontinuity.

5. An optical lens element according to claim 1, wherein the deviation in curvature results in a change in sagittal depth of at least approximately 2 mm.

6. An optical lens element according to claim 5, wherein the deviation in curvature results in a change in sagittal depth of at least approximately 4 mm.

7. An optical lens element according to claim 1, wherein the optical lens element has a non-zero mean through power between −6.0 D and +6.0 D.

8. An optical lens element according to claim 1, wherein, when mounted, the optical axis of the lens element is parallel to the line of sight of the wearer.

9. An optical lens element according to claim 8, wherein the optical axis is colinear with the line of sight of the wearer.

10. An optical lens element according to claim 1, wherein the standard optical surface is of spherical or toric shape, defined at a sphere or fitting point on the surface which passes through the optical axis.

11. An optical lens element according to claim 10, wherein the extent of deviation of the deviating surface from a standard optical surface is related to the radial distance from the optical axis.

12. An optical lens element according to claim 11, wherein the deviation varies linearly, sinusoidally or a combination thereof, with radial distance.

13. An optical lens element according to claim 1, wherein at least one deviating surface exhibits no more than 1 meridian being circular in section.

14. An optical lens element according to claim 13, wherein the optical lens element is of ovaliform shape.

15. An optical lens element according to claim 11, wherein the optical lens element is generally radially symmetric.

16. An optical lens element according to claim 11, wherein the shape of a horizontal section through the optical lens element is generally that of a spiral.

17. An optical lens element according to claim 1, wherein at least one deviating surface varies along a horizontal meridian, but the curvature of the surface along the vertical meridian is substantially constant.

18. An optical lens element according to claim 1, wherein at least one deviating surface varies along the horizontal and vertical meridians.

19. An optical lens element according to claim 18, wherein the curvature of the surface along the vertical meridian is maintained within approximately 0.5 D of the curvature of the surface along the horizontal meridian.

20. An optical lens element according to claim 1, wherein either the front surface or the back surface, bears a surface correction to at least partially adjust for optical errors induced by the change in curvature in the other surface.

21. An optical lens element according to claim 20, wherein the back surface of the lens bears a surface correction to at least partially adjust for optical errors.

22. An optical lens element according to claim 1, wherein the lens element is adapted for mounting in a frame of the wrap-around or shield type, such that the lens is rotated temporally about a vertical axis through the optical center thereof.

23. An optical lens element according to claim 1, wherein the lens element is adapted for mounting in a frame of the wrap-around or shield type, such that the lens is decentered to displace its optical axis from the line of sight, while maintaining parallelism between the two.

24. An optical lens element according to claim 22, wherein the lens element is both decentered and rotated temporally about a vertical axis through the optical center thereof.

25. An optical lens element according to claim 23, wherein the lens element is both decentered and rotated temporally about a vertical axis through the optical center thereof.

26. A prescription optical lens element series, the lens elements of the series having a range of different lens through powers, wherein each lens element includes
   a first surface; and
   a second surface of complementary curvature;
   the surfaces exhibiting significant deviation in curvature from a standard optical surface;
   the first and second surfaces in combination exhibiting substantially constant mean through power throughout the visual fixation field;
   each lens element having
      a front surface varying with mean through power required; and
      a common back surface.

27. An optical lens element series according to claim 26 wherein each lens element exhibits plus through power.

28. A prescription optical lens element series, the lens elements of the series having a range of different lens through powers, wherein each lens element includes
   a first surface; and
   a second surface of complementary curvature;
   the surfaces exhibiting significant deviation in curvature from a standard optical surface;
   the first and second surfaces in combination exhibiting substantially constant mean through power throughout the visual fixation field;
   each lens element having
      a common front surface; and
      a back surface-varying with mean through power required.

29. An optical lens element series according to claim 28 wherein each lens element exhibits minus through power.

30. A method of making a prescription optical lens element with non-zero through power including
   a first surface; and
   a second surface of complementary curvature;
   at least one surface exhibiting significant deviation in curvature from a standard optical surface;
   the first and second surfaces in combination exhibiting substantially constant mean through power throughout the visual fixation field of the wearer;
   which method includes
      providing
         a mathematical or geometrical representation of a first surface exhibiting a significant deviation in curvature from a standard optical surface; and
         a mathematical or geometrical representation of the profile of a second surface of complementary curvature;
      forming a lens element corresponding to the representations of the first and second surfaces.

31. A method according to claim 30, wherein the lens element is radially symmetric and the sagittal depth is given by the formula $$Z(r,\theta)=Z(r)$$

wherein r, $\theta$, Z, are cylindrical coordinates $$Z(r) = \sum_{n=0}^{4} A_{2n} * r^{2n}$$

wherein $A_4=(A_2)^3$, $A_6=2*(A_2)^5$, and $A_8=5*(A_2)^7$
wherein the function K(r) is continuous, wherein $P_0$ and $A_0$ are constants for the lens element.

32. A method according to claim 30, wherein a surface carries a surface correction, and the sagittal depth is given by the formula $$Z(r,\theta)=R(r,\theta)-\sqrt{R(r,\theta)^2-r^2}$$

and where $$R(r, \theta) = \frac{R(r, 0) * R(r, \pi/2)}{R(r, 0)\sin^2\theta + R(r, \pi/2)\cos^2\theta}$$

is the radial curvature along the meridian at $\theta$, and the values $\theta=0$ and $\pi/2$ represent the principal meridians.

33. A method according to claim 30, wherein the lens element deviates from a toric surface, and the sagittal depth is given by the formula $$Z(r,\phi)=Z(x,y)$$

wherein r, $\phi$ are cylindrical co-ordinates $$Z(x, y) = \sum_{n=0}^{4} A_{2n} * x^{2n} + \sum_{n=0}^{4} B_{2n} * y^{2n} \text{ wherein}$$

$$A_2 = P_0 + K(x), \text{ and } B_2 = P_0.$$

34. A method according to claim 30, wherein the lens element includes an optical zone extension in which unwanted optical astigmatism is significantly reduced, and the sagittal depth is given by the formula $$z(x, y) = Z(x, y) + f'(y/R'_0) * f(x/R_0) \left[ \sum_{n=1}^{4} C_{2n} x^{2n} + \sum_{n=1}^{4} C_{2n} y^{2n} \right]$$

where $f'(y/R'_0) = \left[ 1 - \sum_{n=2}^{4} (R'_{2n}(y/2R'_0))^{2n} \right]^{-m}$ wherein the value of parameters $R_{2n}$, $C_{2n}$, and m are determined along the horizontal meridian by fitting the sagittal power to an approximately constant value.

35. An optical lens element including:
   a first lens surface having a surface power varying radially symmetrically from a sphere point and exhibiting high levels of surface astigmatism over substantial portions of the lens such that the lens would be unusable as an ophthalmic lens if combined with a second standard optical surface; and
   a second lens surface such that the front and rear surfaces define an optical body having an approximately constant mean through power and being essentially free of astigmatism over said substantial portion of the lens element.

36. An optical lens element according to claim 35, wherein the lens element is a prolate bowl such that the first surface deviates from a reference sphere defined at the sphere point by at least 3 mm at a location 30 mm from the sphere point.

37. An optical lens element including
   a first surface; and
   a second surface of complementary curvature; at least one surface exhibiting significant deviation in curvature from a standard optical surface;
   the first and second surface in combination defining at least one optical zone on the lens aperture,
   wherein the mean through power is substantially constant in the at least one optical zone;
   wherein the at least one optical zone is first optical zone located centrally on the lens aperture;
   wherein the first and second surfaces in combination define
      a second temporal optical zone on the lens aperture that is displaced laterally along a horizontal meridian of the lens; and
      an intermediate optical zone between the first and second optical zones in which the mean through power varies gradually along the horizontal meridian.

38. An optical lens element according to claim 37, wherein the intermediate optical zone takes the form of a channel in which the mean through power increases relatively smoothly according to a predetermined mathematical formula.

* * * * *